United States Patent [19]
Yanagisawa et al.

[11] Patent Number: 5,159,364
[45] Date of Patent: Oct. 27, 1992

[54] INITIAL MODE SETTING DEVICE FOR CAMERA

[75] Inventors: Masaaki Yanagisawa, Tokyo; Tetsuro Goto, Funabashi; Naoki Tomino; Tsutomu Wakabayashi, both of Tokyo; Yoshio Matsuzawa, Yokohama; Kazuyuki Kazami, Tokyo; Koichi Daitoku, Sagamihara; Akira Ezawa, Tokyo; Toshio Sosa, Narashino; Kazuto Otsuka, Tokyo; Hideya Inoue, Yokohama, all of Japan

[73] Assignee: Nikon Corporation, Tokyo, Japan

[21] Appl. No.: 744,709

[22] Filed: Aug. 12, 1991

Related U.S. Application Data

[63] Continuation of Ser. No. 552,424, Jul. 13, 1990, abandoned.

[30] Foreign Application Priority Data

| Jul. 18, 1989 | [JP] | Japan | 1-185086 |
| Aug. 7, 1989 | [JP] | Japan | 1-204301 |
| Aug. 7, 1989 | [JP] | Japan | 1-204302 |
| Aug. 16, 1989 | [JP] | Japan | 1-211836 |
| Aug. 16, 1989 | [JP] | Japan | 1-211837 |
| Aug. 17, 1989 | [JP] | Japan | 1-211955 |
| Aug. 21, 1989 | [JP] | Japan | 1-214709 |
| Aug. 29, 1989 | [JP] | Japan | 1-223618 |
| Sep. 8, 1989 | [JP] | Japan | 1-233354 |

[51] Int. Cl.$^5$ .............. G03B 5/00; G03B 13/36; G03B 17/18; G03B 17/40

[52] U.S. Cl. .............. 354/21; 354/400; 354/195.1; 354/238.1; 354/289.12

[58] Field of Search .............. 354/195.1, 195.12, 289.1, 354/289.12, 400, 410, 402, 21, 237, 238.1, 465, 471

[56] References Cited

U.S. PATENT DOCUMENTS

| 4,420,236 | 12/1983 | Teniguchi et al. | 354/21 |
| 4,598,986 | 7/1986 | Shiratori et al. | 354/21 |
| 4,621,914 | 11/1986 | Taniguchi et al. | 354/21 |
| 4,669,849 | 6/1987 | Ohtsuka et al. | 354/400 |
| 4,783,676 | 11/1988 | Aihara et al. | 354/400 |
| 4,835,560 | 5/1989 | Goto et al. | 354/238.1 |
| 4,839,677 | 6/1989 | Hoshiro et al. | 354/195.1 |
| 4,851,869 | 7/1989 | Ishimaru et al. | 354/195.1 |
| 4,870,439 | 9/1989 | Tsuboi et al. | 354/195.1 |
| 4,951,075 | 8/1990 | Tokumaru et al. | 354/400 |
| 5,003,337 | 3/1991 | Amano | 354/400 |

Primary Examiner—W. B. Perkey
Attorney, Agent, or Firm—Shapiro and Shapiro

[57] ABSTRACT

There is disclosed a camera equipped with a mode setting device which counts the number of uses of each of plural modes, and sets the most frequently used mode as the initial mode. At the phototaking operation, the camera is set at such most frequently used mode. The above-mentioned plural modes can be plural exposure control modes, focal length control modes, photographing magnification setting modes, self-timer modes, automatic exposure value correcting modes, or alarm modes.

27 Claims, 51 Drawing Sheets

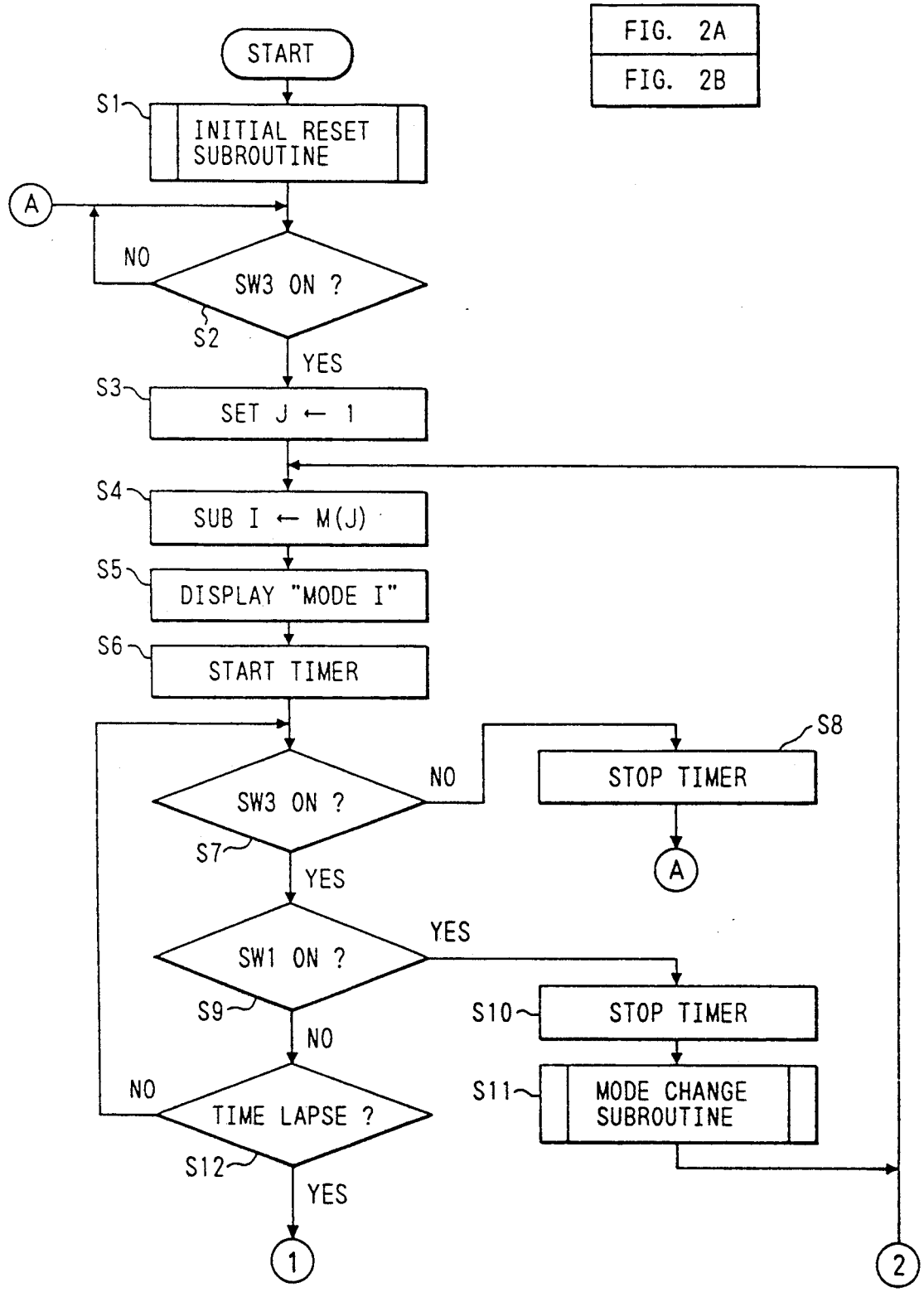

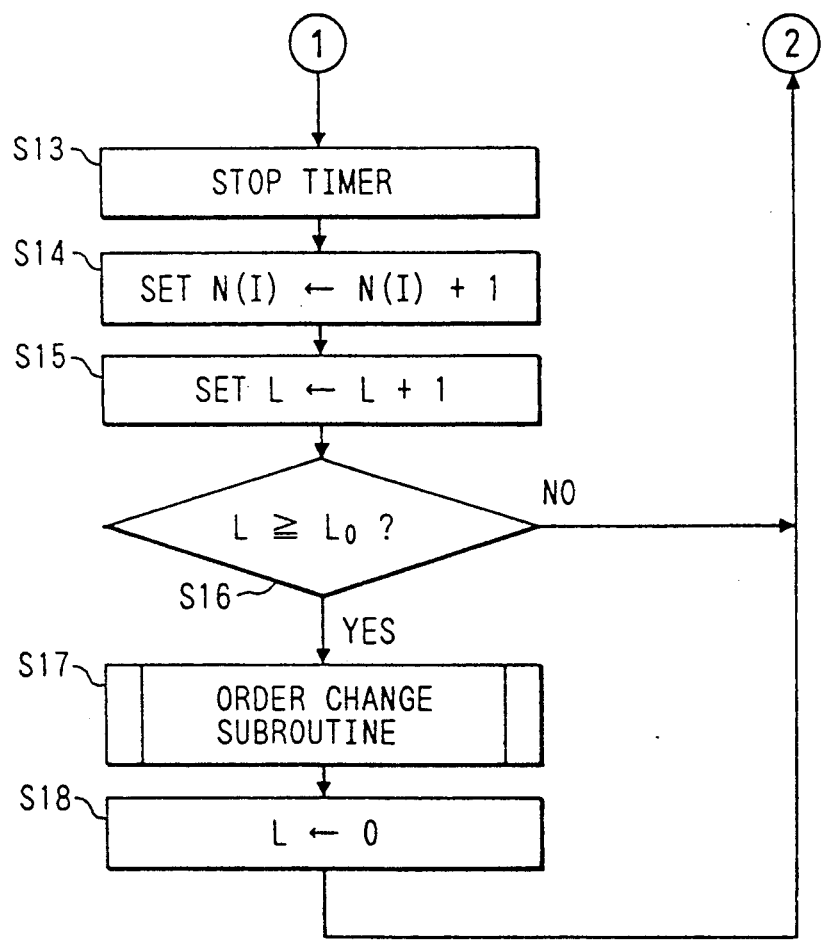

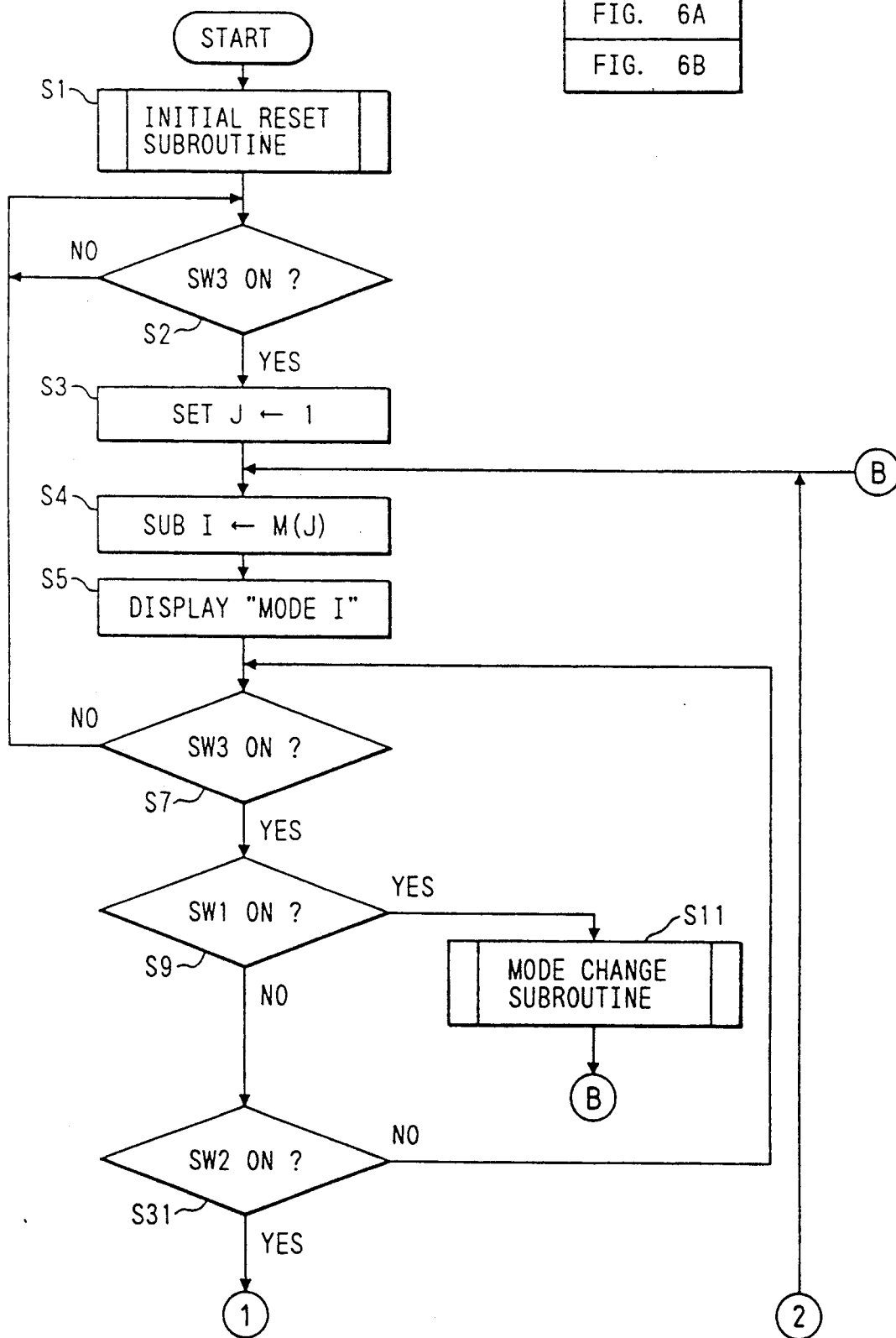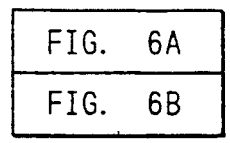

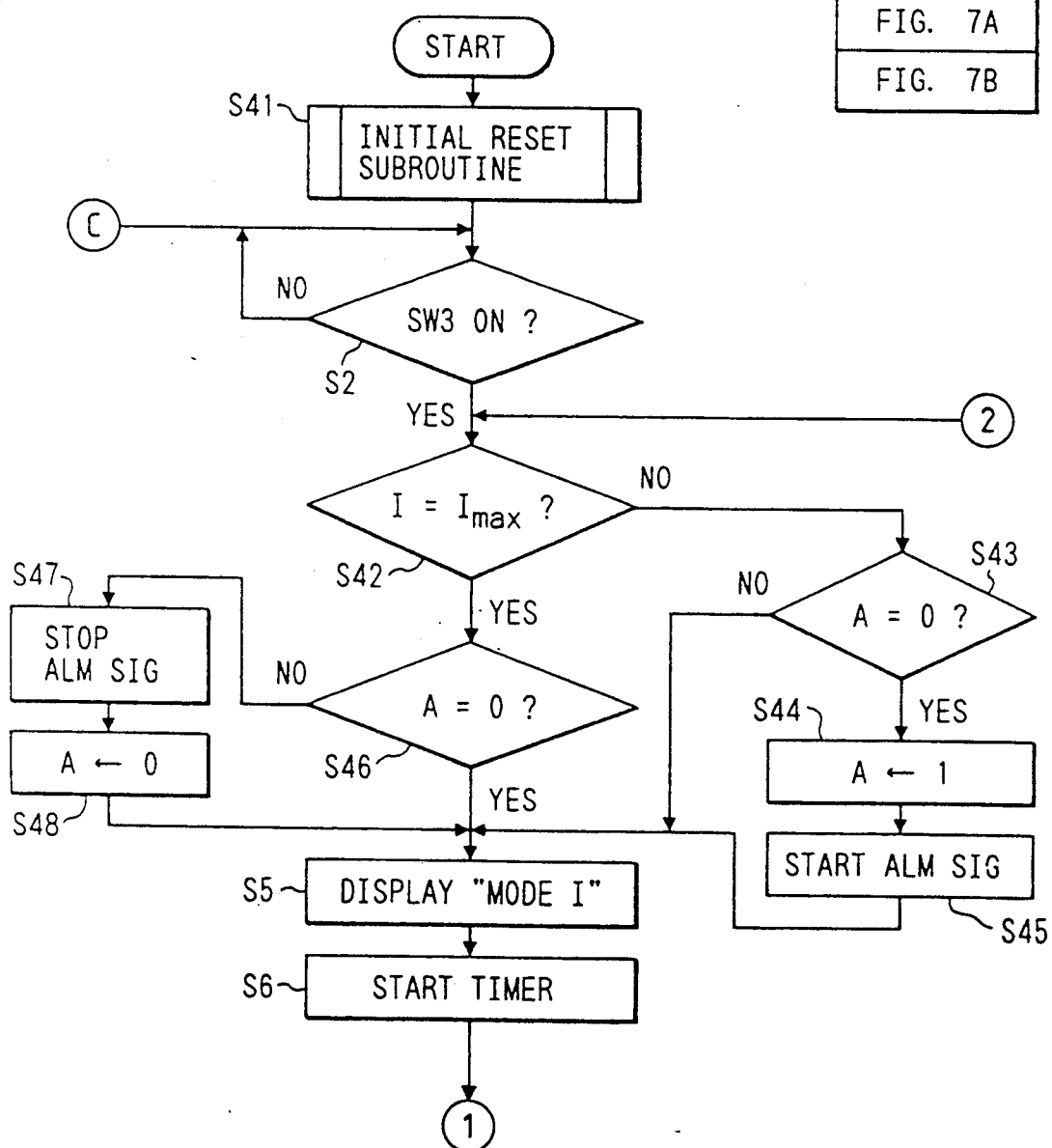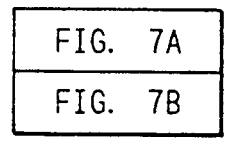

FIG. 21
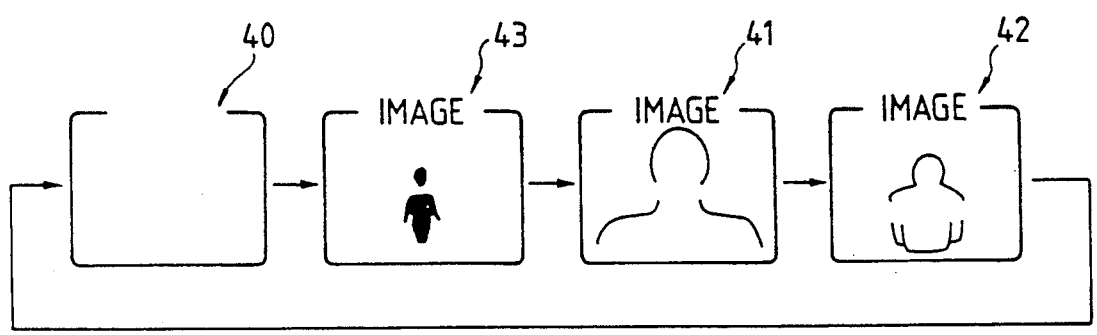
FIG. 22A   FIG. 22B   FIG. 22C
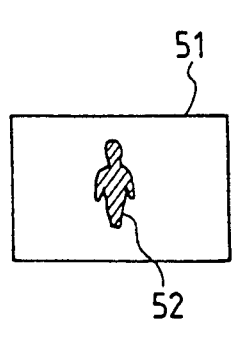 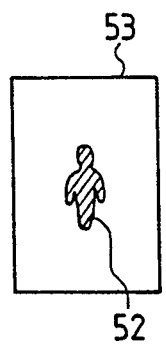 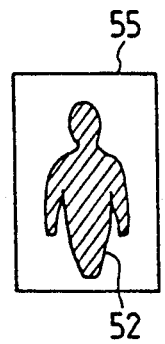

FIG. 26 RELEASE SUBROUTINE

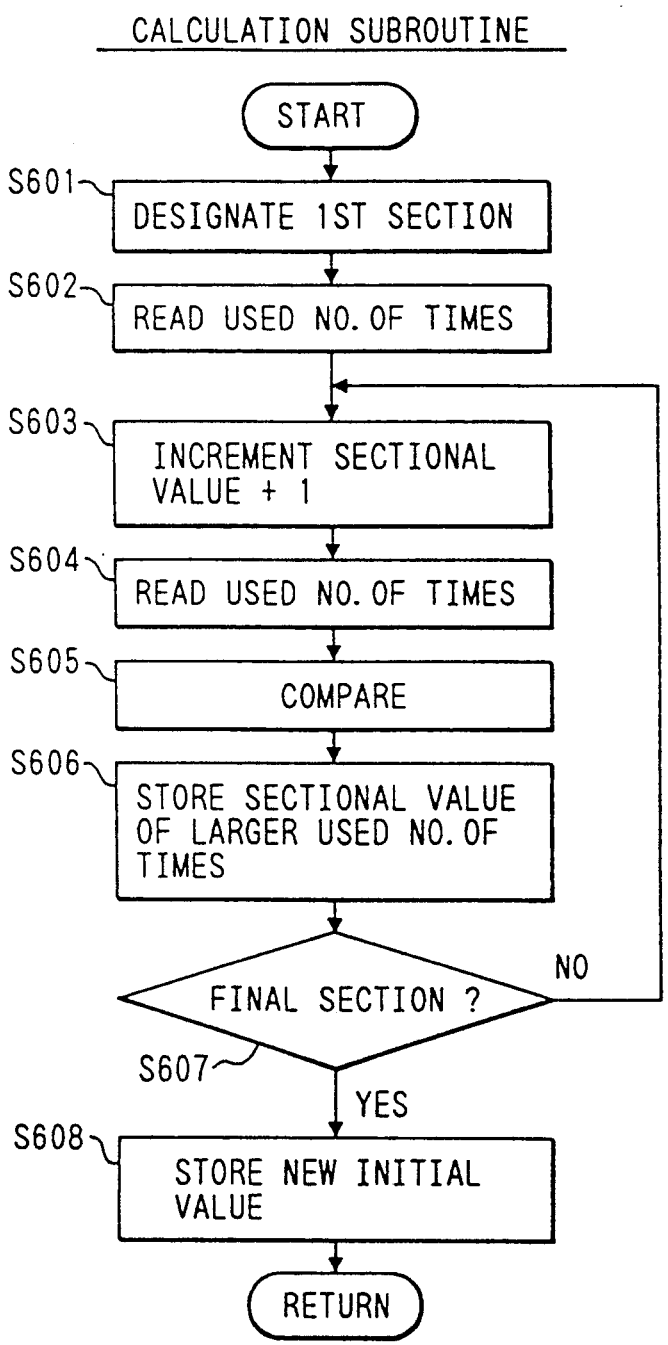

INITIAL MODE SETTING DEVICE FOR CAMERA

This is a continuation of application Ser. No. 552,424 filed Jul. 13, 1990, now abandoned.

BACKGROUND OF THE INVENTION

1. Field of the Invention

The present invention relates to a camera capable of selectively setting plural operating modes, and more particularly to a mode setting device for use in such camera.

2. Related Background Art

There is already known a camera having plural auto exposure control modes such as programmed auto exposure (AE) mode, shutter-preferential AE mode and diaphragm-preferential AE mode. When the power switch is turned off at the end of a photographing operation, such camera is generally designed to memorize the AE mode selected immediately before said end of operation. Thus, when the power switch is turned on next time, the camera is initialized at the AE mode selected at the end of the preceding photographing operation. Such initially selected AE mode can be altered by the manipulation of an operating member.

Such selection and alteration of plural operating mode are applied not only to the auto exposure control modes but also to plural auto focusing (AF) modes such as single AF servo mode and continuous AF servo mode, and plural data recording modes such as date recording mode and time recording mode. Also for light metering there are plural operating modes such as center-weighted light metering mode, spot light metering mode and multi-area light metering mode.

Depending on the photographer, a certain mode is used more than others. For example, among the AE modes, a photographer mainly taking photographs with rapidly moving objects such as in sports photography will frequently use the shutter-preferential AE mode, while a photographer mainly taking portraits will frequently use the diaphragm-preferential AE mode.

If such photographer occasionally uses a mode other than the mode frequently used by him (most frequent mode) and turns off the power switch, or if the camera is used by another person who uses a mode other than said most frequently mode, the camera will be set, at the turning-on of the power switch for the next photographing operation, at such other mode than the most frequent mode. Consequently the photographer has to change the mode to the most frequent mode before the photographing operation, but he may obtain an unsatisfactory photograph if such mode changing operation is forgotten, or may lose the optimum moment of photographing due to such mode changing operation.

SUMMARY OF THE INVENTION

An object of the present invention is to provide a camera which is initialized to the most frequent mode at the photographing operation.

The mode setting device of the present invention is so constructed as to count the number of uses of each mode, and, based on the result of said counting, to select the most frequently used mode as the initially set mode mentioned above.

The mode setting device of the present invention can be applied to the exposure control device of a camera, thereby providing a camera which, at the photographing operation, is initialized at a mode most frequently used by the photographer, among plural exposure control modes.

Also the mode setting device of the present invention may be applied to the focal length control device of a camera, thereby providing a camera which is initialized to a focal length most frequently used by the photographer.

Also the mode setting device of the present invention may be applied to the constant magnification photographing device of a camera, thereby selecting a photographing magnification frequently used in connection with the operation for a constant image size photographing operation.

Also the mode setting device of the present invention may be applied to a camera with plural self-timer modes, thereby providing a camera which is initialized, at a self-timer photographing operation, at a self-timer mode most preferred by the photographer.

Also the mode setting device of the present invention may be applied to a camera equipped with an automatic correcting device for the exposure value, thereby providing a camera which is initialized, in relation to the film loading operation, at a correction value most preferred by the photographer.

Another object of the present invention is to provide an alarm device giving an alarm to the photographer if the camera is loaded with a film of a sensitivity different from what is usually used by the photographer.

The alarm device of the present invention sets a film sensitivity frequently used in the camera (standard sensitivity), by memorizing the sensitivity of the film loaded in the camera, and, upon loading of a film, provides alarm if the sensitivity of said film does not match the standard sensitivity. Thus the photographer can know that the camera is erroneously loaded with a film of a sensitivity different from what is usually used.

Still another object of the present invention is to provide a device which, upon mounting of a phototaking lens on the camera, automatically focuses said lens to an object distance memorized in advance.

Still another object of the present invention is to provide a camera which memorizes a fact that the photographer has conducted a photographing operation ignoring the alarm given by the camera and gives alarm of a higher level at a next alarm.

BRIEF DESCRIPTION OF THE DRAWINGS

FIG. 2 comprising FIGS. 2A and 2B and FIGS. 3 to 5 are flow charts showing the control sequences of a microcomputer;

FIG. 6 comprising FIGS. 6A and 6B is a flow chart showing a variation of the control sequence;

FIG. 7 comprising FIGS. 7A and 7B and FIGS. 8-10 are flow charts showing another variation of the control sequences;

FIGS. 19 and 21 are views showing examples of display of the object size;

FIGS. 22A, 22B and 22C are views showing the relation between the photographed frame and the object;

FIGS. 36A and 36B and FIGS. 37 and 38 are flow charts showing control sequences;

DESCRIPTION OF THE PREFERRED EMBODIMENTS

At first reference is made to FIGS. 1 to 5 for explaining a first embodiment of the present invention.

Figure 1:
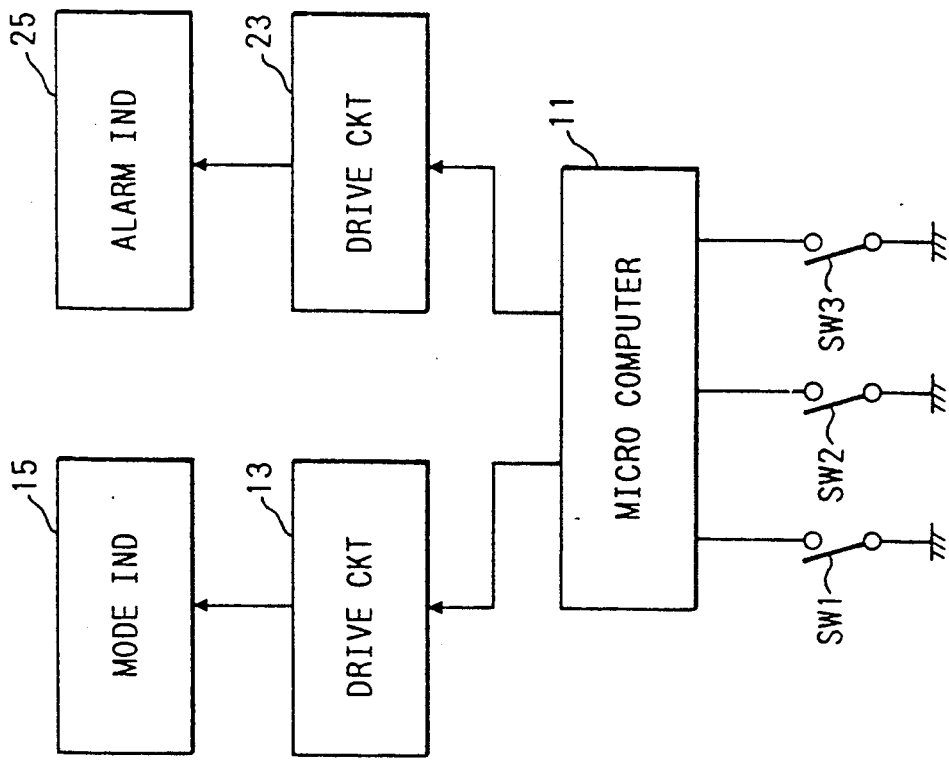
FIG. 1 is a block diagram of the entire structure of a mode setting device for use in a camera, and constituting a first embodiment of the present invention.

Referring to FIG. 1, a microcomputer 11 is connected to a drive circuit 13 for driving a mode indicator 15, and to switches SW1-SW3. The switch SW1 is linked with the selection of operation mode; the switch SW2 is linked with the actuation of a shutter release button; and the switch SW3 is a main power switch. The phototaking operation is not conducted even if the shutter release button SW2 is actuated while the power switch SW3 is turned off. Consequently, for effecting the phototaking operation, said power switch SW3 has to be turned on before the shutter release switch SW2 is actuated.

The camera of the present embodiment, has $I_0$ operation modes for a certain control mode. The control mode is for example exposure control mode or focusing mode, and $I_0=4$ if four operation modes, namely programmed AE mode, shutter-preferential AE mode, diaphragm-preferential AE mode and manual mode can be selected for the exposure control mode. When the power switch SW3 is turned on, the microcomputer 11 selects a predetermined initial set mode out of said $I_0$ operation modes, and other operation modes are thereafter selected in succession by the actuations of the mode selector switch SW1.

The mode indicator 15, composed for example of a liquid crystal display unit or light-emitting diodes, is provided for example on the upper face of the main body of the camera, and the drive circuit 13 causes the mode indicator 15 to display the selected mode in response to a display signal from the microcomputer 11.

In the following there will be explained the control sequence of the microcomputer 11, with reference to flow charts shown in FIGS. 2 to 5.

Figure 3:
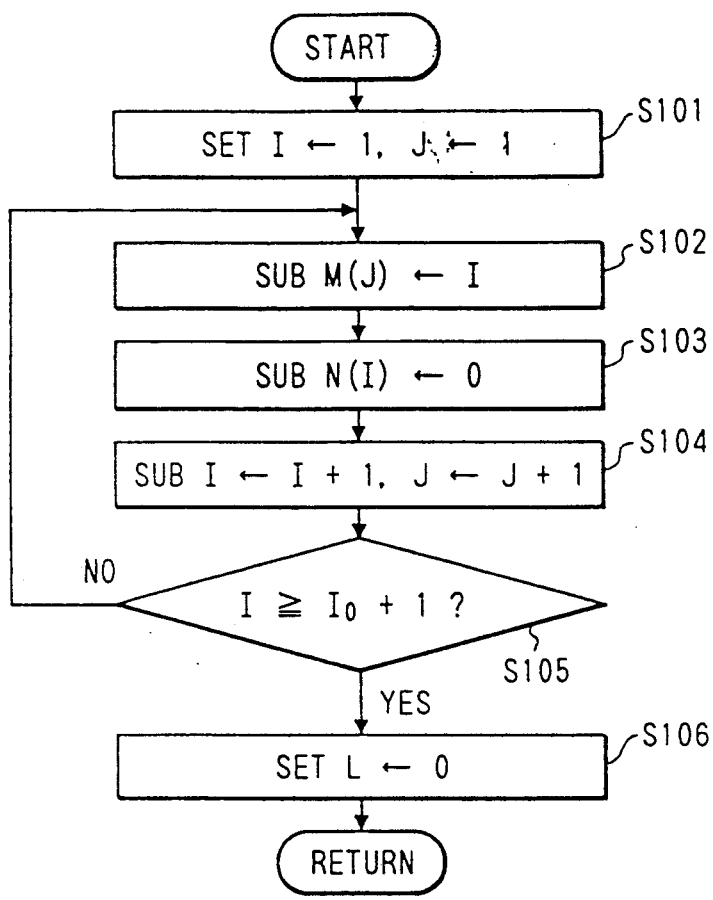

When the battery is loaded in the camera body, a program corresponding to the flow chart shown in FIG. 2 is activated to effect initial resetting. FIG. 3 shows an initial resetting subroutine. A step S101 sets variables I, J at "1". Then a step S102 sets I in a variable M(J), and a step S103 sets a variable N(I) at "0".

The variable M(J) is a parameter indicating the order of frequency of setting in a control mode. If $I_0$ operation modes can be selected for a control mode as explained above, $M(1)-M(I_0)$ are respectively assigned to these operation modes in the descending order of frequency, and the mode M(1) of the highest frequency is defined as the initial set mode. For example, if four operation modes can be selected for the exposure control mode as explained above, there will exist four parameters $M(1)-M(4)$.

The variable I indicates numbers representing different modes. In the above-mentioned example, numbers "1", "2", "3" and "4" are respectively assigned to the program mode, shutter-preferential mode, diaphragm-preferential mode and manual mode, and these numbers are not changed. N(I) is a frequency parameter, representing the number of uses of each mode.

A step S104 increases the variables I, J by "1". Then a step S105 discriminates whether a condition $I \geq I_0 + 1$ is satisfied, and, if not, the sequence returns to the step S102 for repeating the above-explained procedure. If said condition is satisfied, a step S106 sets the total number 1 of use of $I_0$ modes at "0", and the sequence returns to the flow shown in FIG. 2.

The above-explained procedure sets the following initial values:

$M(1)=1, M(2)=2, \ldots, M(I_0)=I_0$;
$N(1)=N(2)= \ldots =N(I_0)=0$;
$L=0$.

Now referring to FIG. 2, a step S2 awaits the closing of the main switch SW3, and a step S3 sets J=1. This is for selecting the mode M(1) of the highest frequency when the power switch SW3 is turned on. Then a step S4 selects the mode I by substituting the variable I with the value of M(J), and a step S5 sends a display signal to the drive circuit 13 for indicating the selection of the mode I on the indicator 15.

Then a step S6 starts the measurement of a predetermined time, and a step S7 discriminates whether the power switch SW3 is still on. If the switch SW3 is off, a step S8 terminates the time measurement and the sequence returns to the step S2. If said switch SW3 is still on, a step S9 discriminates whether the mode selection switch SW1 is on. If the switch SW1 is on, a step S10 terminates the time measurement and a step S11 changes the mode, and then the sequence returns to the step S4.

Figure 4:
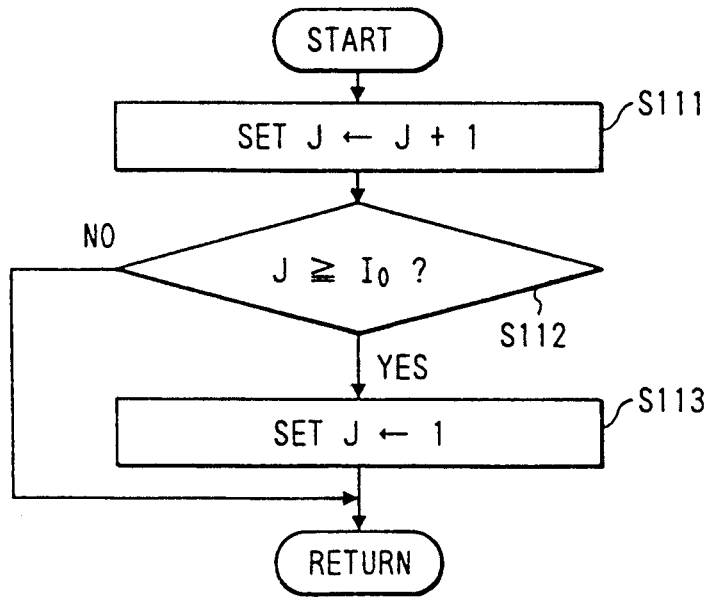

The details of said mode change are shown in FIG. 4. At first a step S111 increases the variable J by "1", and a step S112 discriminates whether a condition $J \geq 1$ is satisfied. If not, the sequence returns to the flow in FIG. 2. If said condition is satisfied, a step S113 sets J at "1", and the sequence returns to the flow in FIG. 2. Thereafter the sequence proceeds to the aforementioned step S4 for setting the mode I by substituting I by the value of M(J).

Thus, in response to the actuation of the mode selection switch SW1, the mode is changed to next one by stepwise increasing the variable J, but, since the number of selectable modes is limited to $I_0$, the variable I is set at "1" again upon exceeding $I_0$, thereby selecting the mode M(1).

On the other hand, if the step S9 identifies that the mode selection switch SW1 is turned off, the sequence proceeds to a step S12 for discriminating whether a predetermined time (8 seconds in the present embodiment) has elapsed from the start of time measurement. If not the sequence returns to the step S7. If said time has elapsed, a step S13 terminates the time measurement and the sequence proceeds to a step S14. The affirmative result in the step S12 indicates that a certain mode has been continuously selected for 8 seconds, and, in the present embodiment, said mode is identified to have been used.

The step S14 effects a step increment of the frequency parameter N(I) indicating the number of uses of the mode I set in the step S4, and a next step S15 effects a stepwise increment of the total number L of uses of the $I_0$ modes. Then a step S16 compares said total number L of uses with a predetermined value $L_0$, and, if $L<L_0$, the sequence returns to the step S4, or if $L \geq L_0$, a step S17 varies the order of mode setting.

Figure 5:
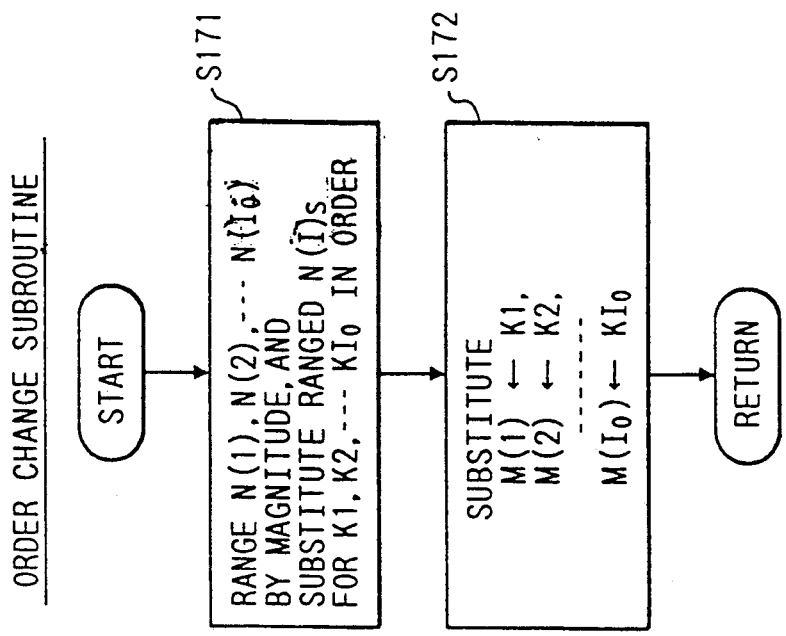

FIG. 5 shows an order changing subroutine, indicating the details of said step S17. At first a step S171 rearranges the frequency parameters N(I), namely N(1), N(2), ..., N($I_0$) in the descending order, and substitutes said variables I in the descending order of the parameters N(I) for variables K1, K2, ..., K$I_0$. Then a step S172 substitutes the variables K1, K2, ..., K$I_0$ for M(1), M(2), ..., M($I_0$), and the sequence returns to the flow in FIG. 2. Thus M(1), M(2), ..., M($I_0$) respectively have mode-indicating numbers in the descending order of frequency, and M(1) is given a number of most frequently selected mode, as the initially set mode.

Subsequently a step S18 in FIG. 2 clears the total number L of uses to "0", and the sequence returns to the step S4 for repeating the above-explained procedure.

In the above-explained procedure, when an operation mode is used a predetermined number $L_0$ of times each in excess of 8 seconds after the loading of battery in the camera, the preferential order of mode setting is automatically changed. Thus, in response to the closing of the power switch SW3, a mode with highest frequency of use is initially selected, and the operating mode is changed in succession in the descending order of frequency, in response to the actuations of the mode selection switch SW1.

As a more specific example, let us consider a camera with four operating modes AE-1, AE-2, AE-3 and AE-4 in the exposure control mode, in which the initial preferential order of setting is AE-1, AE-2, AE-3 and AE-4. If the operator uses the mode AE-3 frequently, and when the total number of uses of all the operating modes reaches a predetermined number, the mode AE-3 is initially selected at the next phototaking operation.

Figure 6B:
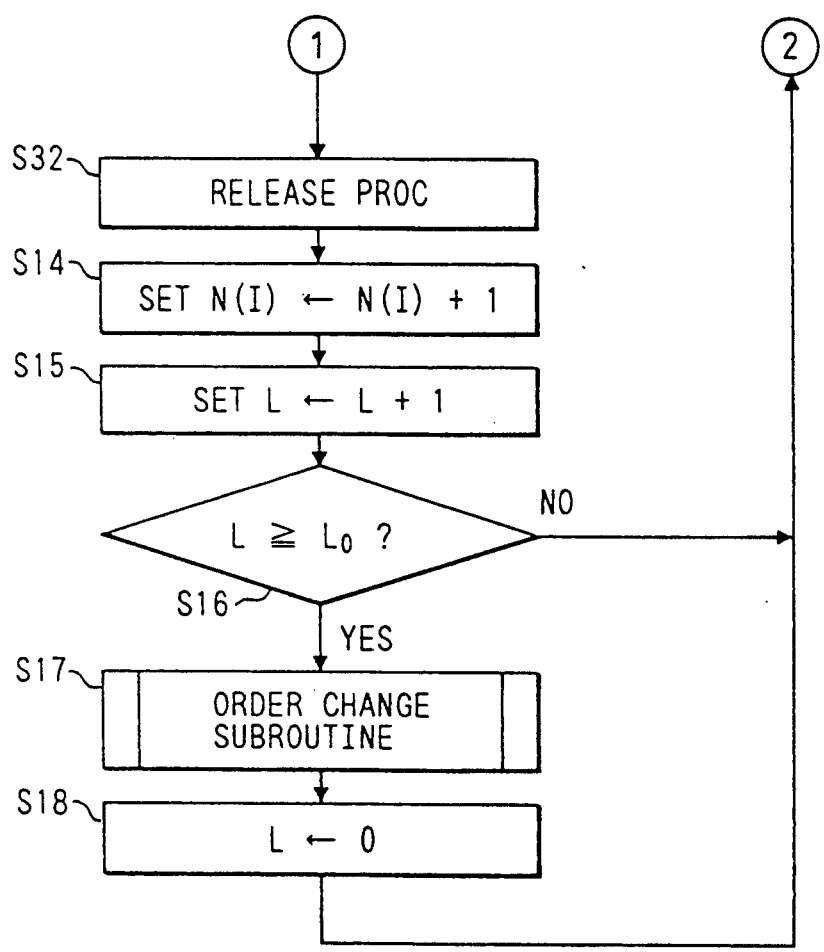

FIG. 6 shows a variation of the foregoing embodiment. In FIG. 6, the use of a mode is identified by the execution of a phototaking operation in said mode, in contrast to the sequence shown in FIG. 2 in which the use of a mode is identified by the lapse of a predetermined time after setting of said mode. In FIG. 6, same steps as those in FIG. 2 are represented by same numbers.

Following description will be given principally on the difference of the sequences. If the step S7 identifies that the power switch SW3 is off, the sequence returns to the step S2. Also if the step S9 identifies that the mode selection switch SW1 is on, the sequence proceeds to the step 11 for mode change. Also if the step S9 identifies that the mode selection switch SW1 is off, the sequence proceeds to a step S31 for discriminating whether the shutter release switch SW2 is on, and, if off, the sequence returns to the step S7 but, if on, the sequence proceeds to a step S32 for effecting the shutter releasing operation, in which the phototaking operation is conducted with unrepresented shutter and diaphragm and the film is advanced by a frame. Thereafter the aforementioned steps S14 to S18 are executed.

In the above-explained embodiment, the order of setting of the operation modes by the actuations of the mode selection switch SW1 after the setting of the most frequent mode by the closing of the power switch SW3 need not necessarily be in the order of frequency.

In the following there will be explained a variation of the control sequence of the present embodiment.

Referring again to FIG. 1, the microcomputer 11 is also connected to a drive circuit 23 for driving an alarm indicator 25, which provides a visual alarm for example with a light-emitting diode or an acoustic alarm for example by a piezoelectric buzzer.

Figure 7B:
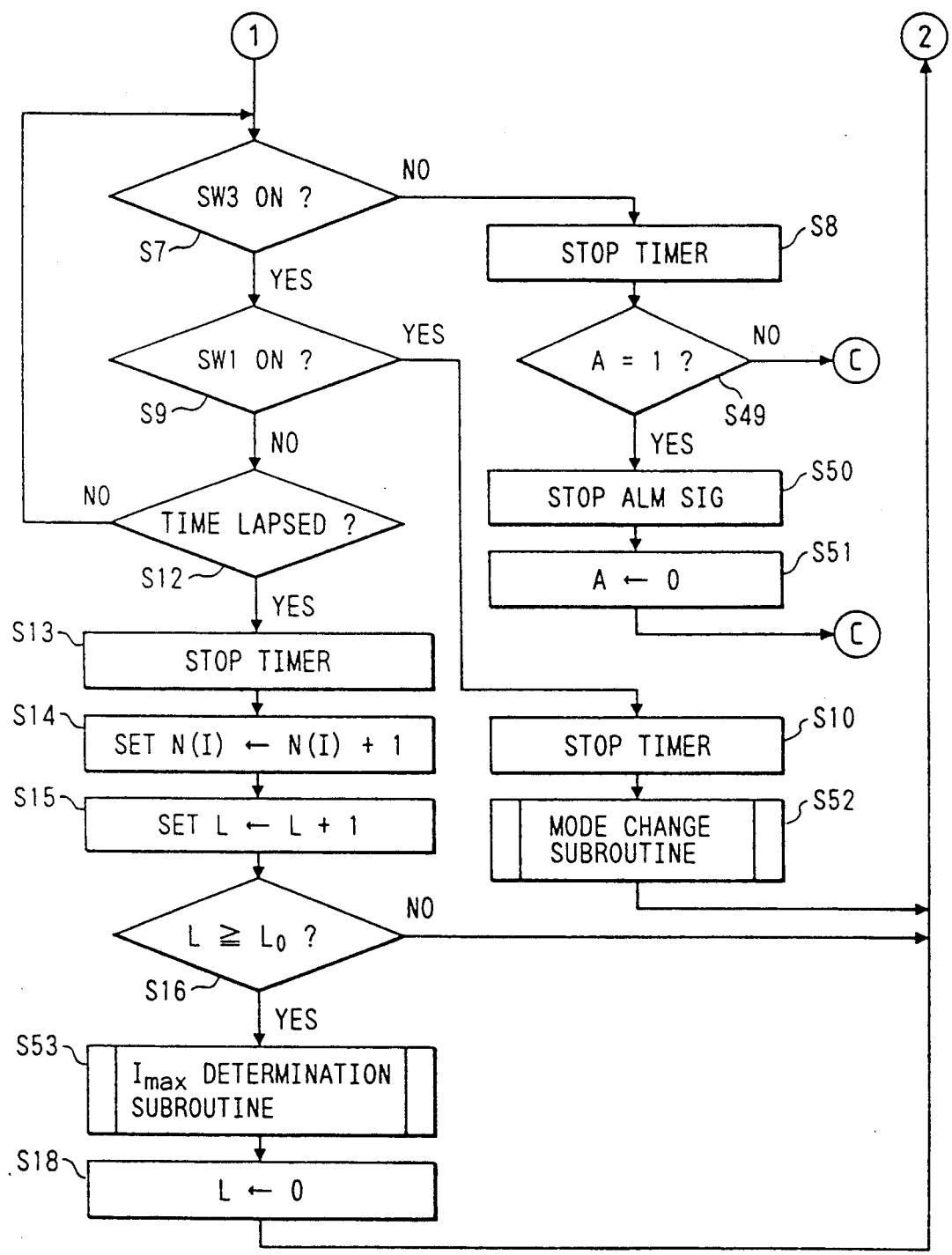

FIG. 7 shows a mode setting sequence utilizing such alarm means, in which same steps as those in FIG. 2 are represented by same numbers.

A program corresponding to FIG. 7 is activated when the camera is loaded with the battery, and at first a step S41 effects initial resetting.

Figure 8:
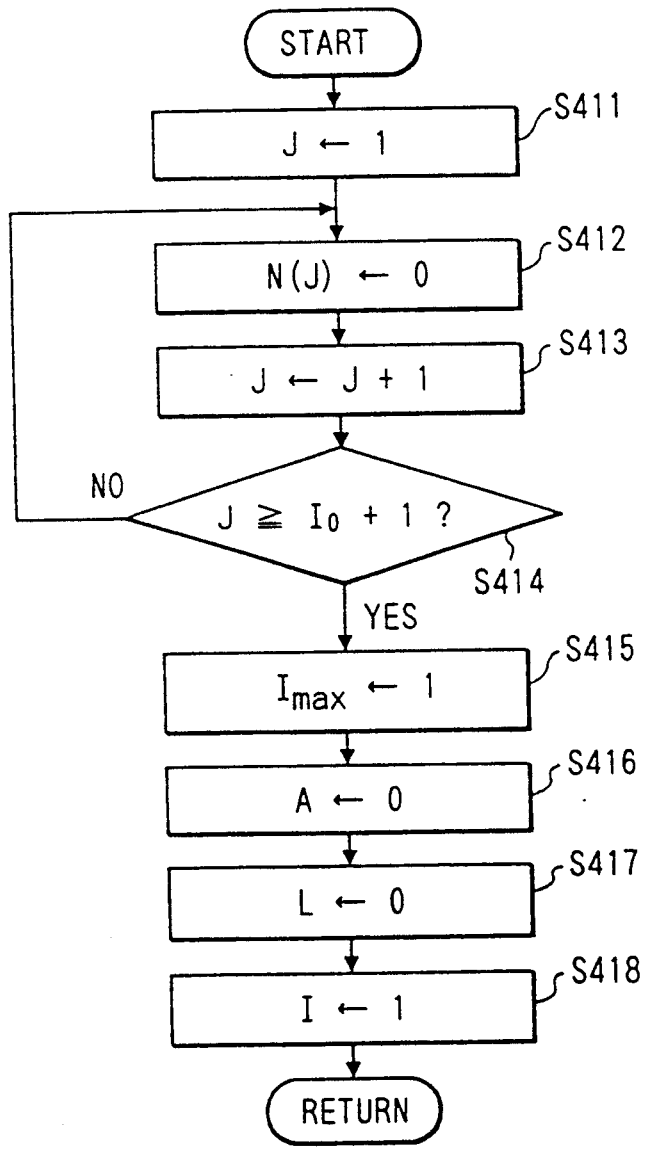

FIG. 8 shows the details of the initial resetting subroutine of the step S41. At first a step S411 sets J at "1", and a step S412 sets the aforementioned frequency parameter N(J) at "0". Then a step S413 effects a stepwise increment of J, and a step S414 discriminates whether a condition $J \geq I_0+1$ is satisfied. If not, the sequence returns to the step S412. If satisfied, the sequence proceeds to a step S415. Thus there are obtained initial reset values:

$$N(1)=N(2)= \ldots =N(I_0)=0.$$

The step S415 selects the most frequent mode $I_{max}$ as "1". Then a step S416 sets an alarm flag A at "0", a step S417 sets the total number L of uses at "0", a step S418 sets the mode-representing variable I at "1", and the sequence returns to the flow in FIG. 7.

The variable I is substituted by numbers I-$I_0$ respectively corresponding to $I_0$ operation modes. In the present embodiment, the order of the modes selected at the closing of the power switch and by the actuations of the switch SW1 remains constant. The alarm flag A is "1" or "0" respectively when the alarm is generated or not.

Referring to FIG. 7, when a step S2 identifies that the power switch SW3 is closed, a step S42 discriminates whether the selected mode I is the most frequently used mode $I_{max}$, and, if not, a step S43 discriminates whether the alarm flag A is "0". If not, the sequence proceeds to a step S5, but, if "0", a step S44 sets said flag at "1" and the sequence proceeds to a step S45 for releasing an alarm signal, whereby the drive circuit 23 causes the alarm indicator 25 to provide alarm. Thereafter the sequence proceeds to a step S5.

On the other hand, if the step S42 identifies that the selected mode I is the most frequent mode $I_{max}$, a step S46 discriminates if A=0. If A=0, indicating the absence of alarm, the sequence proceeds to the step A5. If A=1, indicating the presence S47 terminates the alarm signal, then a step S48 resets the alarm flag A to zero and the sequence proceeds to a step S5. In response to the termination of the alarm signal, the drive circuit 23 causes the alarm indicator 25 to terminate the alarm.

The step S5 sends the display signal to the drive circuit 13, thereby causing the mode indicator 15 to indicate the selection of the mode I. Then a step S6 starts the measurement of a time, for example 8 seconds, as explained before. Then, if a step S7 identifies that the power switch SW3 if off, a step S8 stops the timer and a step S49 discriminates whether the alarm flag A is "1". If the discrimination of the step S49 turns out negative, the sequence returns to the step S2. If said discrimination turns out affirmative, a step S50 terminates the alarm signal, then a step S51 resets the alarm flag A to zero and the sequence returns to the step S2.

In response to the termination of the alarm signal in the step S50, the drive circuit 23 causes the alarm indicator 25 to terminal the alarm indication.

On the other hand, if the discrimination of the step S7 turns out affirmative, the sequence proceeds to a step S9 for discriminating whether the mode selection switch SW1 is on. If off, the sequence proceeds to a step S12 for discriminating whether 8 seconds have elapsed since the start of time measurement. If not, the sequence returns to the step S7 for repeating the above-explained procedure. If the step S9 identifies that the switch SW1 is on, a step S10 stops the timer, and a step S52 varies the mode.

Figure 9:
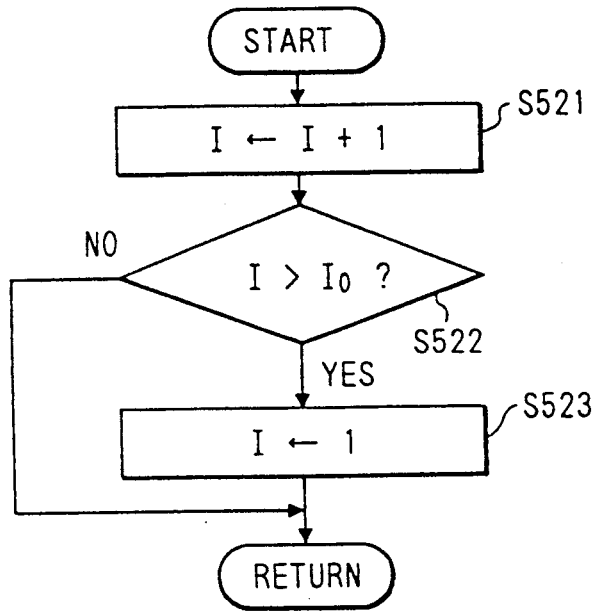

FIG. 9 shows the details of said step S52. At first a step S521 effects a step increment of the variable I, thereby changing the mode 1. Then a step S522 discriminates whether a condition $I > I_0$ is satisfied, wherein $I_0$ is the number of available operation modes. If said condition is not satisfied, the sequence returns to a step S42 in the flow of FIG. 7. If said condition is satisfied, a step S523 sets the variable I at "1", thereby resetting the mode I, and the sequence returns to said flow.

On the other hand, if the step S12 identifies the lapse of 8 seconds, a step S13 stops the timer, then a step S14 effects a stepwise increment of the frequency parameter N(I) indicating the number of uses of the currently selected mode I, and a step S15 effects a stepwise increment of the total number L of use. Then a step S16 discriminates whether said total number L is at least equal to a predetermined value $L_0$, and, if not, the sequence returns to the step S42, or, if affirmative, the sequence proceeds to a step S53 for determining the most frequent mode $I_{max}$.

Figure 10:
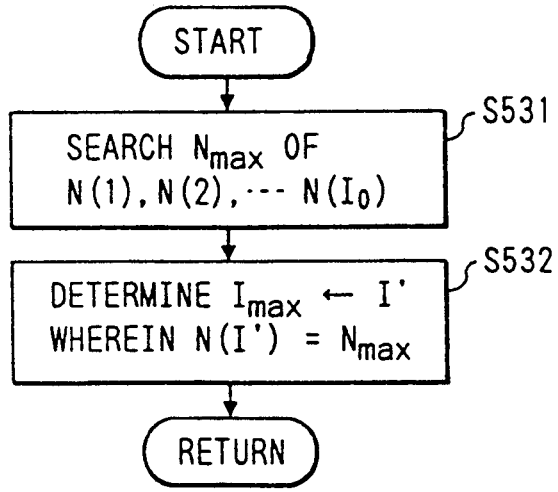

The details of said step S53 are shown in FIG. 10. At first a step S531 determines the maximum value $N_{max}$ among the numbers of uses N(1), N(2), ..., N($I_0$) of the operating modes. Then a step S532 selects a mode I' for which $N(I') = N_{max}$ as the most frequent mode $I_{max}$, and the sequence returns to the flow in FIG. 7. Thus the mode $I_{max}$ is the mode of the highest number of uses.

In the above-explained procedure, after the loading of the battery into the camera, when the operating modes are selected by a predetermined number $L_0$ of times, each for a predetermined time, by the actuations of the switch SW1, there is determined a most frequently used mode. When the power switch SW3 is thereafter turned on, there is selected a mode which is same as previously selected, and there is discriminated whether said mode is the most frequently used mode. If it is not the most frequent mode, there is generated an alarm. Consequently the operator can know that the most frequent mode is not selected, and sets the most frequent mode by manipulating the mode selection switch SW1. The above-mentioned discrimination is conducted each time the mode is changed by the switch SW1, and the alarm is continued if the selected mode is not the most frequent mode. The alarm is terminated when the most frequent mode is selected, or when the power switch SW3 is turned off. The sequence of FIG. 7 may also be modified in such a manner that the use of a mode is identified by a phototaking operation in said mode, as in the sequence shown in FIG. 6, by eliminating the steps S6, S8, S10, S12 and S13 and adding the steps S31 and S32 shown in FIG. 6 after the step S9.

In the foregoing description, the frequency parameters N(I) indicating the numbers of uses of the operating modes are retained even after the change of order of setting, said parameters may be reset to zero after said change, and there may be provided an actuating member for resetting said parameters N(I).

Also instead of the change of order of mode setting after the number of uses of modes has reached a predetermined number, it is also possible to investigate the most frequently used mode at each actuation of the switch SW1, without the use of the above-mentioned predetermined number, and to vary the order of mode setting at each investigation.

In the following there will be explained a 2nd embodiment of the present invention in which the phototaking lens is driven to a focal length frequently used by the operator in response to the closing of the power switch.

Figure 11:
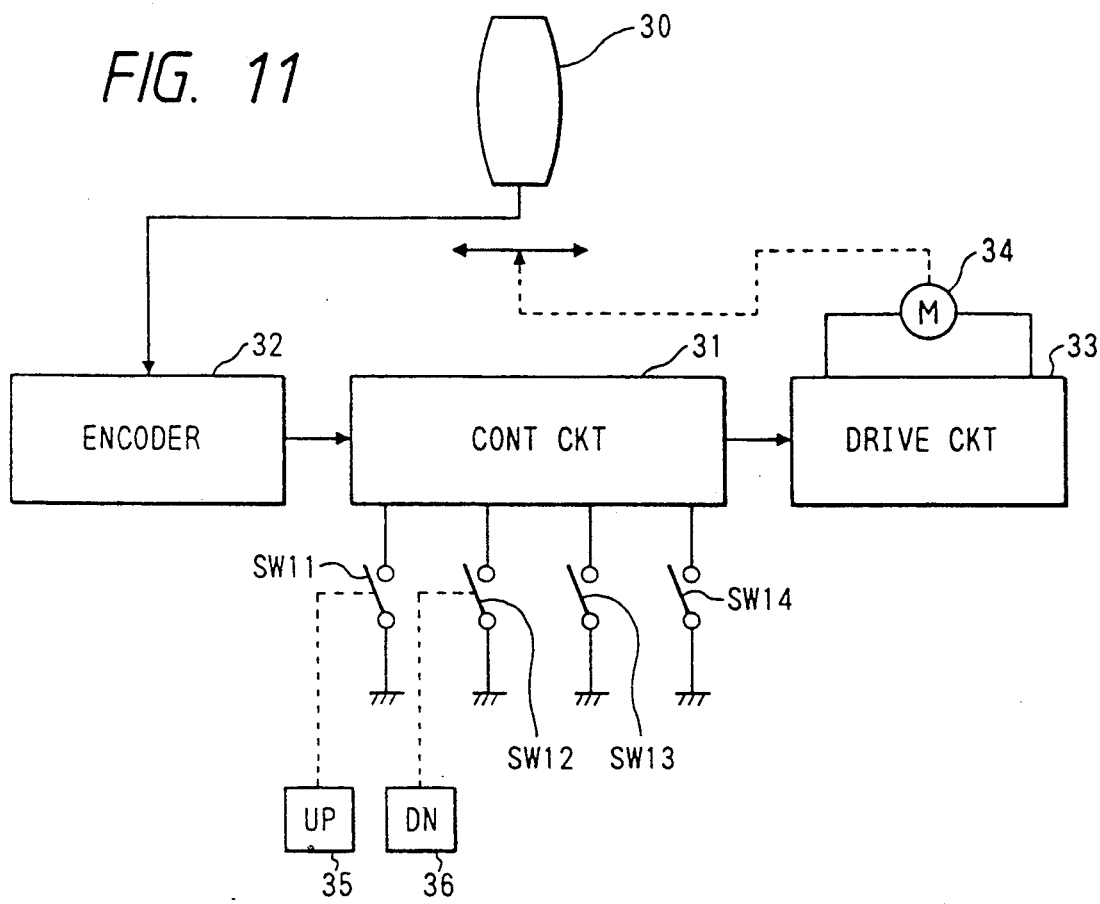
FIG. 11 is a block diagram of a camera constituting a second embodiment of the present invention.
Figure 12:
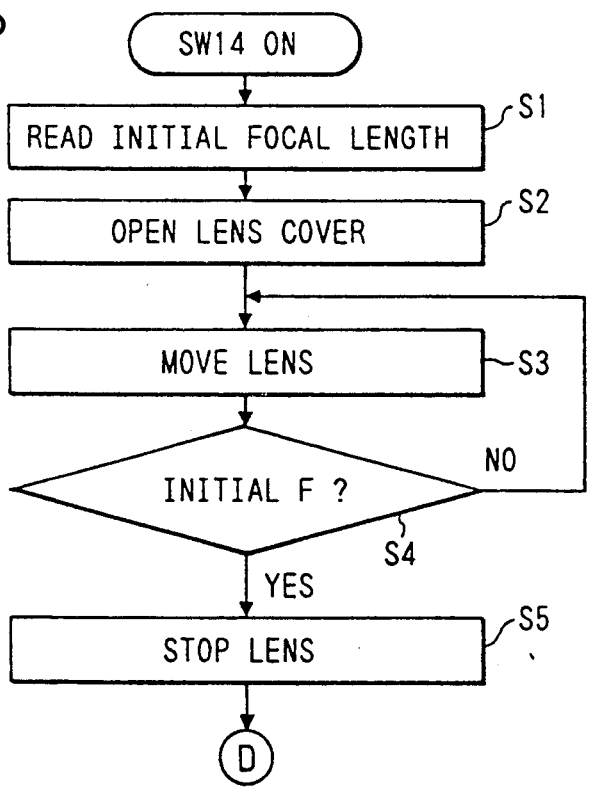
FIGS. 12 to 15 are flow charts showing the control sequences.

Referring to FIG. 11 showing the entire structure, the phototaking lens of the camera is provided with a zoom lens 30 of which focal length is variable within a range of 35-70 mm. A control circuit 31 is provided with an encoder 32 for detecting the focal length of the phototaking lens from the position of the zoom lens; a motor 34 for axially moving the zoom lens; a drive circuit 33 for driving said motor; and switches SW11-SW14. The focal length encoder 32 provides the control circuit 31 with a signal indicating one of ten focal length ranges F(1)-F(10) divided from the wide angle end to the telephoto end, in which the current focal length of the phototaking lens belongs.

The switches SW11, SW12 are respectively closed in response to the actuation of a zoom-up button 35 and a zoom-down button 36, and the control circuit 31 sends a zoom-up signal or a zoom-down signal to the drive circuit 33 respectively when the switch SW11 or SW12 is closed. In response to said zoom-up or zoom-down signal, the drive circuit 33 drives the motor 34 to move the phototaking lens, thereby varying the focal length to the telephotoside or wide angle side and effecting a zoom-up or zoom-down operation.

The switch SW13 is closed in response to the actuation of the shutter release button, whereby the control circuit 31 drives exposure control devices such as diaphragm and shutter, thus effecting a phototaking operation.

The power switch SW14 is provided for rendering the camera capable of phototaking operation, and the switches SW11-SW13 are disabled while said power switch SW14 is turned off. When the power switch SW14 is turned on, a lens cover positioned in front of the phototaking lens is opened by a known mechanism, then the phototaking lens in a reset position is advanced to an initial position capable of phototaking operation, and the zooming or phototaking operation is thereafter rendered possible in response to the actuations of the switches SW11-SW13.

The initial focal length of the phototaking lens at said initial position is set at 35 mm at the wide angle end when the camera is manufactured, but is subsequently varied depending on the state of use of the camera.

In the following there will be explained the control sequence of the control circuit 31, with reference to flow charts shown in FIGS. 12-15.

A corresponding program is activated by the closing of the power switch SW14. At first a step S1 in FIG. 12 reads the memorized initial focal length, then a step S2 opens the lens cover, and a step S3 drives the motor 34 through the drive circuit 33, thereby zooming the phototaking lens up toward the initial focal length. Then, when a step S4 identifies that said initial focal length is reached, a step S5 stops the phototaking lens.

Figure 13:
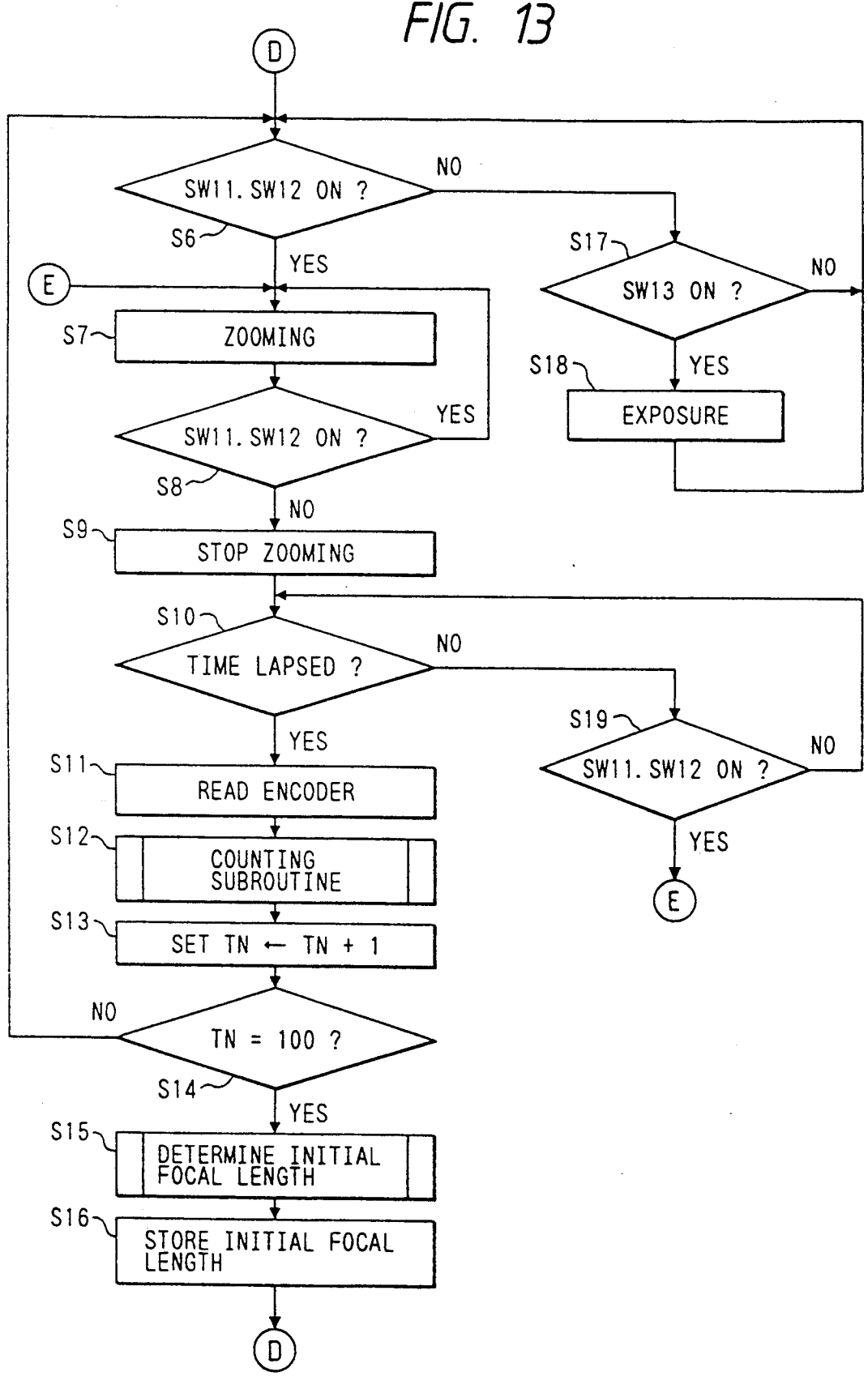

Then the sequence proceeds to a step S6 in FIG. 13, thereby discriminating whether the zoom switch SW11 or SW12 is turned on, and, if both switches are off, a step S17 discriminates whether the shutter release switch SW13 is turned on. If the switch SW13 is off, the sequence returns to the step S6. If said switch is on, a step S18 drives unrepresented shutter and diaphragm thereby effecting the phototaking operation, and the sequence thereafter returns to the step S6.

If the step S6 identifies that either of the zoom switches SW11, SW12 is turned on, the sequence proceeds to a step S7 for effecting a zooming operation according to the closed switch. More specifically, if the switch SW11 or SW12 is turned on, a zoom-up or zoom-down signal is sent to the drive circuit 33, which in response drives the phototaking lens by the motor 34. Then a step S8 discriminates whether the switch SW11 or SW12 is still on, and, if on, the sequence returns to the step S7 for continuing the zooming operation, or, if off, a step S9 stops the zooming and the sequence proceeds to a step S10.

The step S10 discriminates whether 8 seconds have elapsed since the termination of zooming, and, if not, a step S19 discriminates the state of the zoom switches SW11, SW12. If either of said switches SW11, SW12 is on, the sequence returns to the step S7, but, if both switches are turned off, the sequence returns to the step S10. On the other hand, if the step S10 identifies the lapse of 8 seconds, namely if the focal length has been constant for 8 seconds, the sequence proceeds to a step S11. In the present embodiment, when the phototaking lens is maintained at a focal length for a period of 8 seconds, the lens is defined to have been set in a focal length range including said focal length.

Figure 14:
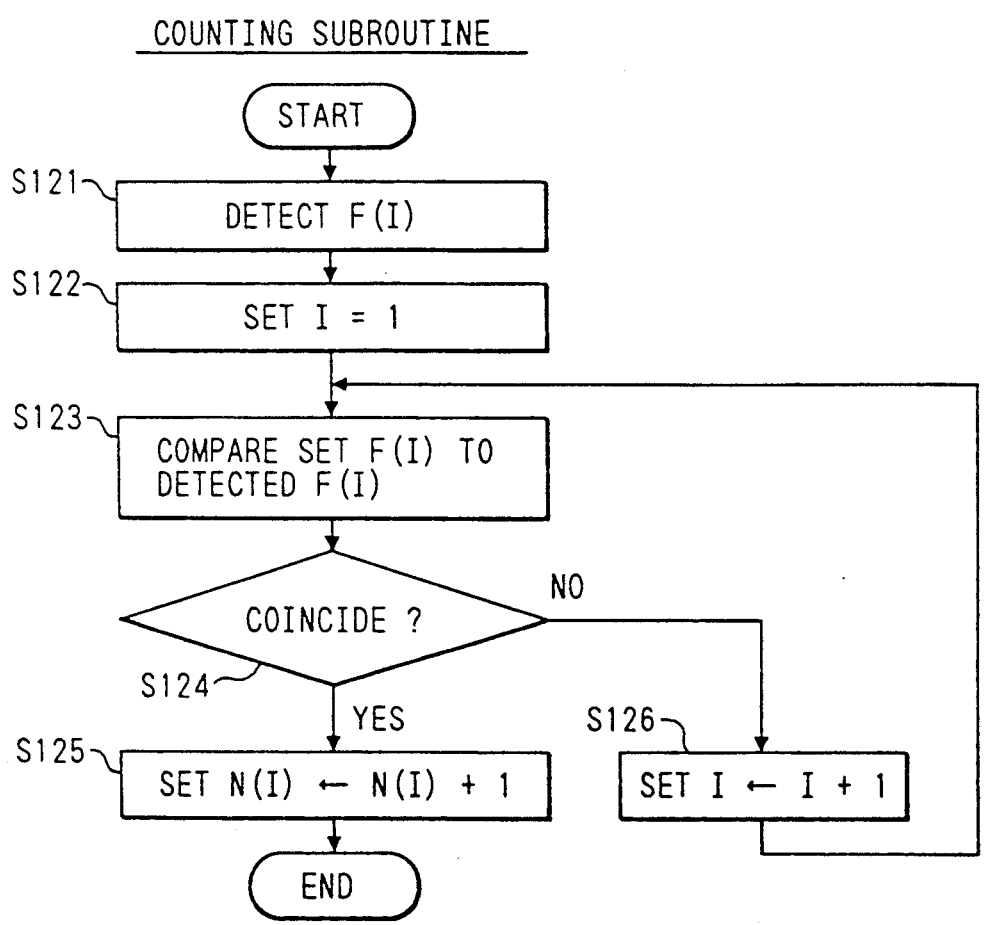

The step S11 fetches the output signal of the encoder 32, and a counting subroutine S12, of which details are shown in FIG. 14, counts the number of settings of the phototaking lens in the current focal length range, based on said fetched signal.

Referring to FIG. 14, a step S121 determines one of the aforementioned focal length ranges F(1)-F(10) in which the current focal length of the phototaking lens belongs, based on the signal from the encoder 32, and a step S122 sets the variable at "1". Then a step S123 compares the focal length range F(1) with the focal length range obtained in the step S121. If both ranges are not same, a step S126 advances the variable I by "1" and the sequence returns to the step S123 for repeating the above-explained procedure. On the other hand, if both ranges are same, a step S125 advances the number N(I) of settings by "1" and the sequence proceeds to a step S13 in FIG. 13.

The control circuit 31 stores variables N(1)-N(10) respectively indicating the numbers of settings in the focal length ranges F(1)-F(10), and the above-explained procedure counts the number of settings of the phototaking lens in each focal length range. In the foregoing description, the focal length range determined by the output signal of the focal length encoder 32 is compared with the focal length ranges F(1)-F(10) and the count corresponding to a matching focal length range is increased by "1". However, the focal length range including the focal length of the phototaking lens can be identified from the output of the encoder 32, so that the count corresponding to said focal length range may be increased at the generation of said signal.

The step S13 effects a step increment of a total number count TN indicating the total number of settings of the phototaking lens in the above-mentioned focal length ranges, and a step S14 discriminates whether said count has reached a predetermined value (100). If not, the sequence returns to the step S6, but, if said value is not reached, the count TN is reset to zero and the sequence proceeds to a step S15 for determining the initial focal length based on the numbers of settings obtained in the step S12.

Figure 15:
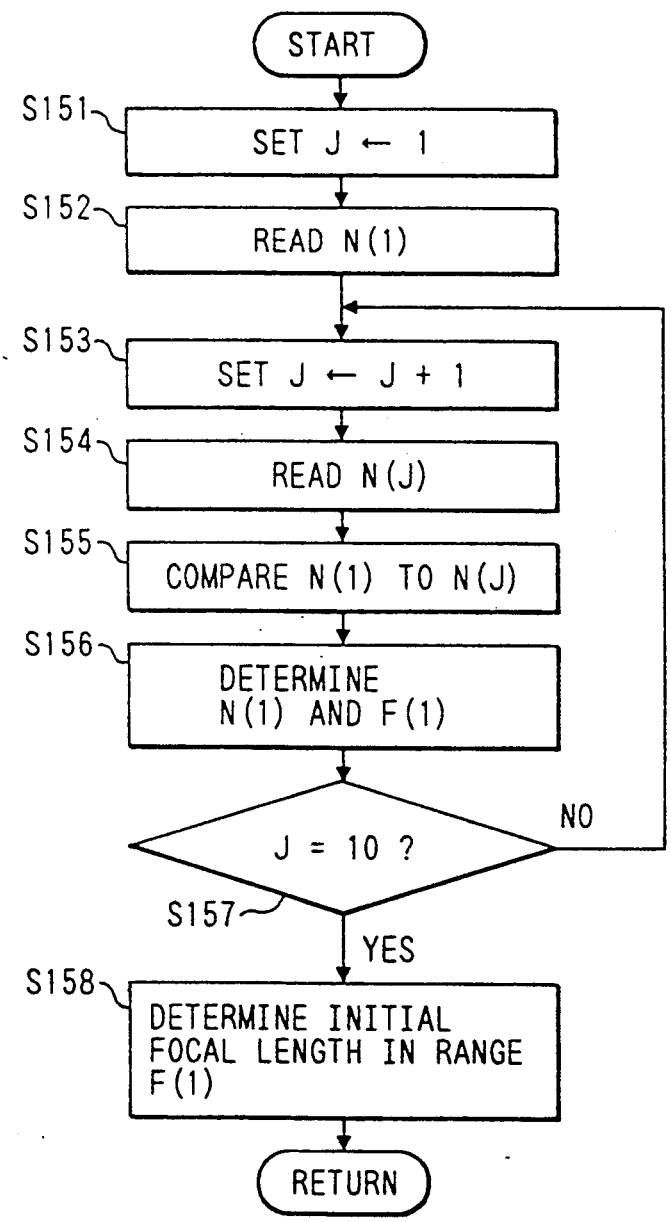

The details of said step S15 are shown in FIG. 15. At first a step S151 sets J=1, then a step S152 reads the number N(1) of settings of the focal length range F(1), a step S153 then increases J by "1", a step S154 reads the number N(J) of settings of the focal length range F(J), a step S155 compares the magnitude of N(1) and N(J), and a step S156 defines the larger one as N(1) anew and defines the corresponding focal length range as F(1) anew.

Then a step S157 discriminates whether J=10, namely whether the comparison has been completed for all the focal length ranges, and, if completed, a step S158 selects a focal length included in the focal length range F(1), for example the smallest focal length in said range, as a new initial focal length.

Thereafter the sequence proceeds to a step S16 in FIG. 13, for memorizing the initial focal length determined in the step S15, and then returns to the step S6. This sequence is terminated by the opening of the power switch SW14.

In the above-explained sequence, the phototaking lens is defined to have been set at a focal length when said focal length is maintained for 8 seconds after the change of focal length by the zooming switches SW11, SW12, and the count corresponding to a focal length range including the above-mentioned focal length is increased (step S12). After such focal length setting is conducted by a predetermined number of times, a most frequently set focal length range is selected, and a predetermined focal length within said most frequent range is selected as the initial focal length (step S15). Said initial focal length is stored in the control circuit 31, and the phototaking lens is driven to said initial focal length when the power switch SW14 is thereafter turned on.

Consequently, for example if a focal length at the telephoto side is frequently used, such focal length at the telephoto side is automatically selected as the initial focal length, to which the phototaking lens is driven each time the power switch is turned on. It is therefore made possible to dispense with the zooming operation and to improve the operability of the camera at phototaking, so that the operator is less inclined to lose the opportunity of phototaking. If a focal length of the wide angle side becomes frequently used thereafter, the initial focal length is automatically shifted to the wide angle side by the above-explained procedure.

Figure 16:
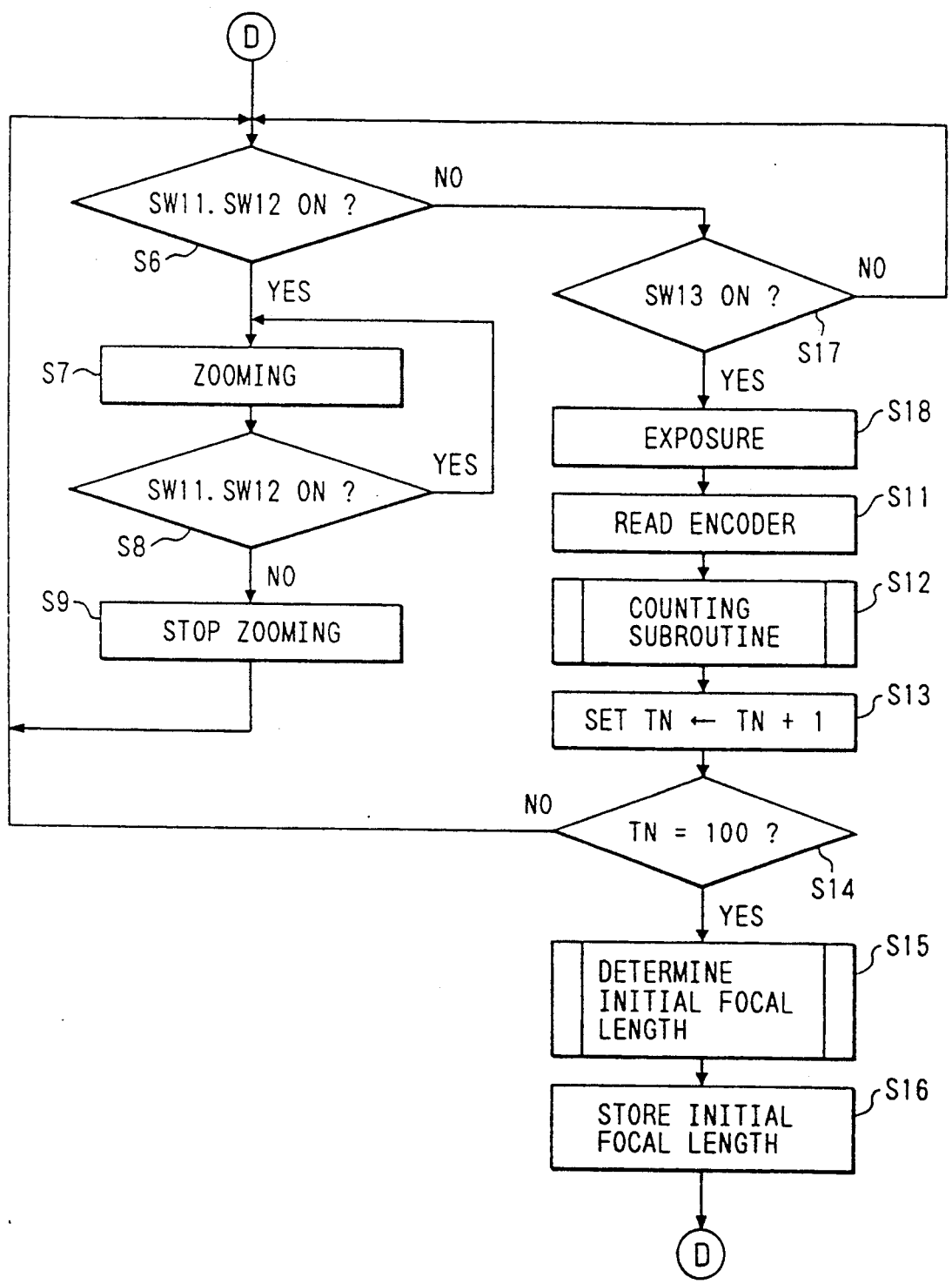
FIGS. 16 to 18 are flow charts showing variations of the control sequences.

FIG. 16 shows a variation of the sequence in which the setting of the phototaking lens in a focal length range is identified by the execution of a phototaking operation at a focal length in said range, wherein same steps as those in FIG. 13 are represented by same numbers.

In the following there will be principally explained the difference from the sequence shown in FIG. 13. After the zooming is terminated in the step S9, the sequence returns to the step S6 to repeat the sequence of the steps S6–S9. Also when the step S17 identifies that the shutter release switch SW13 is turned on, the phototaking operation is conducted in the step S18, and the steps S11–S16 are thereafter executed.

In the above-explained procedure, the phototaking lens is identified to have been set at a focal length when a phototaking operation is executed at said focal length, and one of the counts N(1)–N(10) is stepswise increased. Consequently a focal length frequently used by the operator can be selected as the initial focal length.

Figure 17:
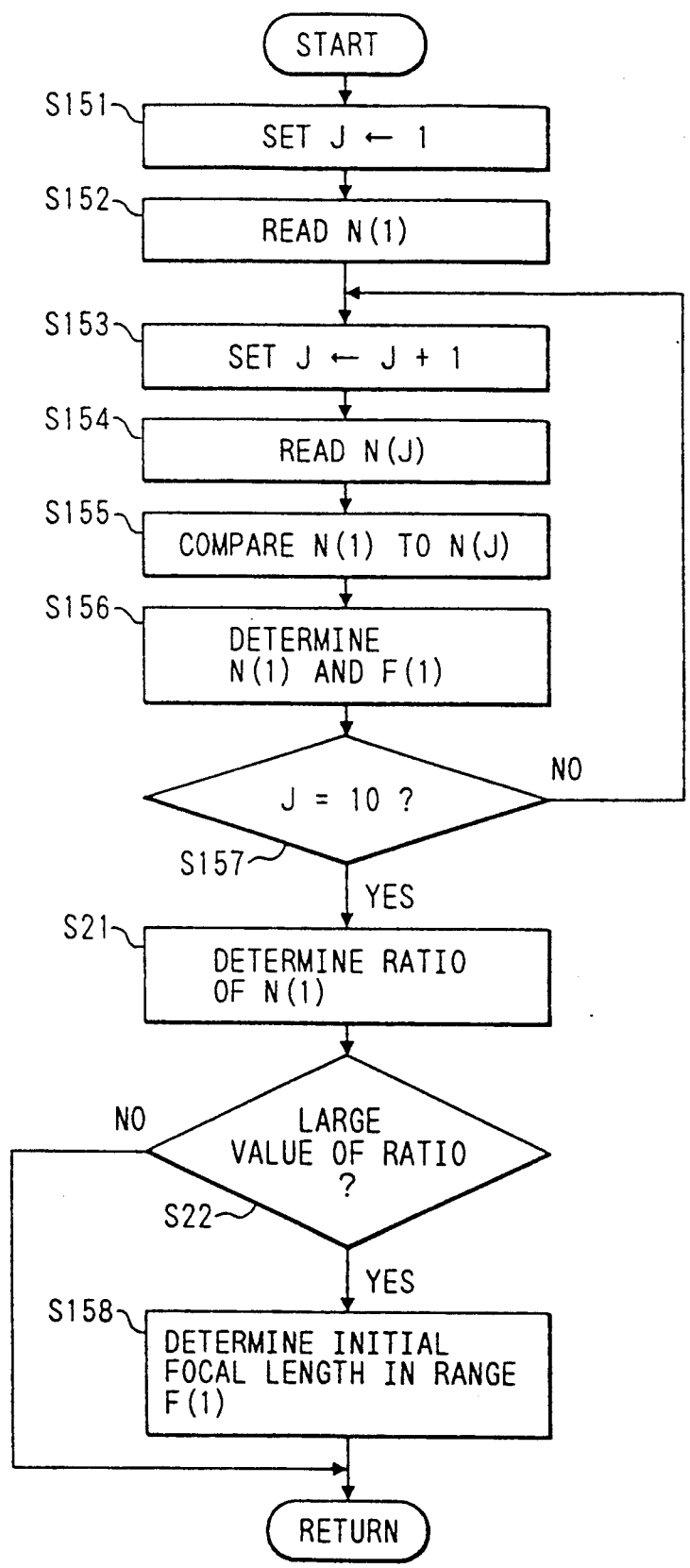

FIG. 17 shows another variation in which steps S21, S22 are added to the sequence shown in FIG. 15. Thus, when the discrimination of the step S157 turns out affirmative, the step S21 calculates the ratio of the most frequent count N(1) to the total number of settings. Then the step S22 discriminates whether thus calculated ratio is at least equal to a predetermined value, and, if not, the sequence returns to the main flow, but, if the discrimination turns out affirmative, the step S158 sets the initial focal length as explained above.

In this sequence, if the number N(1) of settings does not reach the predetermined ratio, namely if the focal length ranges are selected in averaged manner, the initial focal length is not changed because the focal length range of highest count is not necessarily used frequently.

In the foregoing embodiment there is employed a zoom lens, but the present invention is also applicable to a multiple focal length lens capable of phototaking at plural focal lengths. In such case there are not defined the aforementioned focal length ranges, and the number of settings can be counted for each of selectable focal lengths.

Also in the foregoing description the initial focal length is determined according to the numbers of settings of the focal length ranges when the total number of settings of the phototaking lens reaches a predetermined number, but the present invention is not limited to such embodiment. For example the initial focal length may be determined at the end of phototaking of a film roll. For example it is possible to start the counting of numbers of settings of the focal length ranges after film loading, and to determine the initial focal length based on the obtained counts when said film is removed. In such case the film loading may be identified by the entry of the film information from a DX code provided on the film cartridge, and the film removal is identified by the opening of the rear cover of the camera.

Otherwise, instead of setting the initial focal length when the number of settings reaches a predetermined number, it is also possible to constantly monitor the numbers of settings of the focal length ranges and to select the most frequently used focal length as the initial focal length.

Furthermore, there may be provided a function for cancelling the initial focal length or the past count, in preparation for a case in which the operator does not like the initial focal length determined as explained above, or in which the camera is rented to another person.

Figure 18:
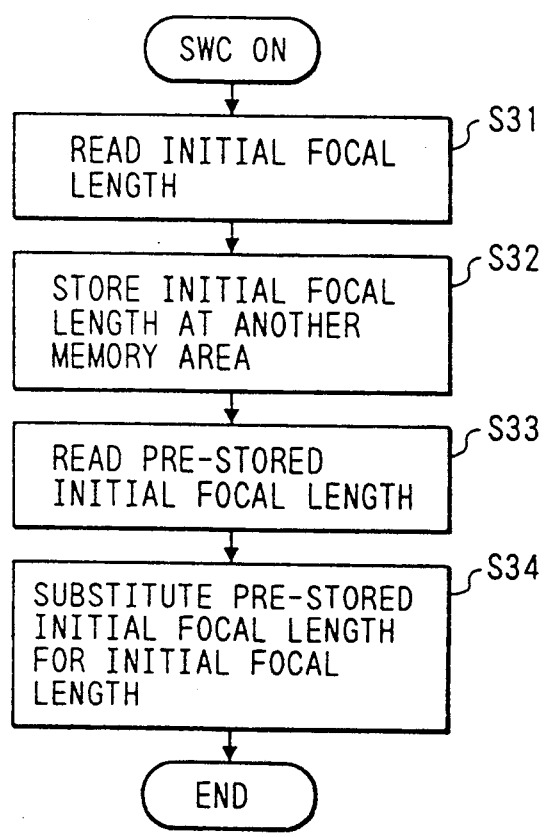

FIG. 18 shows a sequence for temporarily suspending the determined initial focal length.

This sequence is activated when an unrepresented calcel switch SWC is turned on. At first a step S31 reads the current initial focal length, and a step S32 stores said initial focal length in another memory area. Then a step S33 reads an initial focal length (for example 35 mm) memorized in the camera at the manufacture thereof, and a step S34 selects said memorized initial focal length as the initial focal length to be used from next time. If the switch SWC is closed again in this state, the step S32 selects the focal length stored in another memory area as the initial focal length to be used from the next time. This sequence temporarily saves the initial focal length and is convenient for example when the camera is rented to another person.

Also the switch SWC may be so constructed as to completely cancel the initial focal length.

In the following there will be explained a 3rd embodiment of the mode setting device of the present invention, applied to constant magnification phototaking (image size phototaking).

In said image size phototaking, the focal length of the lens is regulated in relation to the object distance in such a manner that the object is recorded with a constant size (constant magnification) regardless of the object distance. Prior to the shutter releasing operation, the focal length of the zoom lens is determined in such a manner that the object is photographed with a magnification corresponding to a predetermined object size (for example a waist shot size or a bust shot size) based on the object distance determined by a range finder, and the phototaking operation is conducted by regulating the zoom lens at said focal length.

Some of the cameras capable of such image size phototaking are designed to be capable of selecting plural magnifications at the image size phototaking in the following manner. For example, immediately after the closing of the power switch, an ordinary phototaking mode is initially selected. If a magnification selection button is actuated once in this state, there is selected the image size phototaking mode is selected, and one of the phototaking magnifications is selected. Thereafter the phototaking magnifications are varied in succession by the actuations of said magnification selection button, and, the actuation of said button while the last phototaking magnification is selected cancels the image size phototaking mode and restores the ordinary phototaking mode. Also a display, indicating the selected phototaking magnification, is provided for example in the view finder.

Figure 19:
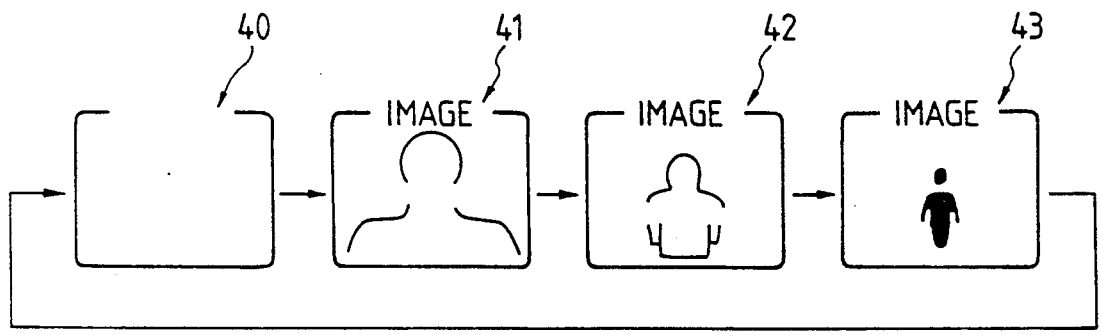

FIG. 19 shows an example of such display. In this example, a display 40 is given for the ordinary phototaking mode. A display 41 is given in response to an actuation of the magnification selection button, and then the display changes in the order of 42, 43 and 40 in response to the repeated actuations of said button.

If the order of setting of the phototaking magnifications is fixed as explained above, the operator is required to conduct a cumbersome procedure for setting the magnification which he frequently utilizes, if such magnification is not initially set.

Consequently, the camera of the present embodiment is so constructed to automatically set a frequently used phototaking magnification, without a particular operation for selection of magnification, when the image size mode is selected.

Figure 20:
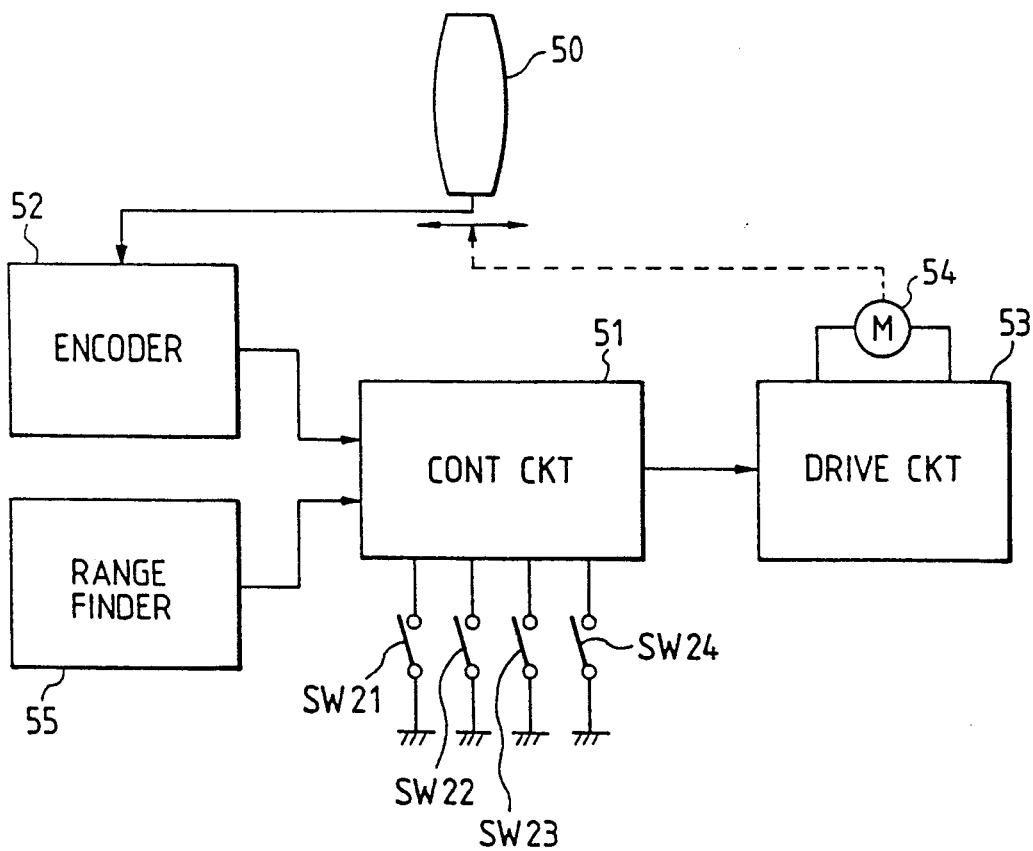
FIG. 20 is a block diagram of a constant image magnification control device for use in a camera and constituting a third embodiment of the present invention.

Referring to FIG. 20, a control circuit 51 is connected to an encoder 52 for detecting the focal length of a phototaking lens 50; a drive circuit 53 for driving a motor 54; a range finder circuit 55; and switches SW21-SW24. The range finder 55 detects the distance to the object by emitting infrared light toward the object and receiving the reflected light in a known active range finding method, and supplies the control circuit 51 with the result of said distance detection. The detected object distance is used for calculating the lens drive amount for moving a focusing optical system of the phototaking lens 50 to the in-focus position, and also for calculating the focal length in the image size phototaking operation as will be explained later.

The control circuit 51 sends a zooming signal to the drive circuit 53, in response to the manipulation of an unrepresented zooming button.

The switches SW21, SW22 are linked with an unrepresented shutter releasing button, and are respectively turned on by the depression of said shutter release button over a first stroke and a second stroke. In response to the closing of the switch SW21, the control circuit 51 activates said range finder 55 to obtain the object distance. Then in response to the closing of the switch SW22, the control circuit 51 drives the phototaking lens 50 to the in-focus position corresponding to said object distance, and executes the phototaking operation by driving unrepresented shutter and diaphragm.

The mode change switch SW23 is turned on in response to a magnification selecting operation, whereby the control circuit 51 sets the image size mode or varies the phototaking magnification. In the image size mode of the present embodiment, there can be selected a bust shot size for recording the chest and head of the object person, a waist shot size for recording the upper half of the body of the object person, or a full shot size for recording the entire body of the object person. The selected size is displayed in the view finder as shown in FIG. 21, in which, 40 indicates the ordinary phototaking mode, while 41-43 respectively indicate the bust shot size, waist shot size and full shot size in the image size mode.

When the switch SW23 is actuated once in the ordinary phototaking mode, there is selected the image size mode and one of three phototaking magnifications corresponding to the above-mentioned object sizes is initially set. Said magnification is varied in succession by subsequent actuations of the switch SW23.

Also in the present embodiment there is provided a position detecting switch SW24, for varying the magnification in the image size phototaking, depending on the position of the camera. Said switch is composed of a glass tube having contacts and a mercury drop therein, and is so constructed as to be turned on by the contact of the mercury drop with the contacts when the camera is held horizontally, but to be turned off when the camera is held vertically.

For example, in FIG. 22A, in a horizontally oblong image frame 51 with the full shot size, a phototaking magnification is selected so that the head and the lateral parts of the object 52 are accommodated in the image frame. If the camera is changed to the vertical position without change in the phototaking magnification, there will result an unnecessary space in the upper part of the image frame 53 as shown in FIG. 22B. In the present embodiment, therefore, a larger magnification is selected for the vertical position of the camera than in the horizontal position, thereby eliminating said unnecessary space as shown in the image frame 55 in FIG. 22C.

In the following there will be explained the control sequence of the control circuit, with reference to FIGS. 23 to 27.

Figure 23:
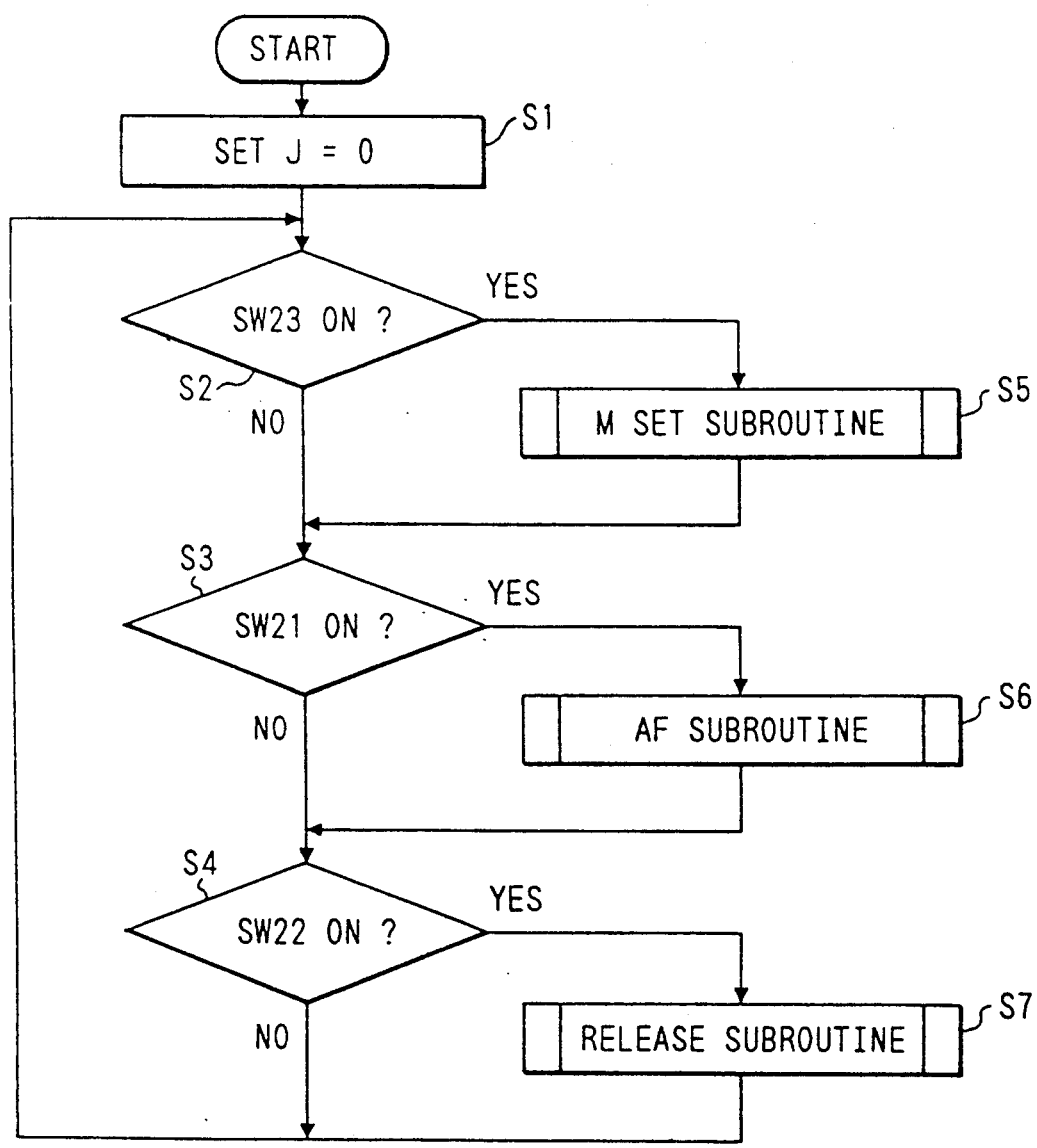
FIGS. 23 to 27 are flow charts showing control sequences.

A program corresponding to the sequence shown in FIG. 23 is activated by the closing an unrepresented power switch. At first a step S1 sets a variable J at "0". Said variable J determines the phototaking magnification in the image size mode, and J=0 indicates the ordinary phototaking mode without the image size phototaking. Thus, in the present embodiment, the ordinary phototaking mode is always selected immediately after the closing of the power switch.

Then a step S2 discriminates whether the magnification selection switch SW23 is on, and, if not, a step S3 discriminates whether the switch SW21 is on. If not, a step S4 discriminates whether the switch SW22 is on.

When the mode change switch SW23 is turned on in this state, the step S2 gives an affirmative result whereby the sequence proceeds to a magnification setting subroutine of step S5.

Figure 24:
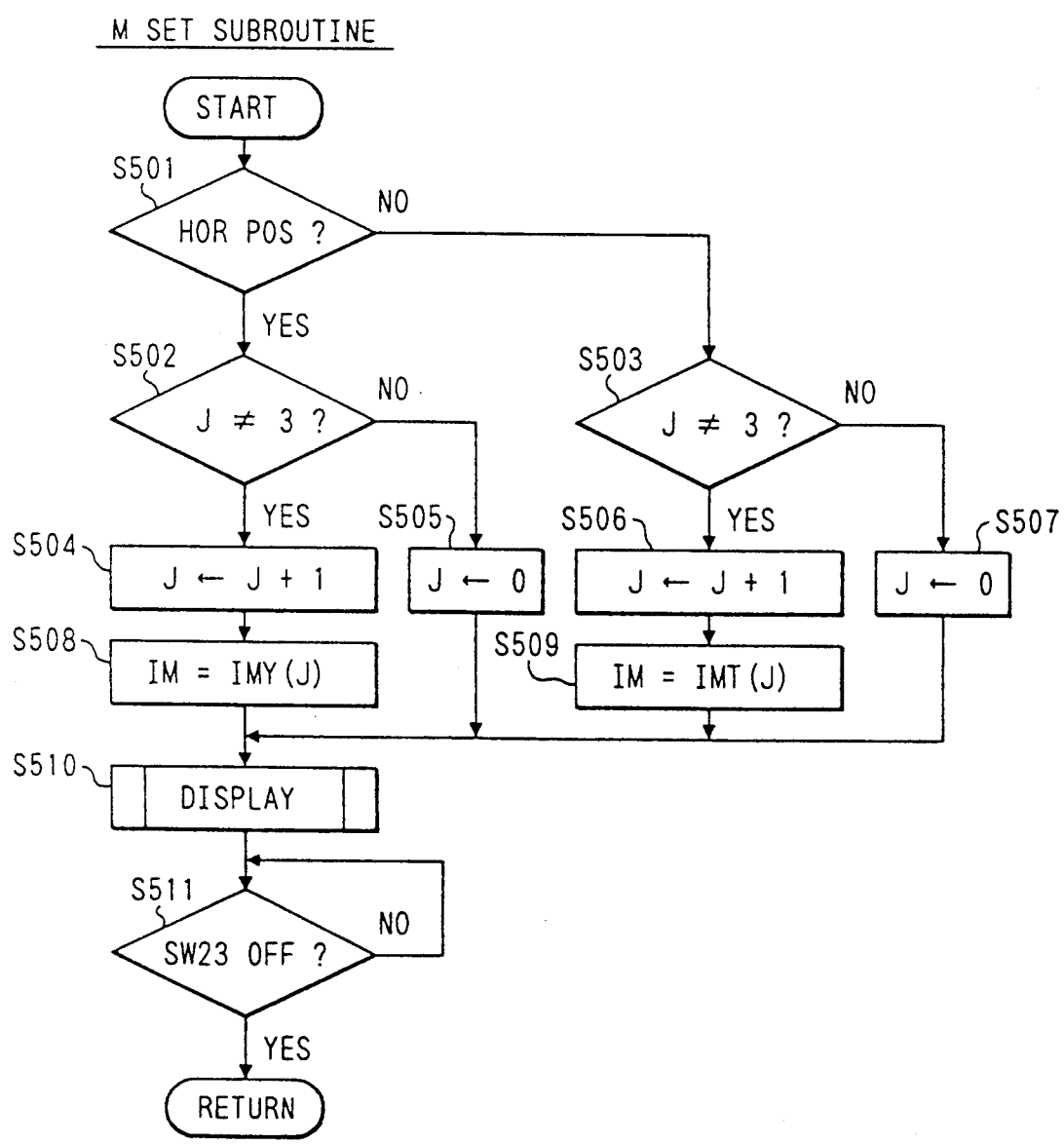

Referring to FIG. 24, a step S501 discriminates whether the camera is in the horizontal or vertical position based on the state of the switch SW24, and, if in the horizontal position, a step S502 discriminates whether J=3. Said variable J indicates the order of setting of object sizes by the actuations of the switch SW23, and assumes integral values 0-3, in which J=0 indicates that the image size phototaking is not conducted as explained above.

If the step S502 identifies J≠3, a step S504 effects a step increment of the variable J, then a step S508 sets a condition IM=IMY(J), and the sequence proceeds to a step S510. The IMY(J) is the phototaking magnification in the image size phototaking in the horizontal camera position, and IMY(1)-IMY(3) represent three different magnifications in the descending order of frequency of use as will be explained later. Thus IMY(1) is the most frequently used magnification, which is defined as the initial phototaking magnification. Also the variable IM is the phototaking magnification used for the current image size phototaking.

On the other hand, if the step S502 identifies J=3, a step S505 sets J=0 and the sequence proceeds to the step S510.

On the other hand, if the step S501 provides a negative result, indicating that the camera is in the vertical position, steps S503, S505 and S507 execute a process similar to that of the aforementioned steps S502, S504 and S505, then a step S509 sets IM=IMT(J) and the sequence proceeds to the step S510. The IMT(J) is the phototaking magnification in the image size mode in the vertical camera position, and IMT(1)–IMT(3) represent three different magnifications in the descending order of frequency of use as in the horizontal camera position. Thus IMT(1) is the most frequently used magnification, defined as the initial phototaking magnification.

In the above-explained sequence, the variable J is in succession substituted by values 0–3 in response to the actuations of the switch SW23, and J=0 is restored by the actuation of the switch SW23 in a state J=3. A step S508 or S509 is executed when J≠0. A shift of J from "0" to "1" is defined as the setting of the image size mode; a shift of J from "3" to "0" is defined as the cancellation of the image size mode; and the execution of said step S508 or S509 is defined as the setting of the phototaking magnification.

The step S510 effects a display corresponding to the set magnification in the view finder. Then a step S511 discriminates whether the switch SW23 is still on, and, if on, the sequence awaits the opening of said switch, and, if off, the sequence proceeds to a step S3 in FIG. 23.

When the step S3 identifies that the switch SW21 is on, the sequence proceeds to an AF subroutine in a step S6.

Figure 25:
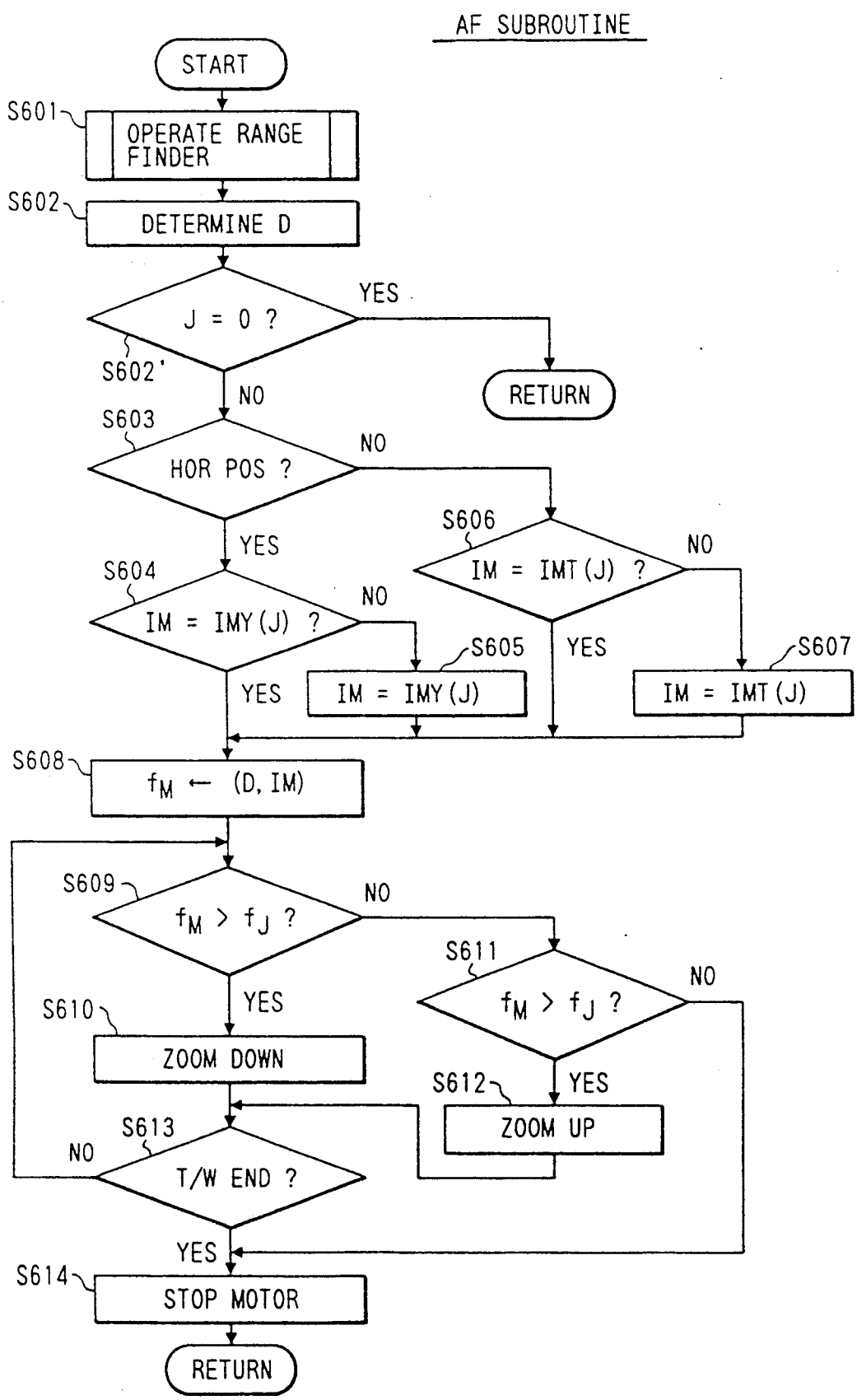

Referring to FIG. 25, a step S601 activates the range finder circuit 55, then a step S602 calculates the object distance D from the output of said range finder 55, and a step S602' discriminates whether J=0. If J=0 indicating that the image size mode is released, the sequence returns to the flow in FIG. 23, but J≠0 indicating that the image size mode has been set, the sequence proceeds to a step S603 for discriminating the position of the camera. If the camera is in the horizontal position, a step S604 discriminates whether IM=IMY(J).

Negative discrimination in the step S604 means that the camera has been changed from the vertical position to the horizontal position after the procedure in FIG. 24, namely after the opening of the mode change switch SW23. In this case a step S605 sets IM=IMY(J) and the sequence proceeds to a step S608. On the other hand, in case of positive discrimination in the step S604, the sequence proceeds directly to the step S608.

On the other hand, if the step S603 identifies the vertical camera position, a step S606 discriminates whether IM=IMT(J), and, if affirmative, the sequence proceeds to the step S608. In case of negative discrimination, indicating that the camera is changed from the horizontal position to the vertical position after the switch SW23 is turned off, a step S607 sets IM=IMT(J) and the sequence proceeds to the step S608.

The step S608 calculates, based on the object distance D calculated in the step S602 and the magnification IM determined in one of the steps S508, S509, S605 and S607, the focal length of the phototaking lens enabling phototaking with said magnification. Thus calculated focal length will hereinafter be called target focal length $f_M$.

Then a step S609 compares the target focal length $f_M$ with the current focal length $f_J$ detected by the encoder 52, and, if $f_M > f_J$, a step S610 sends a zoom-down signal to the drive circuit 53, whereby the phototaking lens 50 is zoomed down. If the step S609 provides negative result, a step S611 discriminates whether $f_M < f_J$, and, if so, a zoom-up signal is sent to the drive circuit 53 thereby effecting a zoom-up operation. If the step S611 provides negative result, namely if $f_M = f_J$, the sequence proceeds without zooming to a step S614 thereby terminating the zooming.

After the step S610 or S612, the sequence proceeds to a step S613 for discriminating whether the phototaking lens is positioned at the telephoto end or the wide angle end, and, if not, the sequence returns to the step S609 for repeating the above-explained sequence. On the other hand, if the telephoto lens is at either end position, a step S614 stops the motor and the sequence then proceeds to a step S4 in FIG. 23.

In the above-explained sequence, when the switch SW21 is turned on, and if the image size mode is selected, the target focal length $f_M$ is calculated from the selected phototaking magnification and the detected object distance D (step S608), and the phototaking lens is so driven as to reach said target focal length $f_M$. In the present embodiment, the focal length of the phototaking lens corresponds to image angle information, and the setting of image angle information means the driving of the phototaking lens to a predetermined focal length.

If the step S602' identifies J=0 indicating the ordinary phototaking mode, the sequence returns to the main flow without zooming operation.

Also if the step S4 in FIG. 23 identifies that the switch SW22 is on, the sequence proceeds to a release subroutine in a step S7.

Figure 26:
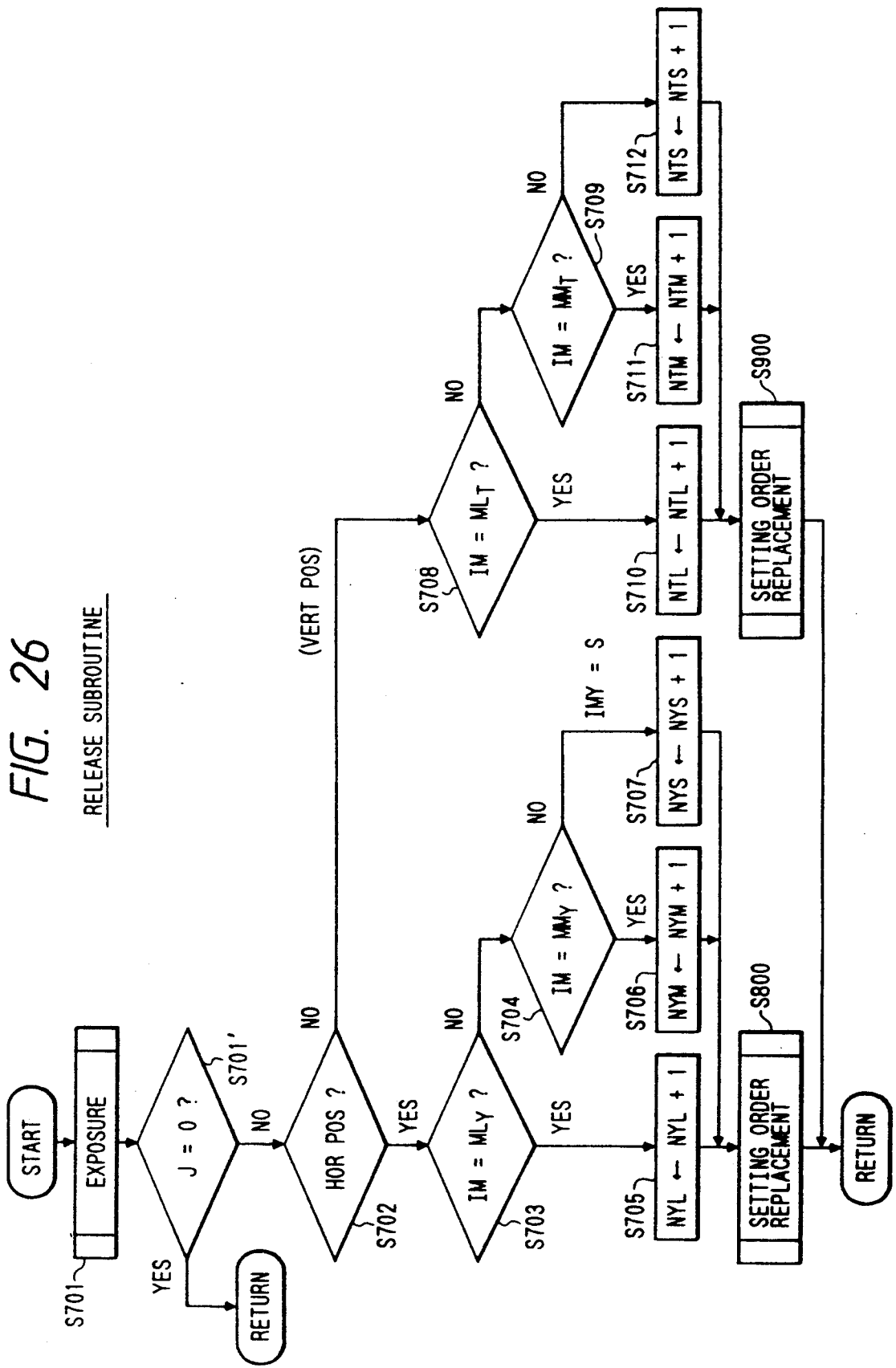

Referring to FIG. 26, at first a step S701 executes an exposure operation. More specifically, the lens drive amount, required for moving the phototaking lens to the in-focus position is calculated from the object distance determined in the step S602, and the phototaking lens is accordingly driven to the in-focus position by an unrepresented focusing motor. Subsequently an exposure control circuit drives the shutter and the diaphragm to effect the exposure. Then a step S701' discriminates whether J=0, and the sequence returns to the flow in FIG. 23 or proceeds to a step S702 respectively in case of J=0 or J≠b 0.

The step S702 discriminates the camera position from the state of the switch SW24. If the horizontal position is identified, a step S703 discriminates whether the phototaking magnification IM (IMY(J)) is the largest one of three available magnifications, namely the magnification $ML_Y$ corresponding to the bust shot size. If so, a step S705 effects a step increment of the count NYL indicating the number of phototaking operations with said magnification $ML_Y$, and the sequence proceeds to a step S800.

If the discrimination of the step S703 turns out negative, a step S704 discriminates whether the magnification IM (IMY(J)) is the intermediate magnification $MM_Y$ corresponding to the waist shot size. If affirmative, a step S706 effects a step increment of the count NYM indicating the number of uses of said magnification $MM_Y$, and the sequence proceeds to the step S800.

In case the discrimination of the step S704 turns out negative, namely if the magnification IM (IMY(J)) is the smallest magnification $MS_Y$ corresponding to the full shot size, a step S707 effects a step increment of the count NYS indicating the number of uses of said magnification $MS_Y$, and the sequence proceeds to the step S800.

The step S800 changes the order of setting of the magnifications IMY(J) based on the counts NYL, NYM, NYS corresponding to the above-mentioned magnifications.

Figure 27:
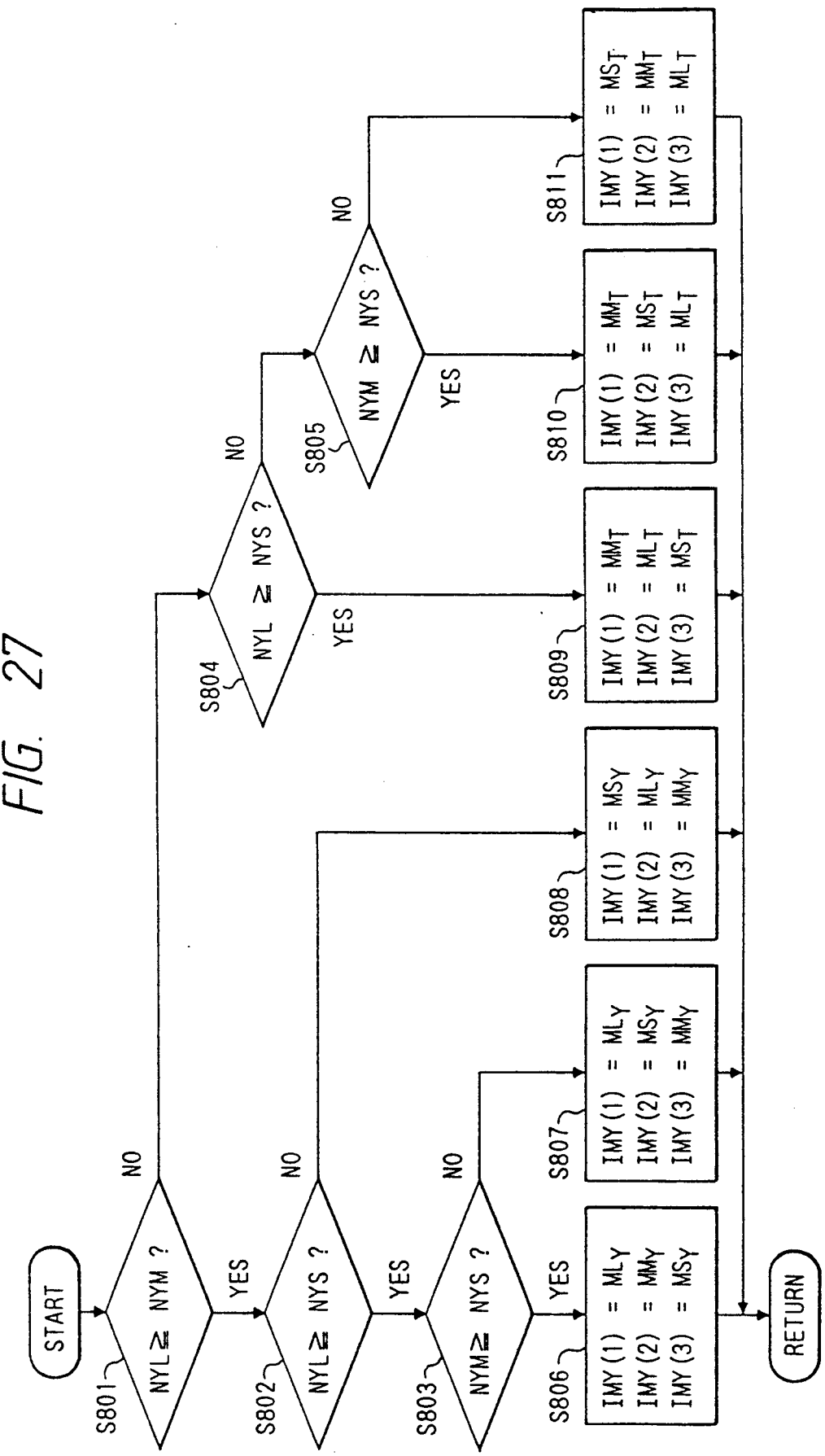

The details of the step S800 are shown in FIG. 27. At first a step S801 discriminates whether $NYL \geq NYM$, and, if affirmative, a step S802 discriminates whether $NYL \geq NYS$. If affirmative, a step S803 discriminates whether $NYM \geq NYS$, and, if affirmative again, the sequence proceeds to a step S806. Affirmative results in all the steps S801–S803 indicate a relation $NYL \geq NYM \geq NYS$, whereby the step S806 sets the most frequently used magnification $ML_Y$ as the magnification $IMY(1)$, the next frequently used magnification $MM_Y$ as $IMY(2)$, and the least frequently used magnification $MS_Y$ as $IMY(3)$. Thus the most frequently used magnification $ML_Y$ is selected as the initial phototaking magnification.

On the other hand, if the discrimination of the step S802 turns out negative, or if that of the step S803 turns out negative, the sequence respectively proceeds to a step S808 or S807 for setting the magnifications for $IMY(1)$–$IMY(3)$ as shown in FIG. 27. Also if the discrimination of the step S801 turns out negative, the sequence proceeds to comparison steps S804 and S805, and, depending on the results of said comparisons, one of steps S809–S811 is executed to set the magnifications as $IMY(1)$–$IMY(3)$ as shown in FIG. 27.

As explained in the foregoing, the sequence shown in FIG. 27 sets the magnifications for the horizontal camera position in the image size mode, in the descending order of frequency of uses, as $IMY(1)$–$INY(3)$.

On the other hand, if the step S702 in FIG. 26 identifies that the camera is in the vertical position, the sequence proceeds to steps S708, S709, and, depending on the results of discriminations in these steps, one of steps S710–S712 effects a step increment of the count NLT, NLM or NLS respectively indicating the number of uses of the vertical-position magnification $ML_Y$, $MM_Y$ or $MS_Y$. Then a step S900 effects a procedure similar to that of FIG. 27, thereby setting the vertical-position magnifications $ML_Y$, $MM_Y$ and $MS_Y$ in the descending order of frequency, as $IMT(1)$–$IMT(3)$. After the step S800 or S900, the sequence returns to the flow in FIG. 23.

The above-mentioned variables are stored in a memory of the control circuit 51 even after the power switch is turned off.

In the above-explained sequence, when a phototaking operation is conducted in the image size mode, the count of the uses of the magnification used in said phototaking operation is increased by "1", and the magnifications are rearranged and stored in the descending order of number of uses. Subsequently, when the power switch is turned on and the mode change switch SW23 is actuated once, there is set the image size mode, and the most frequently used magnification is set as the initial phototaking magnification, with a corresponding display in the view finder.

If the switch SW23 is turned on in this state, there is set the next frequently used magnification, and in response to another actuation of the switch SW23, there is set the least frequent magnification.

In the example of display shown in FIG. 21, there is initially selected the magnification corresponding to the full shot size, indicating that the operator of the camera uses such magnification for the full shot size in the image size mode. Therefore, in effecting the phototaking operation in the image size mode, the magnification corresponding to the full shot size can be immediately set by turning on the power switch and the switch SW23. Thus the operator can execute the phototaking operation in the image size mode, without cumbersome operations and can avoid the loss of chances of phototaking.

Also if the operator uses, for example, the bust shot size frequently afterwards, the magnification corresponding to the bust shot size is selected as the initially set magnification.

In the foregoing description, the initial magnification is set by the first closing of the switch SW23, and the magnifications are rearranged in the descending order of frequency of uses in response to the subsequent actuation of said switch SW23. However, as long as the initial magnification is set by the first closing of said switch SW23, the order of setting of the magnifications in response to the subsequent actuation of the switch SW23 need not necessarily be in the order of frequency.

Also the use of a magnification is defined by the phototaking operation with said magnification, but it may also be defined by the selection of said magnification for a predetermined period, regardless of presence or absence of the phototaking operation. Also the determination of the initial magnification may be made, not at each use of a magnification, but when the total number of uses of the magnifications reaches a predetermined value.

Furthermore, the setting of the image size mode and the change of the phototaking magnification may be conducted by separate switches instead of the switch SW23. Also the number and the magnitudes of the available magnifications are not limited to those explained in the foregoing.

Furthermore, in the foregoing description, the image angle in the image size mode is determined by the zooming of the phototaking lens, but the image angle may be varied also by a change in the trimming magnification for example in a camera capable of trimmed phototaking. In such case, the trimming magnification corresponds to the image angle information.

In the foregoing description, the numbers of uses of the magnifications are counted, and the most frequently used magnification is selected as the initial magnification when the switch SW23 is actuated while the image size mode is not set. However, it is also possible to count the number of ordinary phototaking operations in addition to the number of uses of the magnifications, and to set a most frequently used phototaking mode (ordinary mode or image size mode with a magnification) at the closing of the power switch. In this case, in response to the closing of the power switch, the image size mode is selected if the number of image size phototaking operations with a certain magnification is largest, but the ordinary phototaking mode is selected if the number of ordinary phototaking operations is largest.

In printing the image obtained in the image size mode, the phototaking magnification has to be selected somewhat smaller, in order to avoid loss of a part of the object in the framed print. For this reason there is already known a camera capable of image size phototaking, allowing to correct the phototaking magnification after the lens drive. In such camera, after the zoom lens is driven to a focal length providing a predetermined magnification, the focal length can be modified to correct the magnification. Subsequently the phototaking operation is conducted with thus corrected magnification, by means of the shutter release button.

In the following there will be explained a 4th embodiment applied to such camera, for automatic setting of a desired magnification at the image size phototaking operation.

Figure 28:
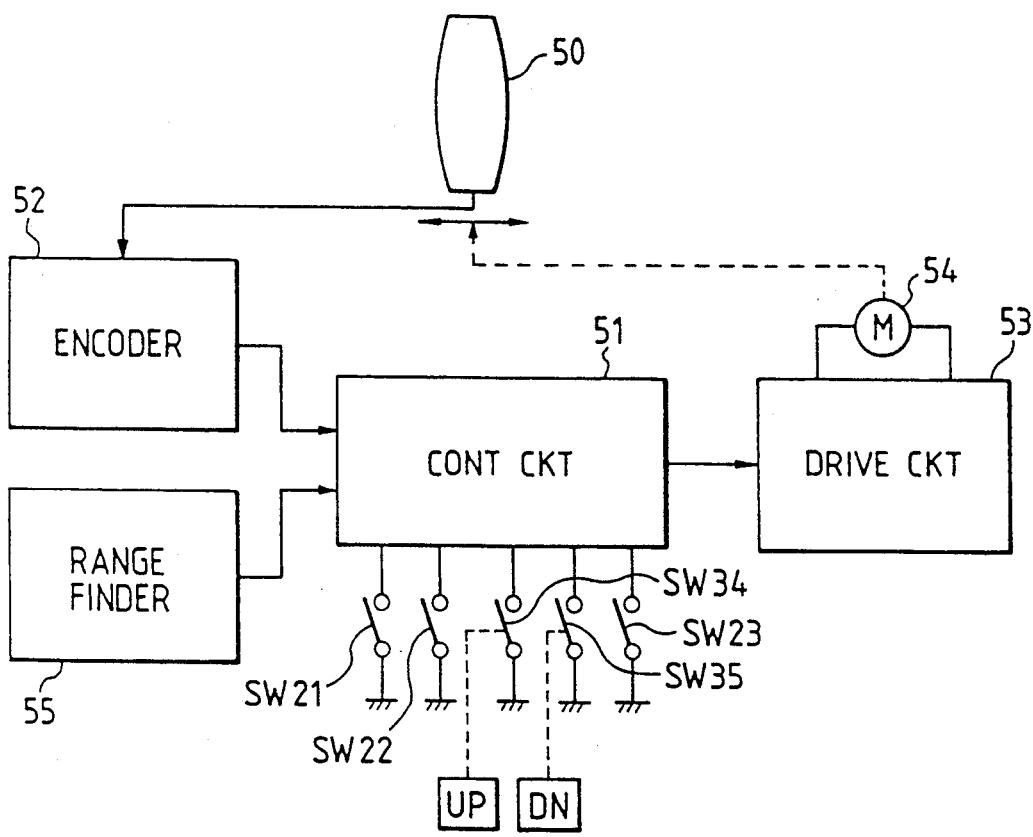
FIG. 28 is a block diagram of a camera constituting a fourth embodiment of the present invention.

FIG. 28 shows the entire structure, which is identical with that of the 3rd embodiment shown in FIG. 20, except that the switch SW24 is replaced by switches SW34, SW35.

Said switches SW34, SW35 are zoom switches to be closed in relation to the manipulation of a zooming button, and the control circuit 51 releases a zoom-up signal or a zoom-down signal respectively in response to the closing of the switch SW34 or SW35.

The drive circuit 53 drives the motor 54 in response to said zoom-up or zoom-down signal, thereby varying the focal length of the phototaking lens toward the telephoto side or toward the wide angle side.

In the present embodiment, there can be selected magnifications A, B respectively corresponding to two object sizes, by the mode change switch SW23. When said switch SW23 is closed once in the ordinary phototaking mode, there is set the image size mode and the magnification A is selected therefor. Then the magnification B is set by another closing of the switch SW23 in this state, and the ordinary phototaking mode is restored by still another closing of the switch SW23.

Figure 29A:
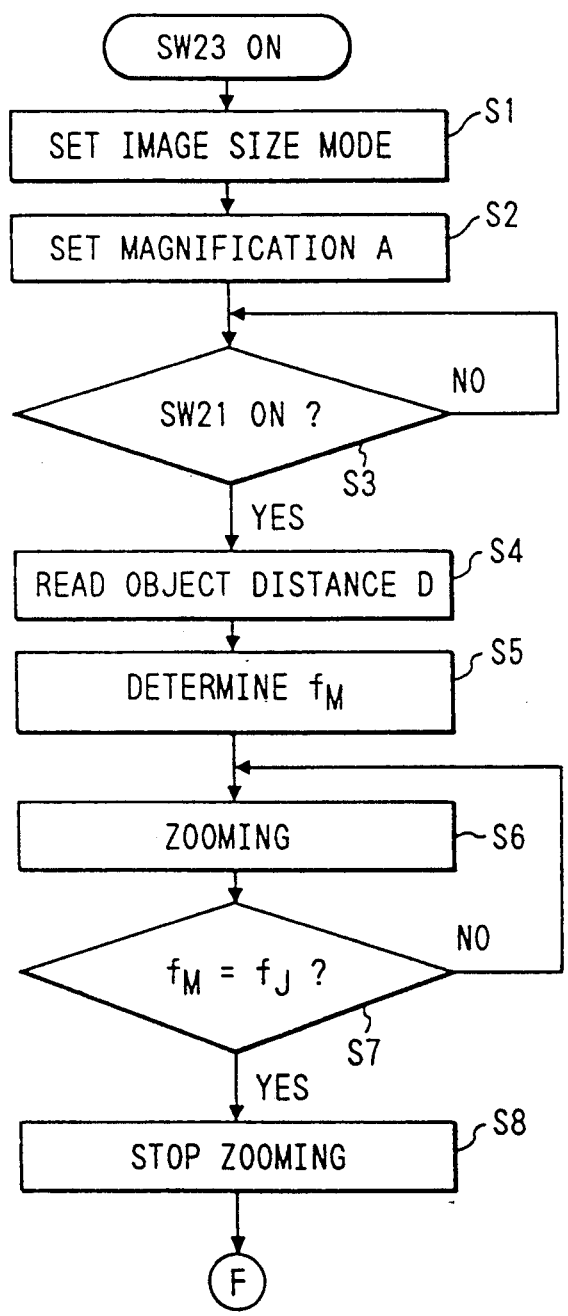
FIGS. 29A and 29B are flow charts showing control sequences.
Figure 29B:
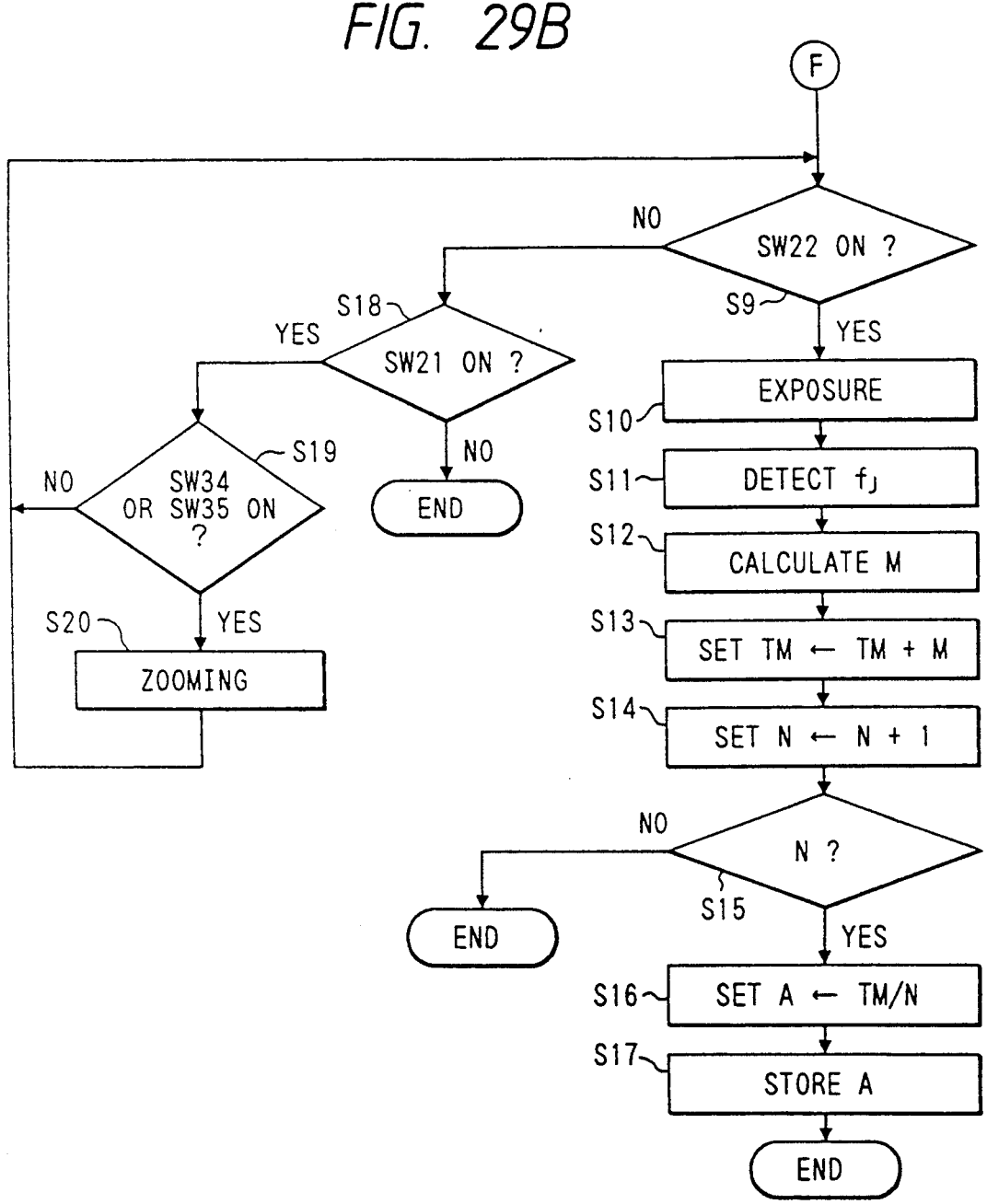

In the following there will be explained the control sequence by the control circuit 51, with reference to flow charts shown in FIGS. 29A and 29B.

This sequence corresponds to the image size phototaking with the magnification A. A corresponding program is activated when the mode change switch SW23 is closed once in the ordinary phototaking mode. At first a step S1 sets the image size mode, and a step S2 sets the magnification A. When a step S3 identifies that the switch SW21 is closed, a step S4 activates the range finder circuit 55 to fetch the object distance D, and a step S5 calculates, based on the fetched object distance and the magnification A set in the step S2, a target focal length $f_M$ enabling the phototaking with said magnification A.

Figure 30:
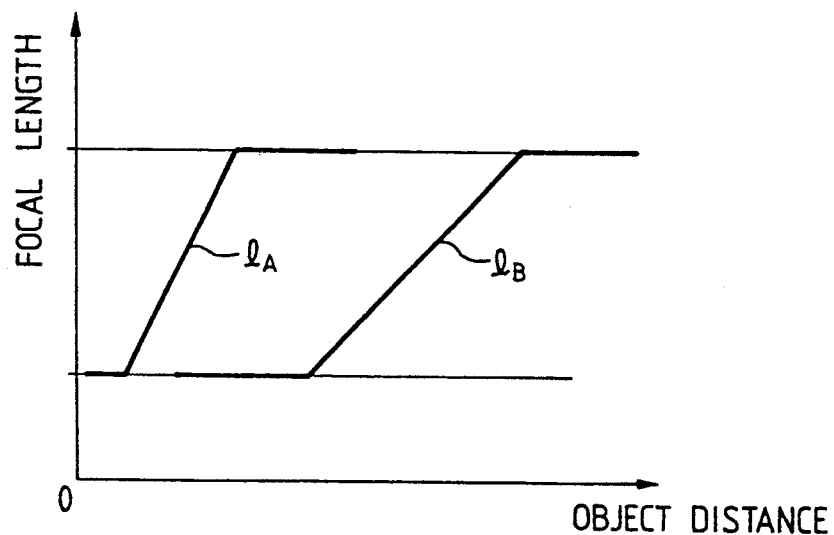
FIG. 30 is a chart showing the relation between the object distance and the focal length.

As shown in FIG. 30, the control circuit 51 stores characteristics 1A, 1B indicating the relation between the object distance and the focal length respectively for the magnifications A and B, and, in the present situation, the focal length corresponding to the object distance is determined according to the characteristic 1A.

Then a step S6 sends a zoom-up or zoom-down signal to the drive circuit 53 thereby zooming the phototaking lens toward the calculated target focal length. Then a step S7 discriminates whether the current focal length $f_J$ is equal to the target focal length $f_M$.

In this manner the phototaking lens is driven to a focal length providing the magnification A. Such drive of the phototaking lens to a certain focal length corresponds to the setting of the image angle of the phototaking lens.

A step S9 then discriminates whether the switch SW22 is on, and, if not, a step S18 discriminates whether the switch SW21 is on. If the switch SW21 is on and either of the switches SW34, SW35 is on, a step S20 executes zooming of the lens.

The steps S19, S20 execute correction of the phototaking magnification, after the phototaking lens is driven to the target focal length by the depression of the shutter release button over the first stroke. Thus the correction on the focal length of the phototaking lens or on the magnification is conducted by the closing of the zoom switch SW34 or SW35 while the switch SW21 remains closed.

If the step S9 identifies that the switch SW22 is on, a step S10 executes the exposure operation. Then a step S11 fetches the current focal length $f_J$, a step S12 calculates the phototaking magnification M (in the step S10) from the focal length $f_J$ and the object distance D, and the sequence proceeds to a step S13.

When the magnification is corrected as explained above, the magnification has to be calculated again for the process to be explained later, since the magnification at phototaking is different from the initially set magnification A. In the present embodiment, the use of a magnification is defined by the execution of image size phototaking with said magnification. Consequently the magnification M calculated in the step S10 constitutes a used phototaking magnification.

A step S13 determines the sum TM of the magnification, by adding the used magnification M to the preceding sum TM of magnification determined in the previous step S13. In this manner the used magnifications are cumulatively stored.

Then a step S14 effects a step increment of the count N indicating the number of phototaking operations, and a step S15 discriminates whether said count is at least equal to a predetermined number. If not, the sequence is terminated. If the count N has reached the predetermined number, a step S16 determines a new magnification A by dividing the sum TM with the count N, namely by the average value of the magnifications used in the past phototaking operations. Then a step S16 memorizes said magnification A and the sequence is terminated.

In the above-explained sequence, in the course of image size phototaking operations with the initially set magnification A, the actually used magnifications M are cumulated, and, when the number of phototaking operations reaches a predetermined number, the average of the magnifications M used up to this point is selected as a new magnification A. Thereafter said new magnification A is set by closing the mode change switch SW23 once in the ordinary phototaking mode.

Consequently, if the operator always corrects the magnification to a preferred value in the image size mode, such preferred magnification is selected. Thereafter, the phototaking lens is driven to a focal length providing such preferred magnification when the shutter release button is actuated for effecting the image size phototaking operation.

The foregoing description has been limited to the image size mode with the initially set magnification A, but similar control is possible also for the image size mode with the initially set magnification B.

In the determination of new magnification in the foregoing embodiment, there may be excluded the magnifications with a predetermined range. Also the most frequently used magnification may be selected as the new magnification.

Also if the foregoing embodiment is applied to a camera capable of trimmed phototaking, the image angle setting for the image size phototaking may be achieved by a change in the trimming magnification, instead of zooming of the phototaking lens.

Following embodiment relates to a camera with plural self-timer modes. Self-timer phototaking, for effecting the exposure after a predetermined delay time from the actuation of the shutter release button, is already known. There is also known a camera capable of double self-timer phototaking, in which the time measurement is started after the completion of a first self-timer phototaking and the exposure is repeated after a predetermined delay time.

In such camera capable of single self-timer mode and double self-timer mode, the single self-timer mode is generally set as the initial mode, and the double self-timer mode is set by a mode change. Such camera is therefore not convenient for an operator who frequently uses the double self-timer mode.

A 5th embodiment of the present invention, having taken this point into consideration, will be explained in the following with reference to FIGS. 31-34.

Figure 31:
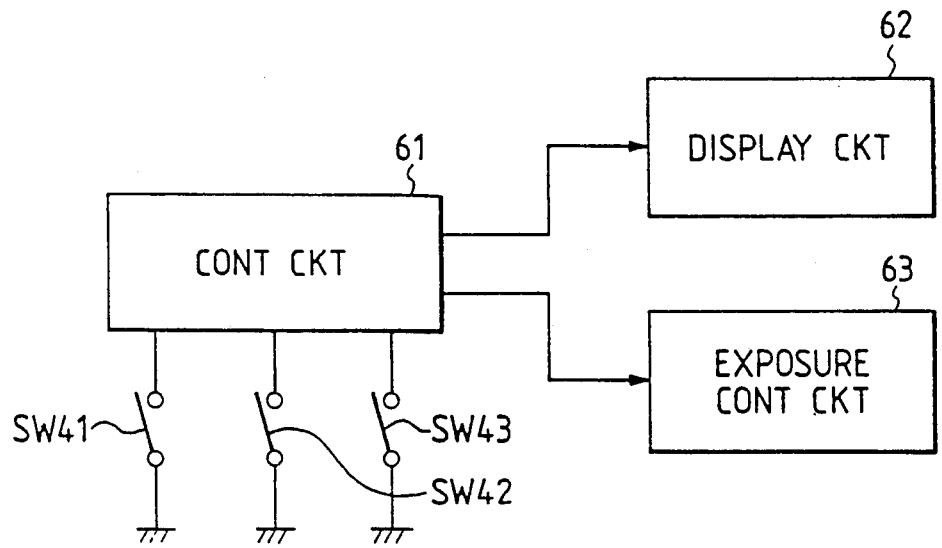
FIG. 31 is a block diagram of a camera constituting a fifth embodiment of the present invention.
Figure 32:
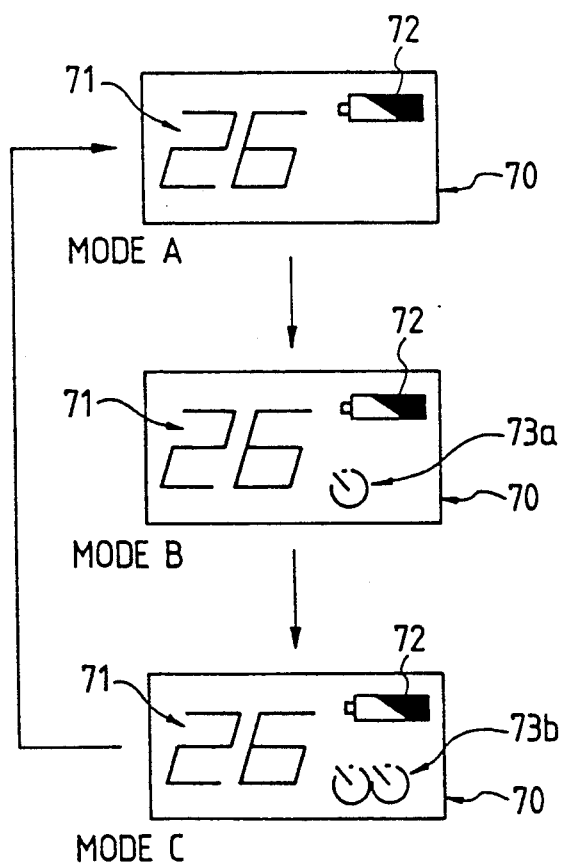
FIG. 32 is a view showing examples of display therein.

Referring to FIG. 31, a control circuit 61 is connected to an indicator circuit 62 and an exposure control circuit 63. The circuit 62 is connected to a liquid crystal display unit 70 as shown in FIG. 32. Said display is positioned on the upper face of the camera housing, and displays the film count 71, remaining battery capacity 72, and marks 73a, 73b indicating the self-timer modes. The exposure control circuit 63 executes the exposure operation by driving the shutter and diaphragm, in response to an instruction from the control circuit 61.

The control circuit 61 is also connected to three manual switches SW41-SW43 provided on the camera housing. A shutter release switch SW41 sends an exposure start signal to the exposure control circuit 63 through the control circuit 61. A self-timer switch SW42 effects setting, change and cancellation of the self-timer modes. The exposure operation cannot be executed by the shutter release switch SW41 while a power switch SW43 is turned off.

In the following there will be explained the self-timer phototaking operations in the present embodiment.

The camera of the present embodiment can select the aforementioned single self-timer mode or the double self-timer mode. The camera is adjusted in the following manner when it is manufactured.

When the power switch SW43 is turned on, the control circuit sets an ordinary phototaking mode without the self-timer, and the liquid crystal display unit 70 indicates the mode A as shown in FIG. 32. Then, when the self-timer switch SW42 is turned on once, the single self-timer mode is set and the display unit 70 shows the mark 73a, indicating the single self-timer mode, as in the mode B in FIG. 32. The self-timer mode set by the first actuation of the self-timer switch SW42 will be called the initial self-timer mode.

When the self-timer switch SW42 is turned on again in this state, the double self-timer mode is set, and the display unit 70 shows the mark 73b, indicating the double self-timer mode, as shown in the mode C in FIG. 32. The ordinary phototaking mode is thereafter restored by an additional actuation of the switch SW42.

Figure 33:
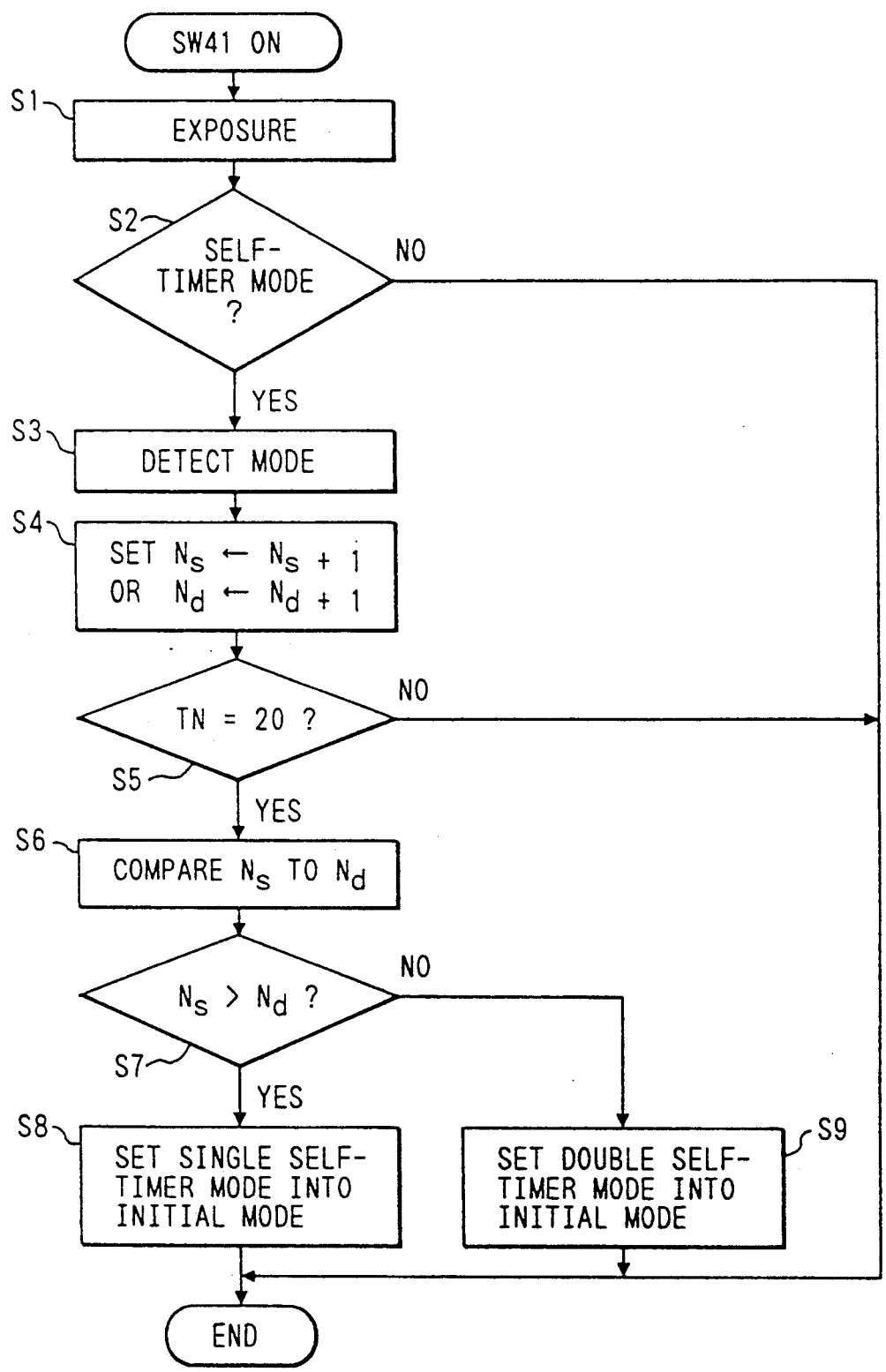
FIGS. 33 and 34 are flow charts showing control sequences.
Figure 34:
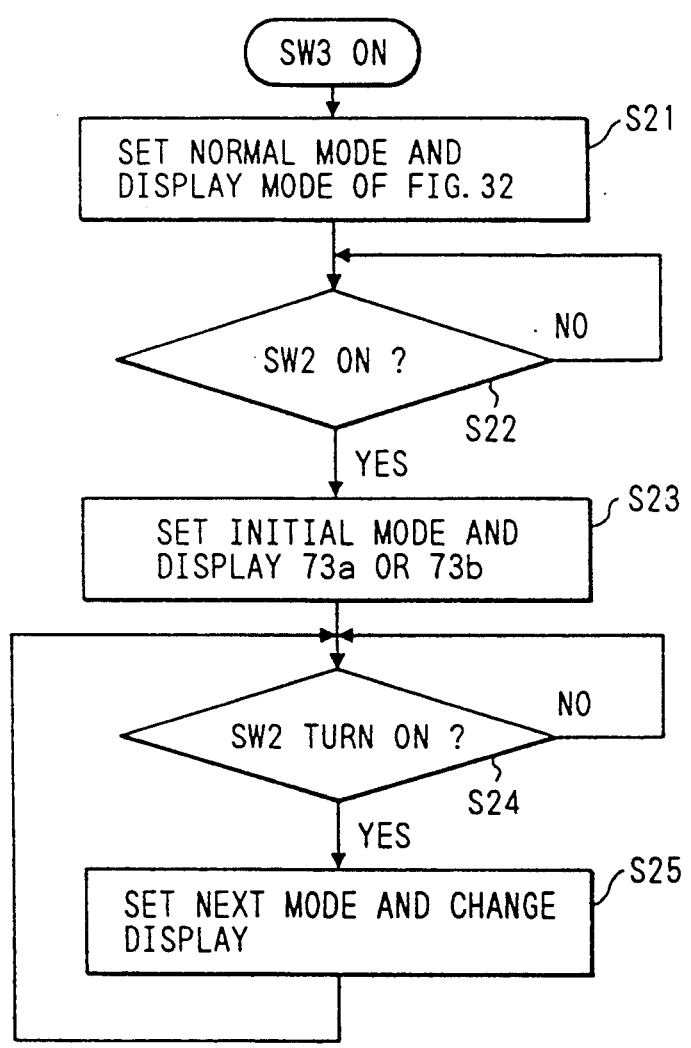

The control circuit 61 varies the order of setting of the self-timer modes, based on the number of uses thereof, according to a sequence shown in flow charts in FIGS. 33 and 34.

A program corresponding to FIG. 33 is activated by the closing of the power switch SW43 and the shutter release switch SW41. At first a step S1 executes an exposure operation, in the ordinary phototaking mode, single self-timer mode or double self-timer mode selected in advance.

Then a step S2 discriminates whether the phototaking operation in the step S1 was conducted in either of the single and double self-timer modes. If it was conducted in a self-timer mode, a step S3 identifies said self-timer mode, and a step S4 increases a count Ns or Nd indicating the number of phototaking operations, according to the result of said identification. Said counts Ns and Nd, indicating the number of phototaking operation in respective self-timer modes, are stored in the control circuit, and the count Ns or Nd is increased by "1" respectively if the phototaking operation in the step S1 was conducted in the single or double self-timer mode.

In the present embodiment, the use of a self-timer mode is defined by the execution of a phototaking operation with said self-timer mode. The counts Ns and Nd are set as "0" at the manufacture of the camera, and are retained even when the power switch SW43 is turned off.

Then a step S5 discriminates whether the sum TN of Ns and Nd, namely the total number of self-timer phototaking operations, has reached a predetermined number, for example 20. If affirmative, steps S6 and S7 compare Ns and Nd, and, if $Ns > Nd$, a step S8 selects the single self-timer mode as the initial self-timer mode mentioned above, but, if $Ns \leq Nd$, a step S9 selects the double self-timer mode as the initial self-timer mode.

In the above-explained sequence, the number of uses of each self-timer mode is counted at each self-timer phototaking operation, and, when total number of self-timer phototaking operations reaches a predetermined number, the most frequently used self-timer mode is identified and selected as the initial self-timer mode.

When the switch SW43 is turned on after the determination of the initial self-timer mode as explained above, a program corresponding to FIG. 34 is activated, wherein a step S21 sets the ordinary phototaking mode and sends a display signal to the indicator circuit 62, thereby providing the display of the mode A shown in FIG. 32. Then, when the self-timer switch SW42 is turned on in a step S22, the determined initial self-timer mode is set and a mark 73a or 73b indicating said mode is shown in the display unit 70 (step S23).

Then, when the self-timer switch SW42 is again turned on in a step S24, a step S25 sets the next self-timer mode and provides display corresponding to said mode.

In the above-explained sequence, after the power switch is turned on, a self-timer mode used most frequently in the past is set as the initial self-timer mode in response to the actuation of the self-timer switch SW42. For example, if the operator has used the double self-timer mode more frequently than the single self-timer mode in the past, the double self-timer mode is set by the first actuation of the self-timer switch, and the single self-timer mode is set by the next actuation of said switch.

The foregoing embodiment has been applied to a camera provided with plural self-timer modes of different number of exposures, but it is likewise applicable also to a camera provided with plural self-timer modes of a single exposure but of different delay times.

In the following there will be explained a 6th embodiment of the present invention, applied to automatic correction of exposure value.

There is already well known a camera capable of reading film data, such as nominal sensitivity thereof, from a DX code provided on the film cartridge, and determining the exposure value for phototaking, based on said film data. However, the operator may want to determine the exposure value based on a sensitivity modified from said nominal sensitivity, in consideration of the fluctuation in the characteristics of film emulsion, phototaking conditions or taste of the operator. Particularly in color slide films, such modification of the sensitivity is not rare, for obtaining color reproduction matching the taste of the operator, because the color changes significantly in such films by the change in the exposure value. Consequently there is already known a camera in which the sensitivity setting can be increased or decreased in response to an instruction for exposure correction.

Such exposure correction is used also for correcting the output of an exposure meter provided on the camera, in case of photographing an object of which luminance cannot be exactly measured with said exposure meter.

Such known camera requires the entry of the exposure correction value at each film replacement, since the exposure correction value is reset to zero when the film is replaced. Consequently, even when plural rolls of film of a same kind are used in succession, the exposure correction value has to be entered anew at each film loading.

Figure 35:
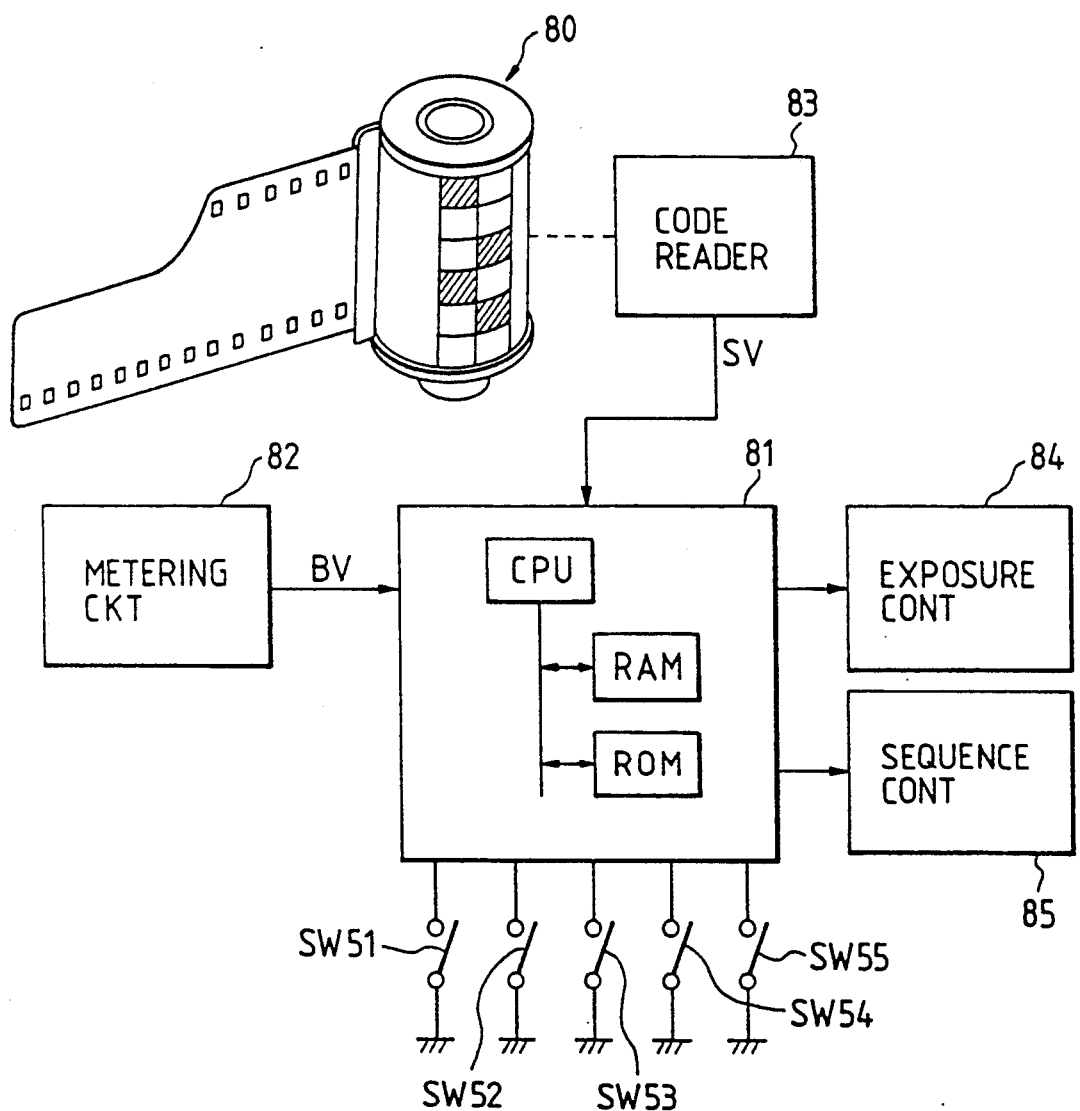
FIG. 35 is a block diagram of a camera constituting a sixth embodiment of the present invention.

Now referring to FIG. 35, a control circuit 81 is composed of a microcomputer provided with a CPU, a RAM, a ROM etc. Said control circuit 81 is connected to a shutter release switch SW51 to be actuated by the shutter release button; a light metering circuit 82 for releasing the output of a photodiode as a light metering output BV after amplification; a code reader 83 for reading the DX code provided on a film cartridge 80 and releasing it as film sensitivity information SV; an exposure control circuit 84 for controlling the shutter, diaphragm etc.; a sequence control circuit 85 for winding the film after the exposure operation and making preparation for the next exposure operation; and switches SW52, SW53 for increasing or decreasing the exposure correction value.

Tab. 1, stored in the RAM, indicates the relation among the kind of films, exposure correction values and frequencies thereof.

TABLE 1

| FILM | | | EXPOSURE CORRECTION VALUE | | NUMBER OF USES |
|---|---|---|---|---|---|
| Class | Sensitivity | Latitude | Division | EV | |
| i | ISO 100 | | 1 | +1 | — |
| | | +1/2 EV | 2 | +1/2 | — |
| | | | 3 | 0 | — |
| | | −1/2 EV | 4 | −1/2 | — |
| | | | 5 | −1 | — |
| ii | ISO 100 | | 1 | +1 | — |
| | | +2 EV | 2 | +1/2 | — |
| | | | 3 | 0 | — |
| | | −1 EV | 4 | −1/2 | — |
| | | | 5 | −1 | — |
| iii | ISO 400 | | 1 | +1 | — |
| | | +1/2 EV | 2 | +1/2 | — |
| | | | 3 | 0 | — |
| | | −1/2 EV | 4 | −1/2 | — |
| | | | 5 | −1 | — |
| iv | ISO 400 | | 1 | +1 | — |
| | | +2 EV | 2 | +1/2 | — |
| | | | 3 | 0 | — |
| | | −1 EV | 4 | −1/2 | — |
| | | | 5 | −1 | — |

The films are classified into following classes i–iv according to the ISO sensitivity and the latitude:
i. ISO 100; latitude ±1/2 EV
ii. ISO 100; latitude ±2 EV/−1 EV
iii. ISO 400; latitude ±1/2 EV
iv. ISO 400; latitude +2 EV/−1 EV The exposure correction values are divided into five divisions of +1, +1/2, 0, −1/2 and −1 for each class of film, and the number of uses is counted for each division. Naturally it is also possible to classify the film into five or more classes, or divide the exposure correction values into six or more divisions.

In the following there will be explained the control sequence of the CPU in the control circuit 81, with reference to flow charts shown in FIGS. 36 to 38.

Figure 36:
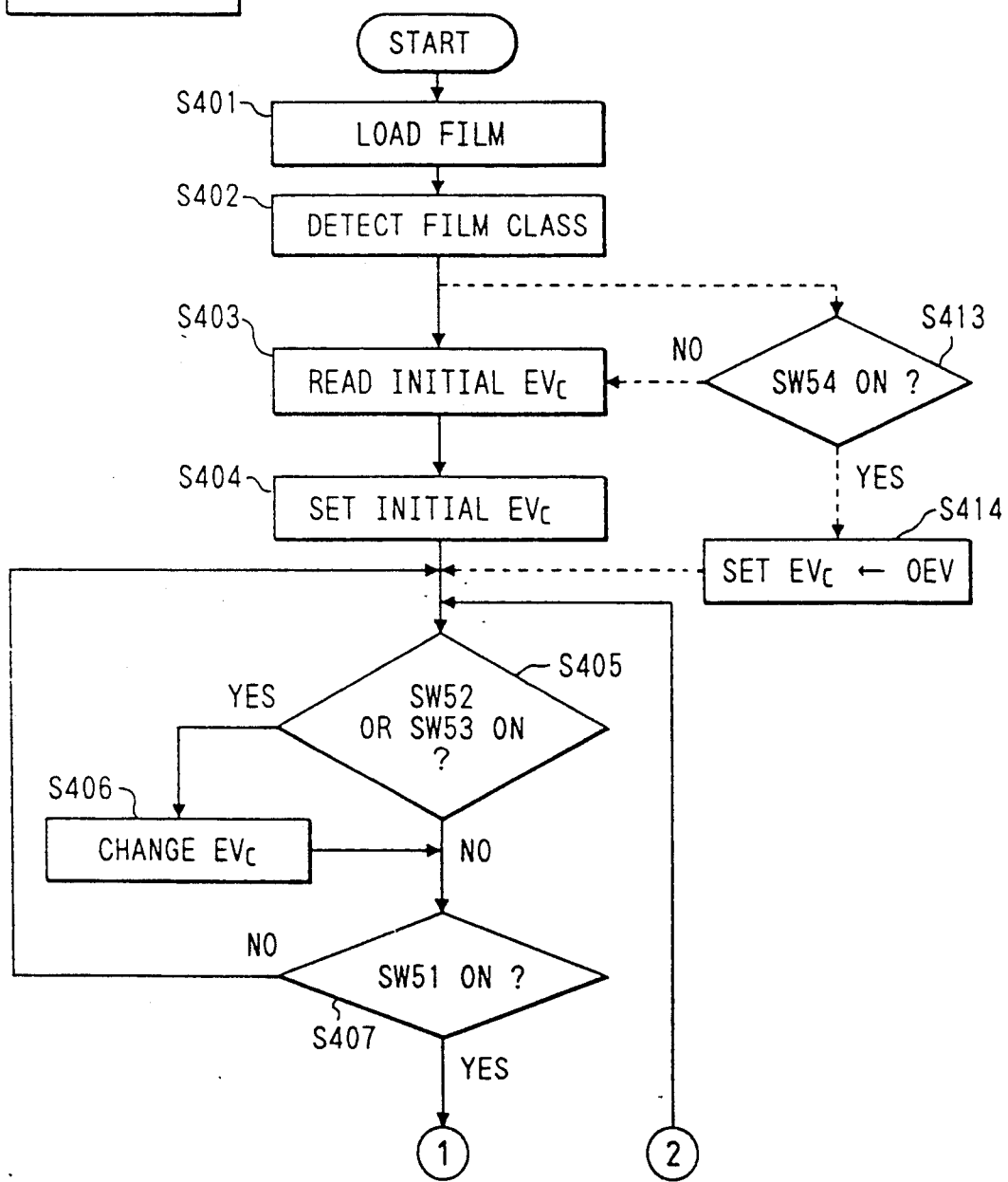
FIG. 36 comprising
Figure 36B:
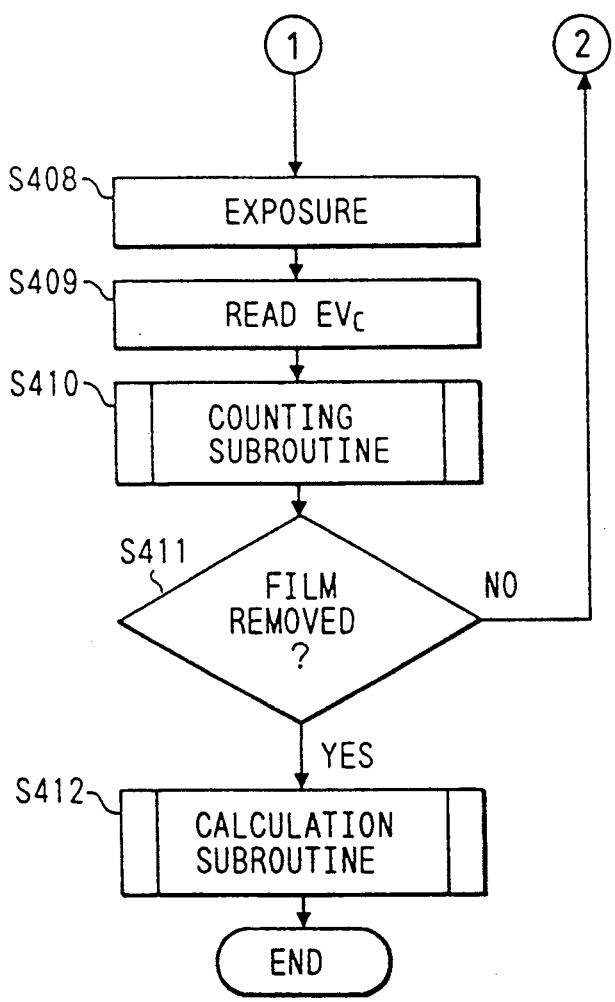

FIG. 36 shows a main routine, which is started when a step S401 identifies the film loading. Said identification may be achieved by a signal from a switch which is provided in the film chamber and is turned on by the loading of the film cartridge, or by a signal entry into the code reader 83. Then a step S402 discriminates the class, in Tab. 1, of the loaded film. Then a step S403 reads an initial value of the exposure correction value (EVc) stored in a step S412, to be explained later, on the discriminated film, and a step S404 sets said initial value as the exposure correction value.

Then a step S405 discriminates whether either of the up-switch SW52 or the down-switch SW53 has been actuated for manual exposure correction. A next step S406 varies the already set exposure correction value EVc. Then, if a step S407 identifies that the shutter release switch SW51 is on, a step S408 executes an exposure or phototaking operation, in which the exposure control circuit 84 drives the shutter and the diaphragm, and the sequence control circuit 85 executes film winding and preparations for the next phototaking operation. Then a step S409 reads the exposure correction value EVc used in said phototaking operation, and a step S410 counts and stored the number of uses of the exposure correction value, according to a count subroutine shown in FIG. 37.

Figure 37:
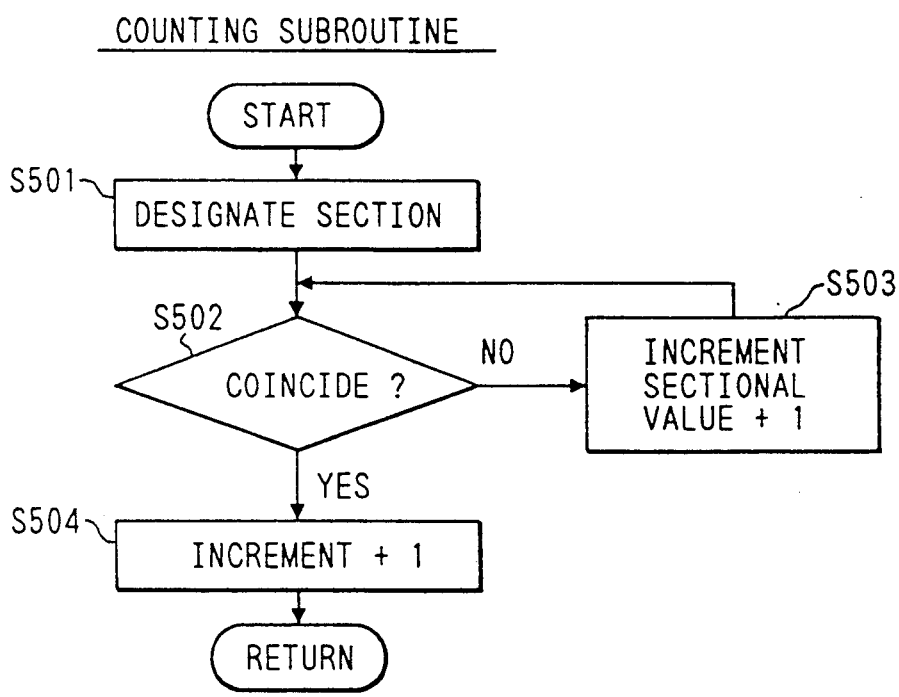

Now referring to FIG. 37, a step S501 designates the first division value of the exposure correction value in the identified film class. For example, if a film of class i in Tab. 1 is identified, there is designated the 1st division for which +1 EV is assigned. A next step S502 discriminates whether the exposure correction value EVc read in the step S409 matches the exposure correction value of the designated division. If matched, a step 504 effects a step increment of the number of uses of said division. If not matched, a step S503 effects a step increment of the number of the division, and the sequence returns to the step S502. In this manner the number of uses of the exposure correction value is counted and stored.

The above-explained counting and storing operation for the number of uses need not necessarily be synchronized with the shutter releasing operation, but may be synchronized with the activation for example of the light metering circuit or the range finder circuit, indicating the intention of phototaking of the operator.

A step S411 identifies the removal of the film, for example by the termination of the signal from the above-mentioned switch provided in the film chamber. If the film removal is not identified the sequence return to the step S405, but, if the film removal is identified, the sequence proceeds to a calculation subroutine of a step S412, thereby calculating the exposure correction value anew.

The details of said calculation subroutine are shown in FIG. 38.

At first a step S601 designates the exposure correction value of the 1st division of the identified film, and a step S602 reads the corresponding number of uses.

Then a step S603 effects a step increment of the number of division, and a step S604 reads the number of uses of the division. A next step S605 compares the two read numbers of uses, and a step S606 memorizes the division of the larger number of uses. Then a step S607 discriminates whether the designated division is the last 5th division, and, if not, the sequence returns to the step S603. If the designated division is the 5th division, a step S608 stores, as the new exposure correction value, the exposure correction value of a division of largest number of uses memorized in the step S606.

The above-explained sequence counts and stores the number of uses of the exposure correction value used in each phototaking operation, then memorizes the exposure correction value of the largest number of uses at the film removal as an initial value, and automatically sets said initial exposure correction value at the next film loading. Thus the operability of the camera is improved as the exposure correction value need not be entered at each film loading.

Figures 39, 39A, 39B:
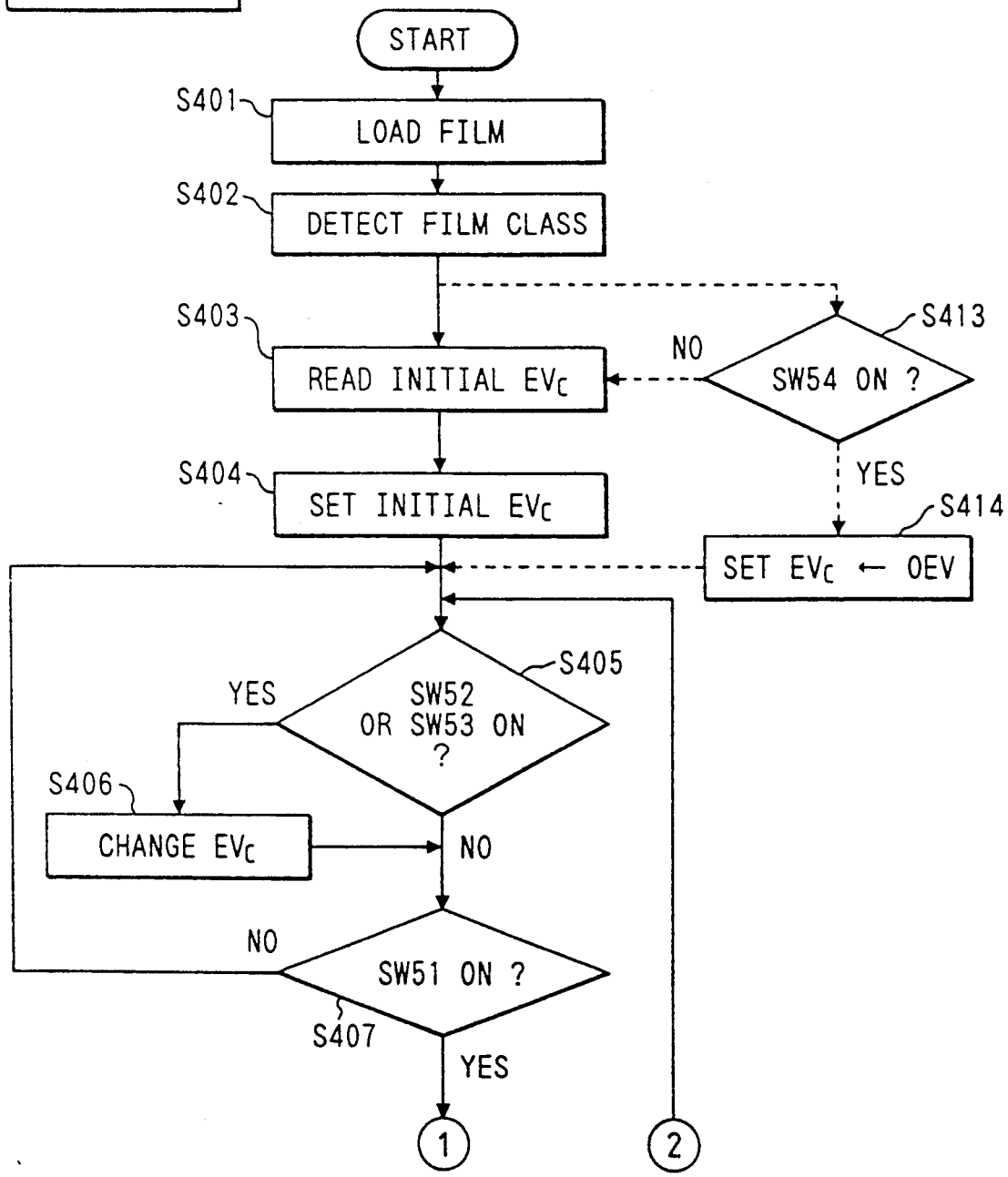
FIG. 39 comprising
Figure 39B:
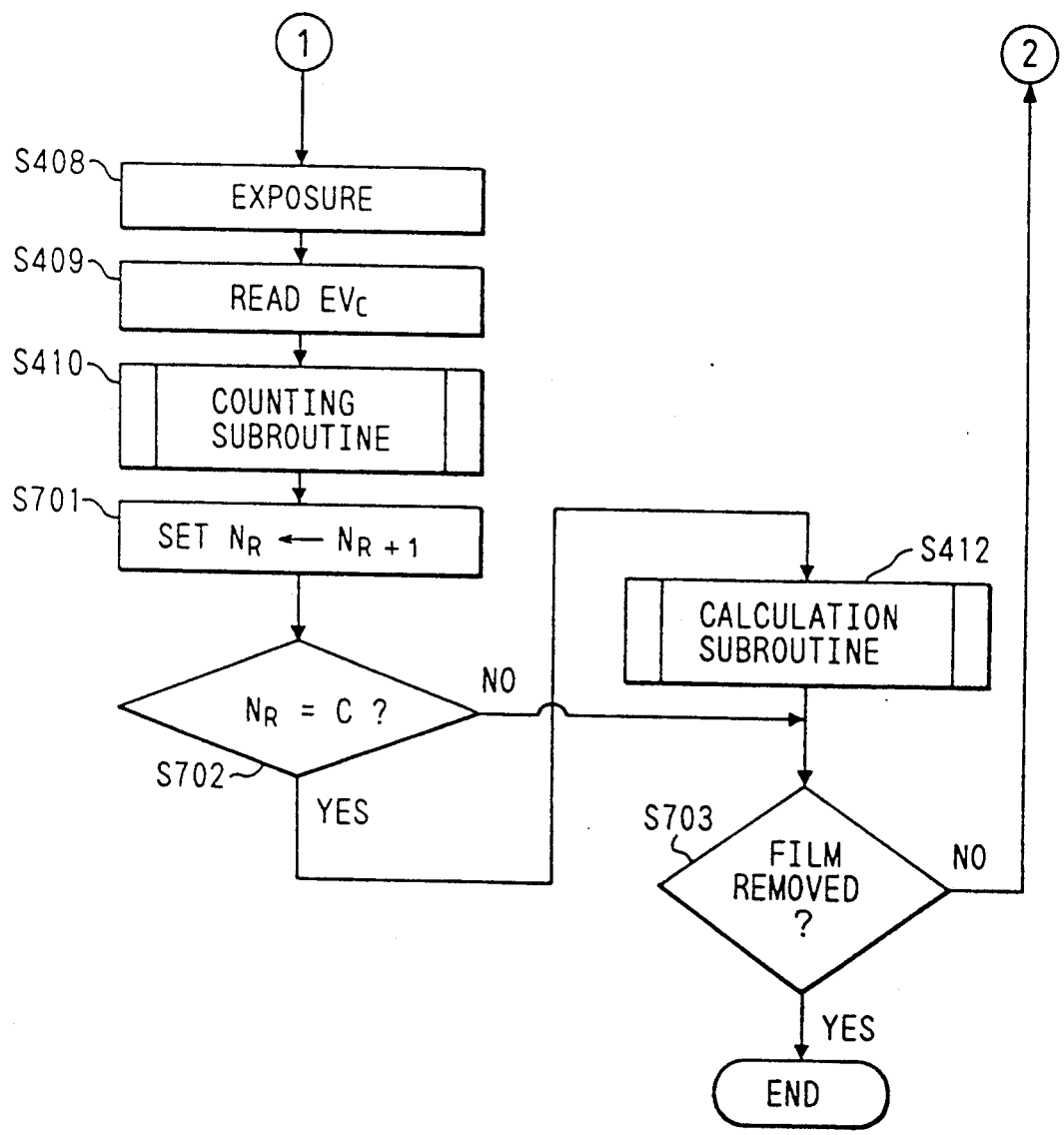

FIG. 39 shows a variation of the sequence shown in FIG. 36.

In the sequence shown in FIG. 39, the resetting of the initial value of the exposure correction value is conducted after a predetermined number of shutter releasing operations, in contrast to the sequence shown in FIG. 36 in which said resetting is conducted at the removal of the film. In FIG. 39, same steps as those in FIG. 36 are represented by same numbers and the following description will be given principally on the different points.

A step S701 effects an upcount of a counter corresponding to the loaded film, among the counters for counting the number $N_R$ of actuations of the shutter release switch SW51 respectively for different film classes. A step S702 discriminates whether the count has reached a predetermined number C, and, if not, the sequence returns to the step S405. If said predetermined number is reached, a step S412 memorizes the new exposure correction value and resets the counter for the number of shutter releasing operations corresponding to the class of loaded film, and the sequence proceeds to a step S703 for discriminating whether the film is removed. If not, the sequence returns to the step S405, but, if the film is removed, the sequence is terminated. It is desirable that the operator can arbitrarily select the reference number of shutter releasing operations used in the step S702.

In the above-explained sequence, after every predetermined number of phototaking operations, the exposure correction value used most frequently up to this point is stored as the initial value, and such stored exposure correction value is automatically set at the film loading.

Figure 40:
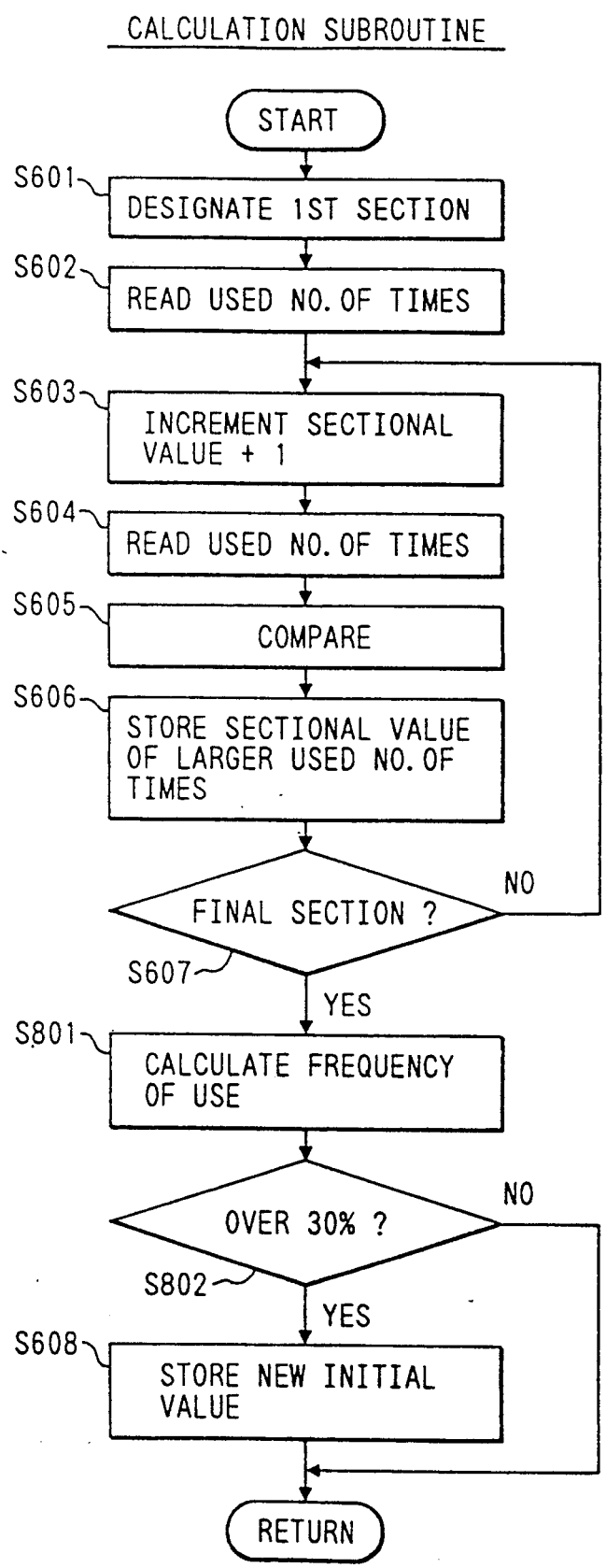

FIG. 40 shows a variation of the sequence shown in FIG. 38.

In the sequence shown in FIG. 38, the exposure correction value most frequently used among the read values is unconditionally stored as the initial value, but this method may not be adequate if the exposure correction values used in the past are distributed evenly. In the present embodiment, the change of the exposure correction value is enabled only when the percentage of use is at least equal to a predetermined value.

Therefore, a step S801 in FIG. 40 calculates the percentage of use by dividing the largest number of the exposure correction value among the 1st–5th divisions by the total number of uses, and a step S802 discriminates whether said percentage of use is at least equal to a predetermined value, for example 30%, and, if affirmative, the exposure correction value of the division memorized in the step S608 is newly stored as the initial value.

It is also possible to add the retaining switch SW54 shown in FIG. 35 and to add steps S413, S414 between the steps S402 and S403 shown in FIG. 36.

In such case, when the switch SW54 is on, the step S413 provides an affirmative result, whereby the steps S403, S404 are skipped and the step S414 sets the exposure correction value at 0 EV. If said switch SW54 is off, the steps S403, S404 are executed instead of the step S414, whereby the read exposure correction value is set as the initial value.

Figure 41:
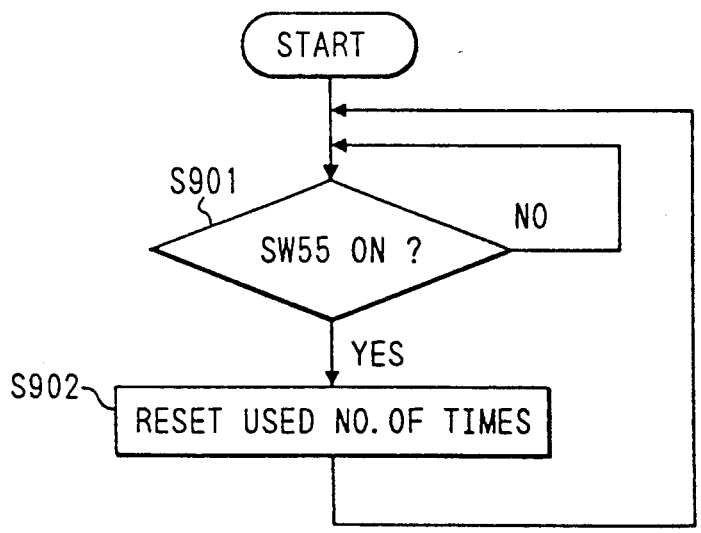
FIGS. 39A and 39B and FIGS. 40 and 41 are flow chart of a variation of said embodiment.

It is furthermore possible to provide a resetting switch SW55 shown in FIG. 35, to discriminate the state of said switch SW55 in the step S901 as shown in FIG. 41, and to reset the count of the number of uses of the exposure correction value in the step S902 if the resetting switch SW55 is on. When a camera is used by plural persons, this structure allows to reset the number of uses when the user changes, so that the camera can adapt to the taste of each user.

In the foregoing description, the exposure correction value most frequently used in the past is set as the initial value at the film loading, but it is also possible to store an initial exposure correction value corresponding to each film class in advance and to automatically set said exposure correction value in relation to the film loading or to other operations.

Also in the foregoing description, the films are classified by the ISO sensitivity and the latitude thereof, but it is also possible to store a code representing the exposure correction value in advance for each film class, and to set said exposure correction value by entering said code by operating buttons.

In the following there will be explained a 7th embodiment of the present invention.

In case of an outdoor daytime phototaking operation in fine weather with a film of much higher sensitivity than the usually used film, there may be obtained an overexposure even with the fastest available shutter speed. On the other hand, a phototaking operation of a dark object with a film of low sensitivity may result in an underexposure even with the slowest shutter speed. As explained above, there may be obtained inappropriate exposure if a film of different sensitivity from that of the usually used film is erroneously loaded in the camera and the phototaking operation is conducted erroneously under a condition which cannot be coped with such different sensitivity of the film. The present embodiment is to given an alarm to the operator in such situation.

Figure 42:
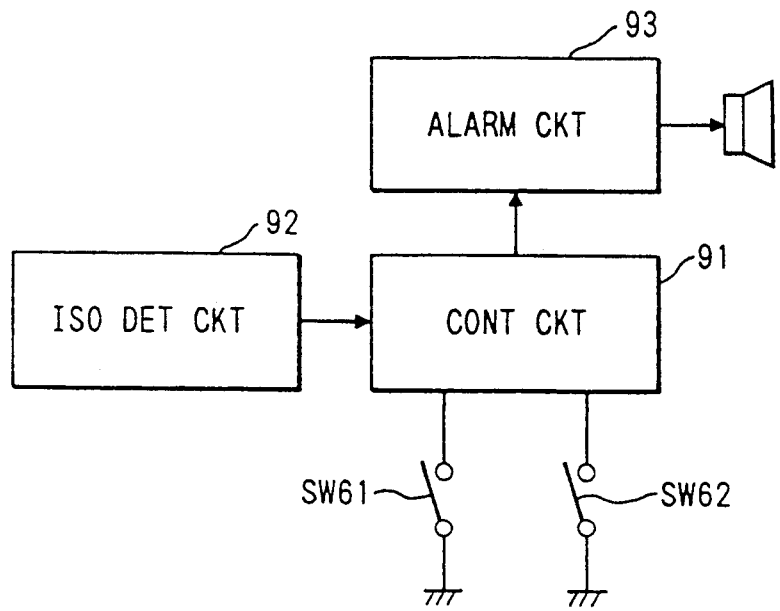
FIG. 42 is a block diagram of a camera constituting a seventh embodiment of the present invention.

FIG. 42 shows the entire structure, in which a control circuit 91 is connected to a film sensitivity detecting circuit 92, an alarm circuit 93 and switches SW61, SW62, and said alarm circuit 93 is connected to a loudspeaker 94 provided in the camera housing. The detecting circuit 92 reads the film sensitivity from the DX code of the film cartridge loaded in the camera, and sends said film sensitivity to the control circuit 91. In response to an instruction from the control circuit, the alarm circuit 93 causes the loudspeaker to generate an alarm sound.

The switch SW61 is closed in response to the actuation of an unrepresented shutter release button, and, in response, the control circuit executes a phototaking operation by driving unrepresented shutter and diaphragm. The switch SW62 serves as a power switch.

The camera of the present embodiment effects exposure control by the known APEX method, whereby there stands a relation:

$$BV+SV=AV+TV$$

wherein BV is the object luminance measured by an unrepresented light metering device; SV is the film sensitivity; AV is the diaphragm aperture stop value; and TV is the shutter speed. The control circuit 91 calculates the exposure value at the phototaking operation, based on the entered film sensitivity and the object luminance and according to the above-mentioned equation.

Also the control circuit 91 has a function of setting the sensitivity of a frequently used film as a standard sensitivity, and a function of comparing the sensitivity of the loaded film with said standard sensitivity, and activates the alarm circuit when necessary.

In the following there will be explained the control sequence of the control circuit, with reference to flow charts shown in FIGS. 43 to 45.

Figure 43:
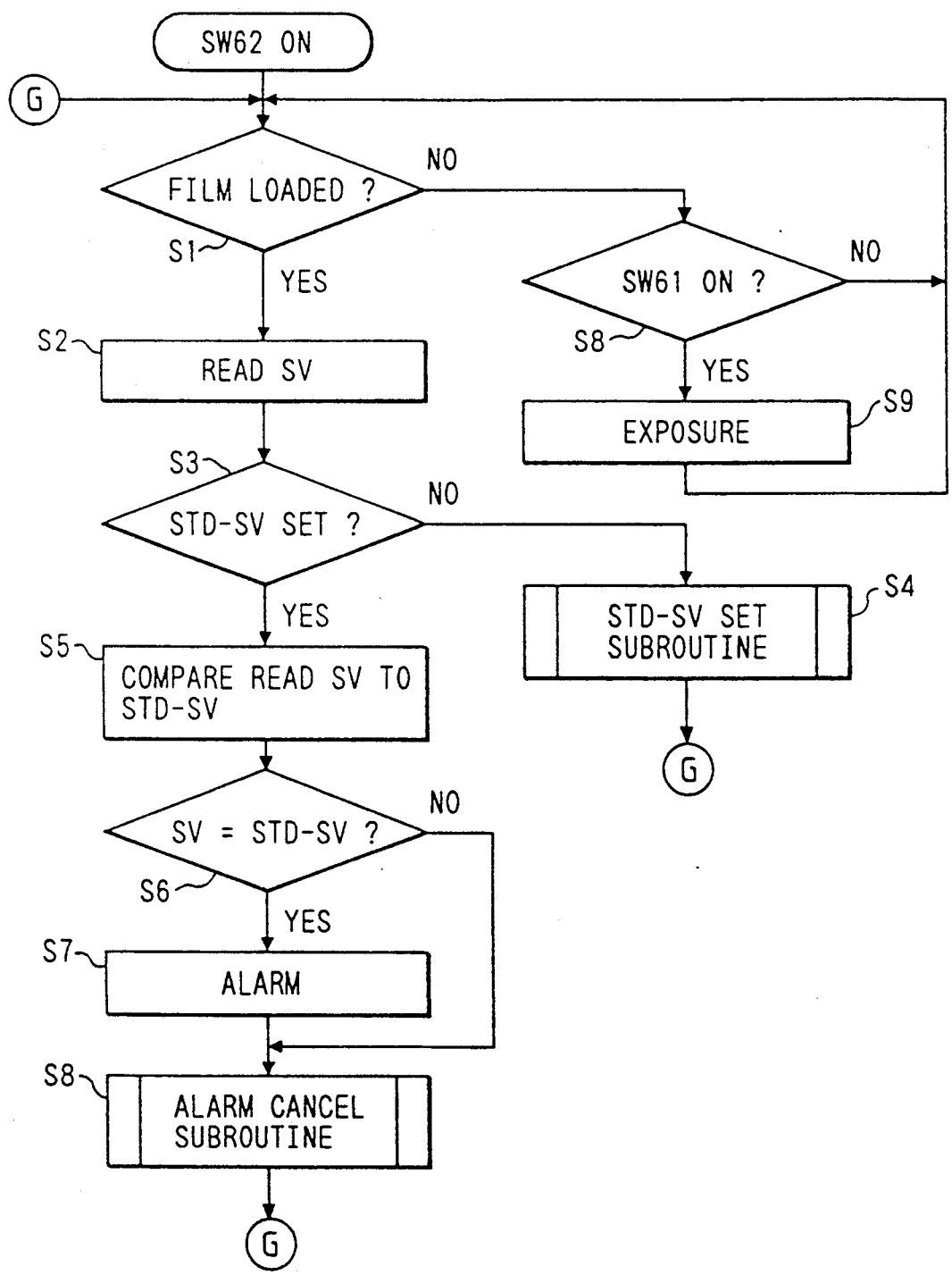

A program corresponding to the flow chart shown in FIG. 43 is activated by the closing of the main switch SW62. At first a step S1 discriminates whether a film is newly loaded in the camera, namely whether this sequence is used for the first time after the film loading. This discrimination can be achieved, for example, by whether the entry of film sensitivity from the detecting circuit 92 is made for the first time after the closing of the rear cover of the camera.

If the discrimination of the step S1 turns out negative, a step S8 discriminates whether the shutter release switch SW61 is turned on, and, if off, the sequence returns to the step S1, but, if on, a step S9 executes the phototaking operation and then the sequence returns to the step S1.

On the other hand, if the discrimination of the step S1 turns out affirmative, a step S2 reads the film sensitivity supplied from the detecting circuit 92, and a step S3 discriminates whether the above-mentioned standard sensitivity has been set. If not, a step S4 sets the standard sensitivity.

Figure 44:
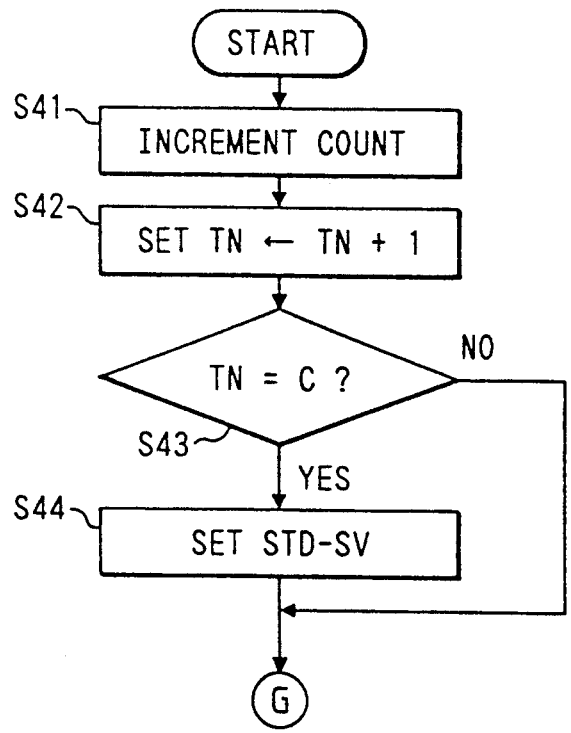
FIGS. 43 to 45 are flow charts showing control sequences.

FIG. 44 shows the details of said step S4. At first a step S41 effects a step increment of the count corresponding to the film sensitivity read in the step S2. The control circuit in advance stores variables representing the counts corresponding to all the available film sensitivities, and the step S41 increases the count corresponding to the sensitivity of the currently loaded film.

Then a step S42 effects a step increment of a count TN indicating the number of film loadings. A step S43 then discriminates whether said count TN has reached a predetermined value C, and, if not, the sequence returns to the step S1 in FIG. 43, but, if affirmative, a step S44 sets the standard sensitivity. A film sensitivity of the largest count obtained in the step S41, namely of the most frequently loaded film is set as said standard sensitivity. After said step S44, the sequence returns to the step S1 in FIG. 43. The above-mentioned value C indicating the number of film loadings may be suitably set by the operator or may be determined in advance in the camera.

On the other hand, if the step S3 identifies that the standard sensitivity has been set, a step S5 compares the set standard sensitivity with the sensitivity of the currently loaded film, read in the step S2. Then a step S6 discriminates whether both sensitivities are mutually equal, and, if not, the sequence proceeds to a step S8. If both are same, a step S7 sends an alarm signal to the alarm circuit 93, and the sequence then proceeds to an alarm cancelling step S8.

Figure 45:
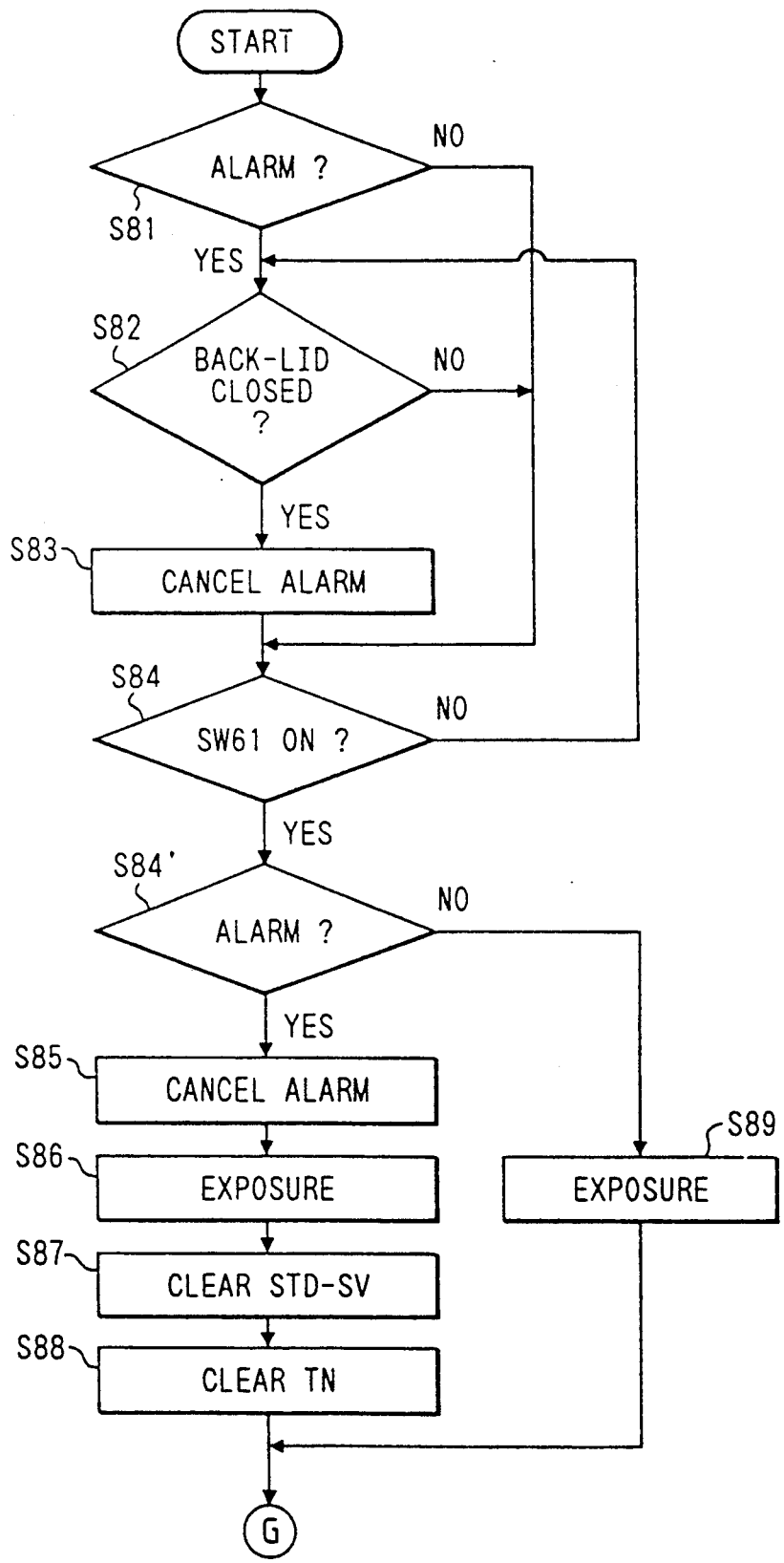

The details of said step S8 are shown in FIG. 45. At first a step S81 discriminates whether an alarm is generated, and the sequence proceeds to a step S82 or S84 respectively if the alarm is generated or not. The step S82 discriminates whether the rear cover of the camera is closed, and, if not, the sequence proceeds to the step S84, but, if closed, a step S83 cancels the alarm and the sequence proceeds to the step S84. The step S84 discriminates whether the shutter release switch SW61 is on, and, if not, the sequence returns to the step S82, but, if on, a step S84' discriminates whether an alarm is generated. If not, a step S89 executes the phototaking operation and the sequence returns to the step S1 in FIG. 43, but, if the alarm is generated, a step S85 cancels the alarm and the sequence proceeds to a step S87.

The step S87 clears the standard sensitivity, then a step S88 resets the count TN of number of film loadings to zero, and the sequence returns to the step S1 in FIG. 43. The sequence in FIG. 43 is terminated by the opening of the main switch SW62, but the count TN of the film loadings and the counts for respective film sensitivities are retained in a memory, and are used in succession when the main switch SW62 is turned on next time.

In the above-explained sequence, there is set the above-mentioned standard sensitivity if it has not been set. More specifically, if the main switch SW62 is turned on after film loading or if the film is loaded after the main switch SW62 is turned on, the step S1 provides affirmative discrimination, whereby the step S4 is executed to step increase the count corresponding to the sensitivity of the loaded film.

Then, when the film loading is conducted by a predetermined number of times, a film sensitivity of the highest count, namely the sensitivity of the most frequently used film is set as the standard sensitivity. When the film is loaded thereafter, the sensitivity of the loaded film is compared with said standard sensitivity, and alarm is generated if both sensitivities do not match each other.

As an example, in an outdoor daytime phototaking in fine weather, the object brightness BV in the APEX method is generally in a range of 9–11. Therefore, if a film of ISO sensitivity of 100 (SV=5) is used, the sum of the diaphragm stop value AV and the shutter speed value TV is:

$$AV+TV=14-17.$$

Thus, if the camera can control the diaphragm stop within a range of f2.8–f22 (AV=3–9), an appropriate exposure can be obtained with a shutter speed within a range of TV=5–7 (1/30–1/250 sec.).

On the other hand, if a film of ISO sensitivity of 800 (SV=8) is used under the same condition, the appropriate exposure cannot be obtained unless the shutter speed is controlled within a range of TB=8–11, or 1/250–1/2000 sec. In an ordinary lens-shuttered camera it is generally difficult to employ a shutter capable of providing a shutter speed faster than 1/500 seconds, so that an overexposed photograph is unavoidable if a film of ISO 800 is used in outdoor daytime phototaking in fine weather.

In the present embodiment, if the operator frequently uses the films of sensitivity of ISO 100, this sensitivity is taken as the standard sensitivity. Thus there is generated an alarm if a film of ISO 800 is erroneously loaded in the camera, whereby the operator can notice the error and avoid such overexposure by replacing the film.

On the other hand, if a film of lower sensitivity such as ISO 25 (SV=3), the shutter speed becomes slower than in the case of film of ISO 100, and camera shaking may occur with a shutter speed slower than 1/60 sec. There can be used an electronic flash in such case, but caution is required in a camera lacking such electronic flash. The present embodiment provides an alarm in case the operator, who usually uses films of ISO 100, erroneously loads a film of ISO 25, so that the operator can take a preventive measure such as replacing the film with a film of higher sensitivity or fixing the camera on a tripod.

Also in the sequence shown in FIG. 43, if the rear cover of the camera is opened in the course of alarm, such rear cover opening is identified for the film replacement and the alarm is cancelled. Also if a phototaking operation is conducted in the course of alarm, the alarm is cancelled and the set standard sensitivity is also cancelled.

The present invention is also applicable to a camera in which the sensitivity of the loaded film cannot be read from the DX code of the cartridge but has to be set by the operator for example by means of a sensitivity setting switch.

There may also be provided an operation member for cancelling the currently set standard sensitivity, because the operator who has frequently used films of ISO 100 may wish to start to use the films of other sensitivity such as ISO 400.

In case of photographing an object at a same distance with plural lenses of different focal lengths by a lens-interchangeable camera such as a single-lens reflex camera, there is required a focusing operation for each interchanged lens. Also in case of photographing with a lens of a large moving amount such as a close-up lens in an auto-focusing camera, a long time is required for focusing because the lens has to scan a wide range for detecting the object distance.

An 8th embodiment of the present invention, explained in the following, is to automatically focus the lens, at the interchange thereof, to a position memorized in advance.

Figure 46:
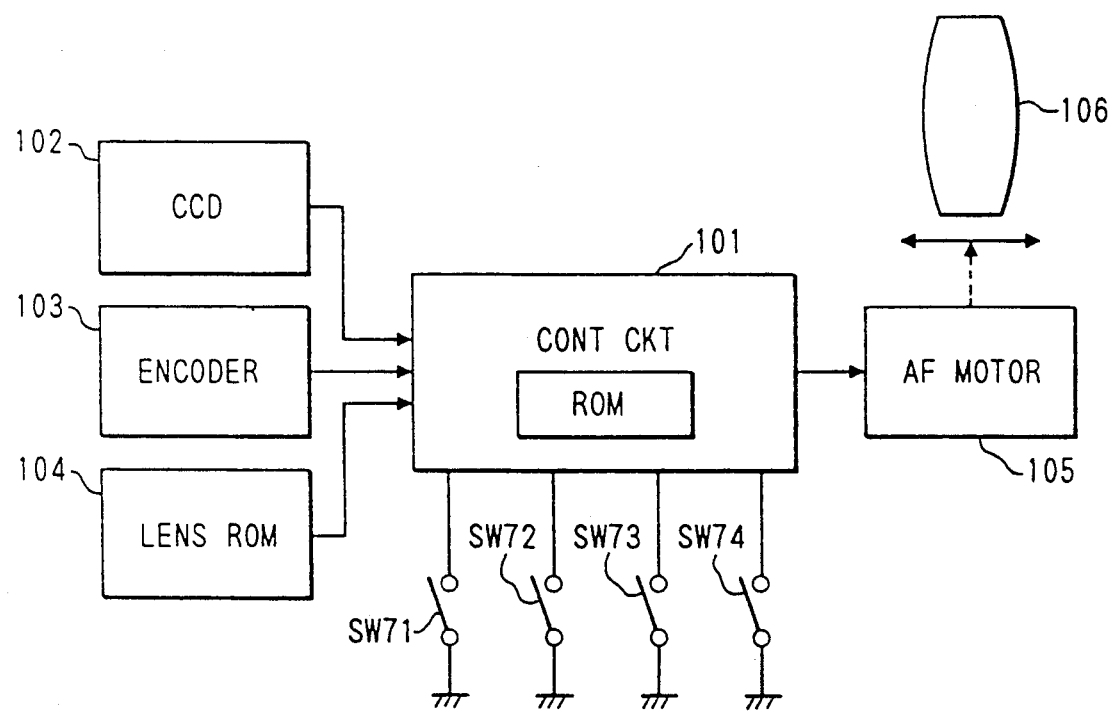
FIG. 46 is a block diagram of a camera constituting an eighth embodiment of the present invention.

Referring to FIG. 46, a control circuit 101 is principally composed of a known microcomputer consisting of a CPU, a ROM, a RAM etc. Said control circuit is connected to a switch SW71 to be closed by the depression of a shutter release button over a first stroke, a switch SW72 to be closed by the depression of said button over a second stroke, and a lens detection switch SW73 provided in the lens mount of the camera and opened or closed respectively when a lens is mounted or not on said lens mount. The control circuit 101 is also connected to an image sensor 102, such as a CCD, for detecting the focus information; a lens encoder 103 for detecting the information on photographing distance of a phototaking lens 106, namely the focus position thereof; and an AF motor 105 for regulating the focus position of the phototaking lens 106. Also a lens ROM 105, provided in the phototaking lens and storing the focal length information of said lens, is connected to the control circuit 101 through unrepresented contacts provided in the lens mount. The lens encoder 103 detects the photographing distance by sensing the rotary position of a focusing ring of the phototaking lens.

In the following there will be explained the function of the present embodiment, with reference to flow charts shown in FIGS. 47 and 48.

When the switch SW71 is closed, a step S1 fetches the focusing information from the image sensor 102. A step S2 calculates the defocus amount in known manner based on said information, and a step S3 activates the AF motor 105 for focusing the phototaking lens. The step S3 is repeated until a step S4 identifies an in-focus state, and then the sequence proceeds to a step S5.

When the switch SW72 is opened but the switch SW71 is closed, a step S11 discriminates whether the focusing mode is in a continuous mode or in a single mode. The continuous mode repeats the focusing operation while the switch SW71 is on, while the single mode fixes the phototaking lens once the in-focus state is reached by the actuation of the switch SW71. In case of single mode, the sequence returns to the step S5, but in case of continuous mode, the sequence returns to the step S1 for repeating the focusing operation.

If the discrimination of the step S5 turns out affirmative, a step S6 executes the phototaking operation by driving shutter and diaphragm. Then a step S7 fetches the information on focus position of the phototaking lens from the lens encoder 103, then a step S8 stores said information in the ROM of the control circuit, and the sequence returns to a predetermined step.

Figure 48:
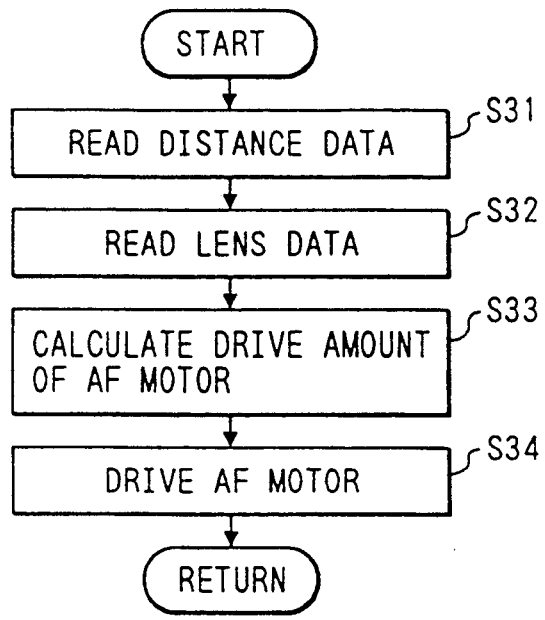

When the lens is changed, the signal level from the lens detection switch SW73 changes from low to high and then to low, whereby the sequence shown in FIG. 48 is activated. At first a step S31 reads the photographing distance from the ROM of the control circuit, and a step S32 reads the lens data on the focal length of the newly mounted lens, from the lens ROM thereof. Then a step S33 calculates the drive amount of the AF motor 105 based on these data, and a step S34 drives said AF motor, whereby the newly mounted lens is focused to a position to which the previous lens is focused immediately before the lens interchange.

As explained in the foregoing, the present embodiment is capable of storing the photographing distance at the end of a phototaking operation in the ROM, and, in case of a lens interchange, focusing the newly mounted lens according to the photographing distance stored in the ROM, thereby focusing the lens to the object to which the previous lens is focused immediately before the lens interchange. Consequently, for example in case of photographing a plant alternately with a close-up macro lens and another lens of longer focal length, it is not necessary to focus the lens each time.

Also the time required for focusing can be reduced because automatic focusing operation is not required at the lens mounting even for a lens of a large moving amount such as the macro lens. Furthermore, when a lens of longer focal length is replaced by another lens of shorter focal length with a larger depth of focus, the accuracy of focusing can be improved.

In the following there will be explained a variation of the foregoing embodiment, with reference to FIGS. 49 and 50.

As shown in FIG. 46, a mode selection switch SW74 is connected to the control circuit 101. If said mode selection switch is closed at the lens interchange, the focus position of the lens is automatically regulated according to the photographing distance stored in advance. This is called automatic mode, which is cancelled when the selection switch SW74 is opened. Thus this embodiment allows to select the presence or absence of automatic focusing at the lens interchange, according to the intention of the operator.

Figure 47:
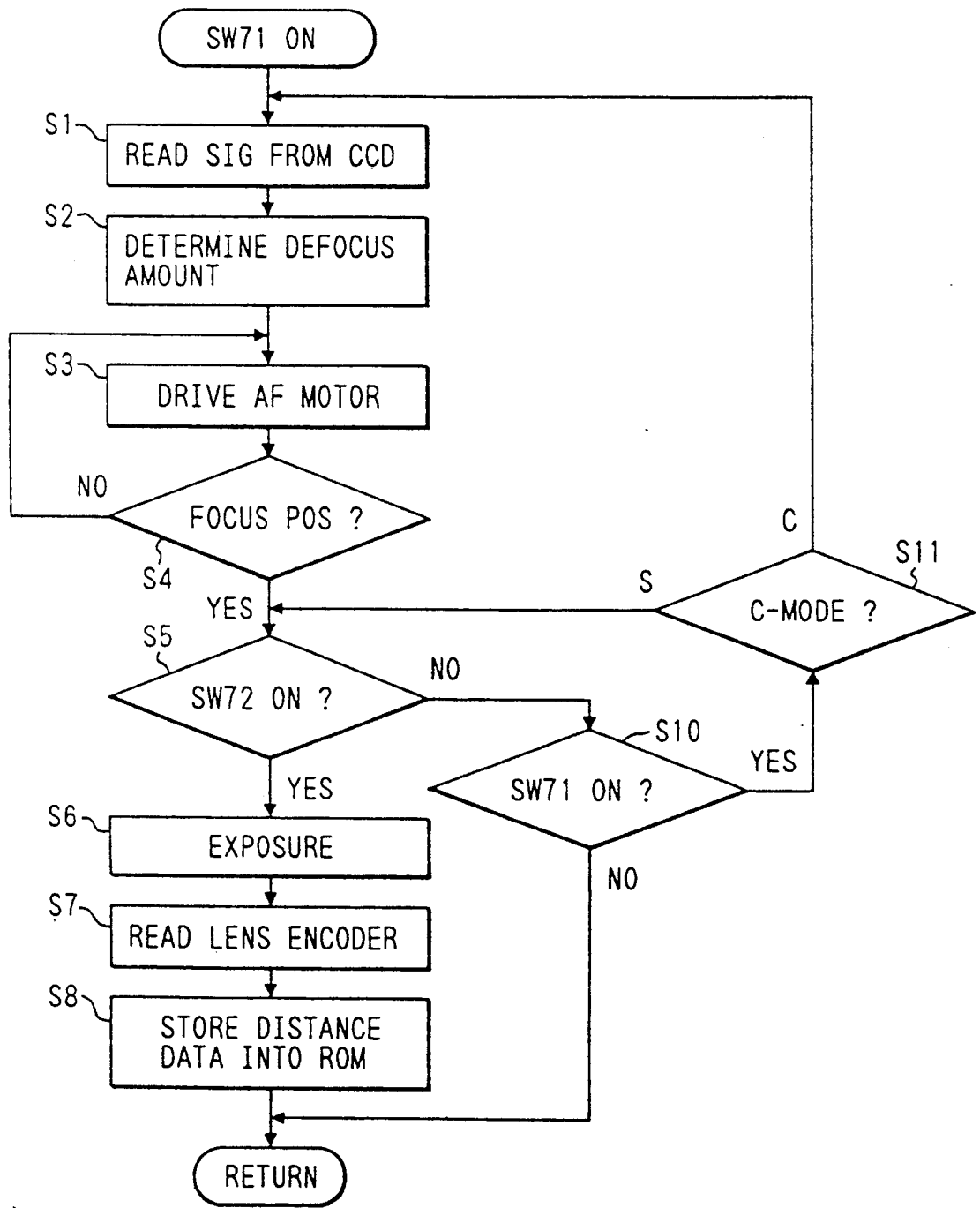
FIGS. 47 and 48 are flow charts showing control sequences.
Figure 50:
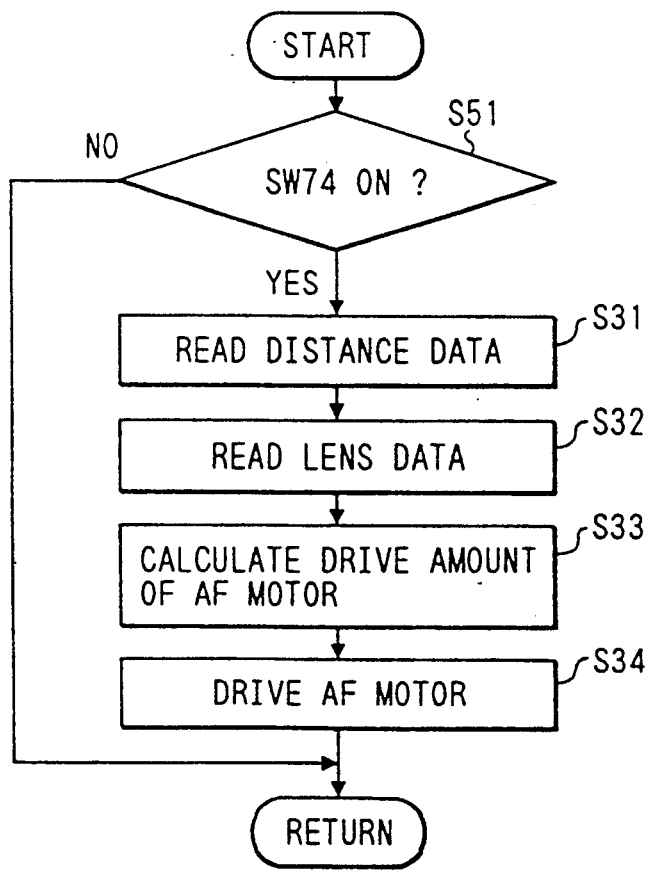
FIGS. 49 to 50 are flow charts of a variation of said embodiment.
Figure 49:
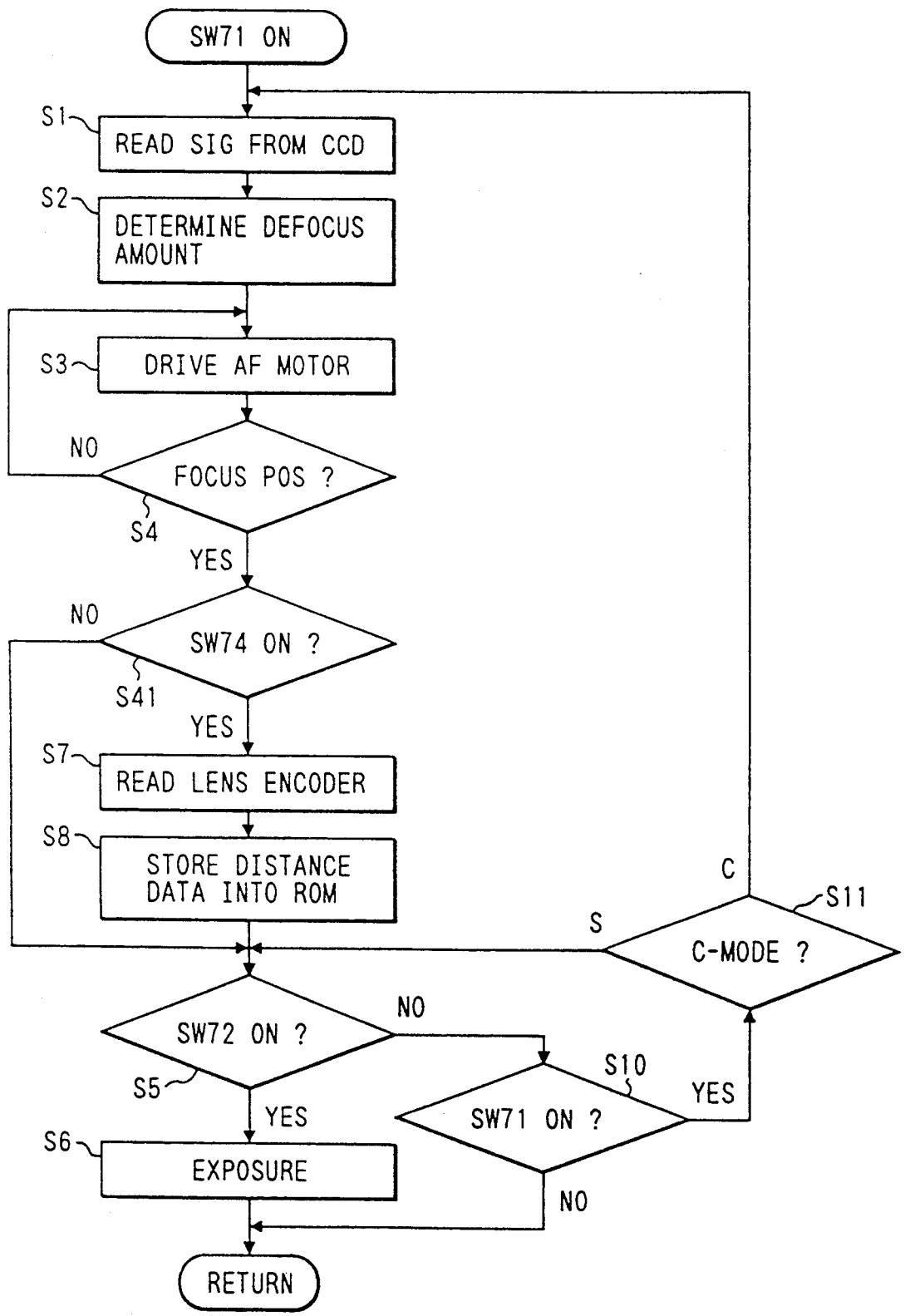

In FIGS. 49 and 50, same steps as those in FIGS. 47 and 48 are represented by same numbers, and the following description will principally concentrate on the differences.

After an in-focus state is identified in the step S4, a step S41 discriminates whether the selection switch SW74 is closed, and, if closed, steps S7, S8 store the photographing distance in the in-focus state in the ROM of the control circuit. Then a step S5 discriminates whether the switch SW72 is closed, then a step S6 executes the phototaking operation, and the sequence returns to a predetermined flow. On the other hand, if the step S41 identifies that the selection switch SW74 is open, the sequence proceeds, without storage of the photographing distance, to the steps S5, S6 for executing the phototaking operation.

When the phototaking lens is changed, the signal level from the lens detection switch SW73 changes from low to high and then to low as explained before, whereby the sequence shown in FIG. 50 is activated. A step S51 discriminates whether the mode selection switch SW74 is closed. If said switch is closed the sequence proceeds to a step S31, but, if it is open, the sequence returns to the main flow. Other processes are identical with those in FIG. 48.

Since the photographing distance can be determined from the focal length of the phototaking lens and the defocus amount, said photographing distance can be calculated from these quantities and stored in the ROM without the lens encoder. It is also possible to store the focal length of the lens and the defocus amount in the ROM and to calculate the photographing distance from the stored data at the lens interchange. Furthermore, although the foregoing description has been limited to the application to a camera with automatic focusing function, the present invention is likewise applicable also to a camera in which the focusing is achieved by manipulation of a distance ring. In such case, there will be provided a motor for regulating the focus position of the phototaking lens. The position of the distance ring is stored, as the photographing distance, in a memory circuit, and the lens is automatically adjusted to said photographing distance at the lens interchange.

In the following there will be explained a 9th embodiment of the present invention, applied to a camera shaking warning device.

Figure 51:
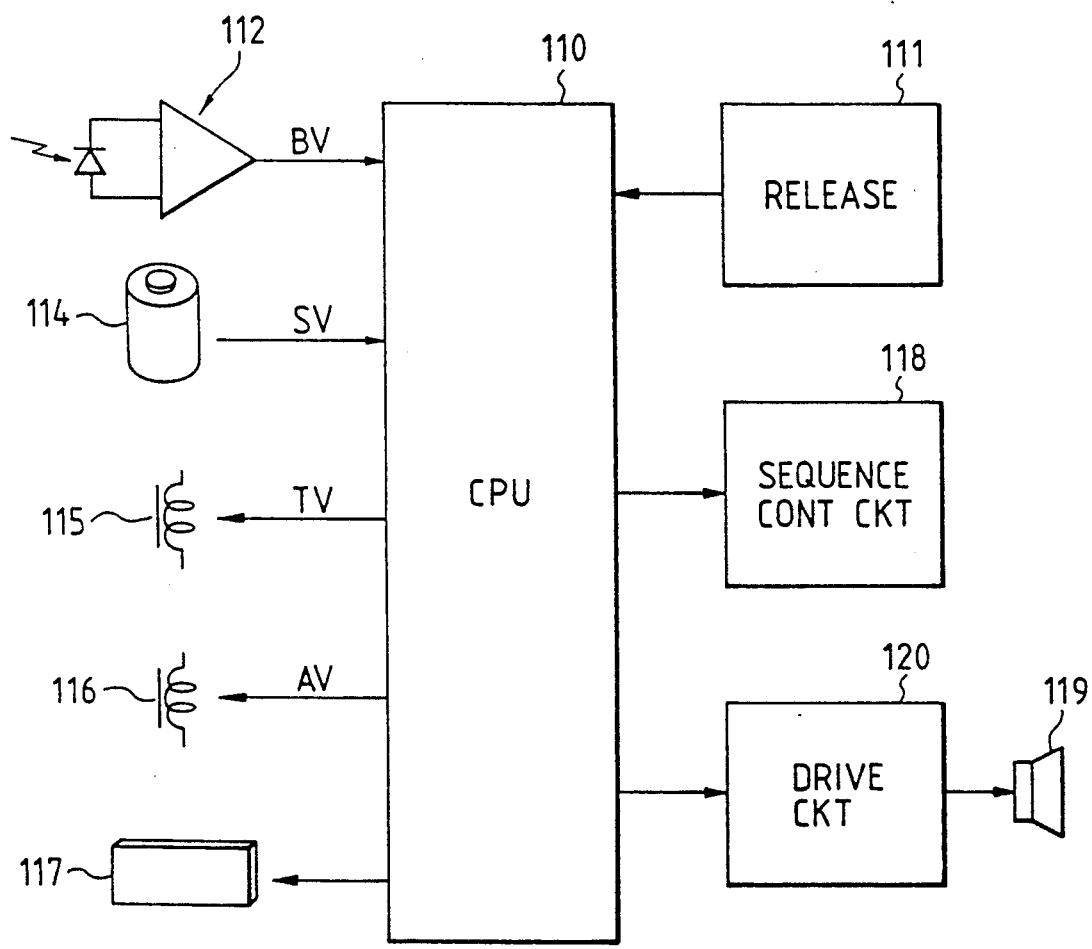
FIG. 51 is a block diagram of a camera constituting a ninth embodiment of the present invention.

Referring to FIG. 51, a control circuit 110 including a CPU receives a release operation signal from a shutter release device 111; a light metering output signal BV from a light metering device 112 having a photodiode 112 for receiving the light from the object and an amplifier; and film sensitivity information SV from the film cartridge 114. Said control circuit 110 is also connected to a solenoid 115 for driving the shutter, a solenoid 116 for controlling the diaphragm, a display unit 117 for indicating various information for example in the view finder, and a sequence control circuit 118 for winding the film after a phototaking operation and making preparations for the next phototaking operation. When the CPU identifies that the shutter speed is slower than a predetermined camera shaking limit (for example 1/60 sec), the drive circuit 120 activates an alarm buzzer 119. The drive circuit 120 is so designed to activate the alarm buzzer 119 with variable cycles of sound according to an alarm control signal from the CPU 110.

Figure 52:
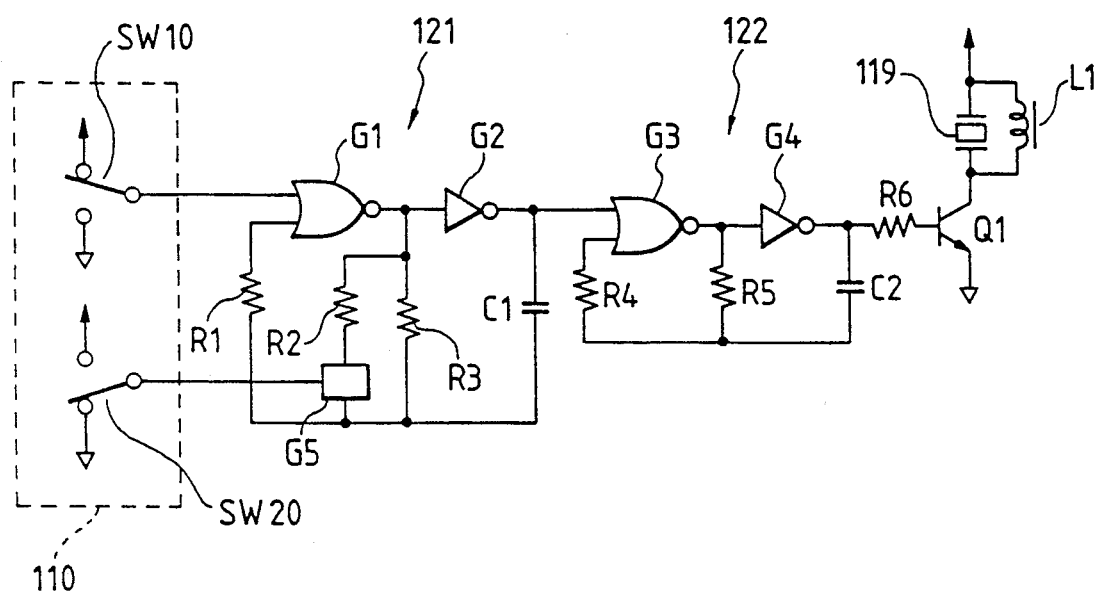
FIG. 52 is a circuit diagram of a buzzer driving circuit.

FIG. 52 shows the details of the drive circuit 120, which is composed of a first oscillator 121 with variable oscillation frequency, and a second oscillator 122 for generating a drive signal of a frequency equal to the specific frequency of the alarm buzzer 119. The oscillator 121 is composed of a NOR gate G1, an inverter G2, resistors R1-R3, a capacitor C1 and an analog switch G5, in which said NOR gate G1 and analog switch G5 respectively receive alarm control signals from switches SW10, SW20 formed as CMOS transistors in the CPU 110. The second oscillator 122 is composed of a NOR gate G3, an inverter 64, resistors R4-R6, a capacitor C2 a coil L1 and a transistor Q1.

When alarm control signals of high level and low level are respectively supplied to the NOR gate G1 and the analog switch G5 from the control circuit 110, the first oscillator 121 terminates the oscillation and the analog switch G5 is opened, whereby the output of the inverter G2 is shifted to the high-level state to terminate the oscillation of the second oscillator 122. Consequently the buzzer 119 is not activated.

When the state of the switch SW10 is inverted to send a low-level signal from the control circuit 110 to the NOR gate G1, the first oscillator 121 starts oscillation, with a frequency, for example of 2 Hz, determined by the resistor R3, capacitor C1 and the thresholds of the gates G1, G2. The resistor R1, constituting a protecting circuit for the gate input, does not affect the oscillation frequency. Also the resistor R2 does not affect the oscillation frequency since the analog switch G5 is opened.

Figure 53A:
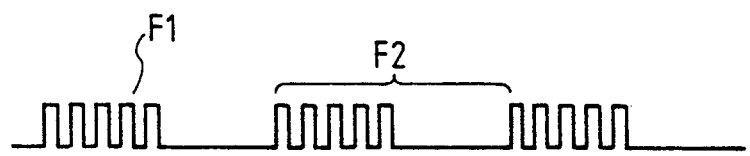
FIGS. 53A and 53B are timing charts showing driving cycles of the buzzer.

The oscillation output of 2 Hz from the inverter G2 is supplied to the gate G3 of the second oscillator 122, which effects oscillation with a frequency determined by the resistor R5 and the capacitor C2 only during the low-level state of said input signal. In this state the resistor R4 does not affect the oscillation frequency. The oscillation frequency of said second oscillator is for example 4 KHz, which is same as the specific frequency of the alarm buzzer 119. Thus the transistor Q1 is driven with a frequency of 4 KHz at an interval of 0.5 seconds. FIG. 53A schematically shows the drive signal form the buzzer 119, wherein F1 corresponds to 4 KHz and F2 corresponding to 2 Hz.

On the other hand, if the switch SW20 is shifted to the power supply side to release a high-level signal while the switch SW10 releases a low-level signal, the analog switch G5 is shortcircuited, whereby the resistor R2 is connected parallel to the resistor R3, thus providing a synthesized resistance smaller than that of the resistor R3. Consequently the oscillation frequency of the first oscillator 121 increases, for example, to 8 Hz. The oscillation signal of 8 Hz is supplied to the gate G3 of the second oscillator 122, whereby the transistor Q1 is driven with a frequency of 4 KHz at an interval of 0.125 seconds. F3 in FIG. 53B corresponds to 8 Hz.

Figure 53B:
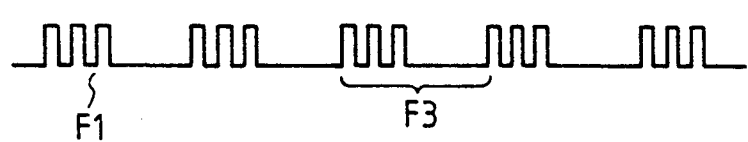

Consequently, depending on the alarm control signal from the CPU 110, the buzzer drive circuit 120 either deactivates the alarm buzzer 119, or generates relatively slow peep-peep sounds of a low alarm level shown in FIG. 53A, or relatively fast pip-pip sounds of a high alarm level shown in FIG. 53B.

In the following there will be explained the discrimination of camera shaking by the CPU 110 and the switching of the alarm control signal, with reference to flow charts shown in FIGS. 54–56.

Figure 54:
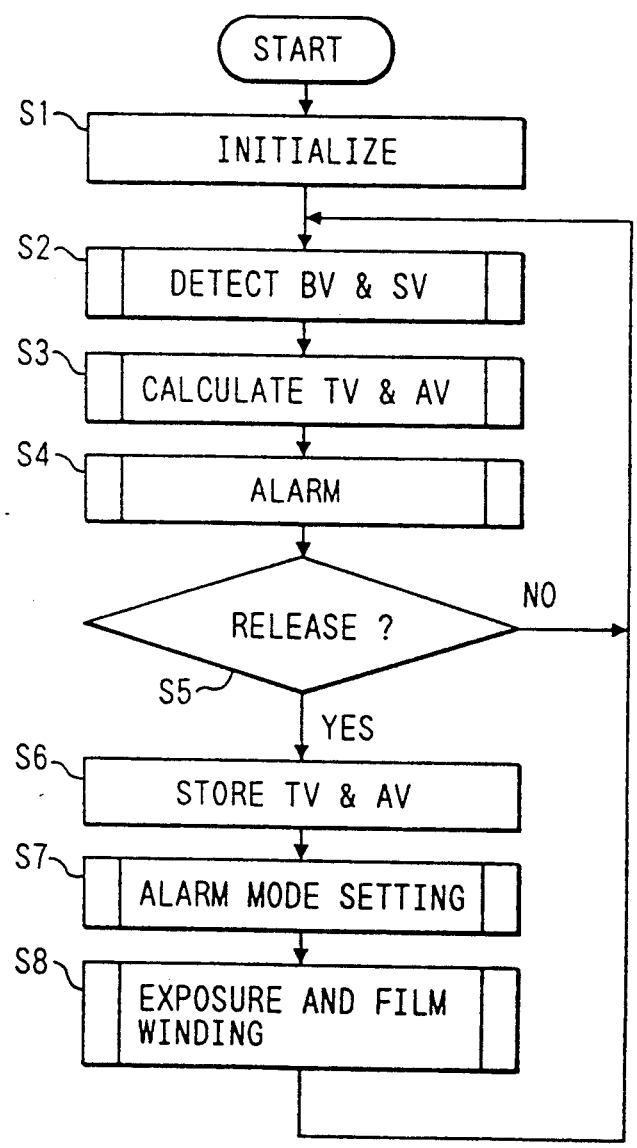
FIGS. 54 to 56 are flow charts showing control sequences.

FIG. 54 shows a main routine repeated while the camera is powered. When this routine is activated by the start of power supply, a step S1 initializes the CPU 110, wherein a value "2" is set in a register WL to be explained later. Then a step S2 fetches the light metering output BV and the film sensitivity information SV, then a step S3 calculates the shutter speed information TV and the diaphragm aperture information AV from said BV and SV, and a step S4 discriminates the camera shaking limit and determines the necessity for alarm, based on the shutter speed information TV.

Figure 55:
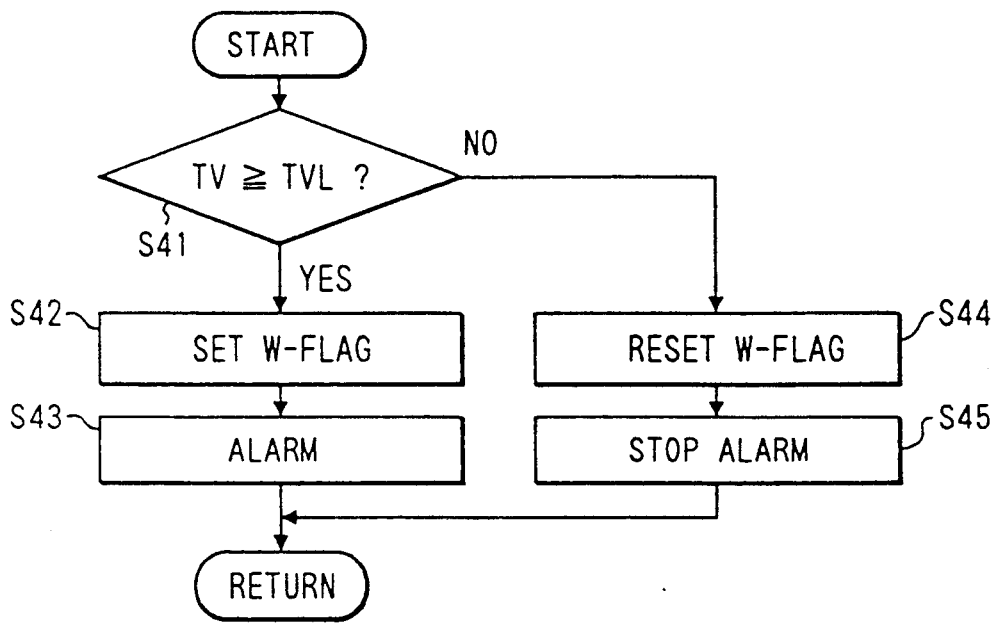

FIG. 55 shows the details of said step S4. A step S41 discriminates whether the shutter speed TV is slower than a camera shaking limit TVL, and, if affirmative, a step S42 sets a flag W indicating the necessity for alarm. Then a step S43 controls the switches SW10, SW20 of the control circuit 110 according to the content of the register WL indicating the level of alarm.

In the present embodiment, when WL is "1", the switches SW10, SW20 are both set at the low level state for driving the buzzer with the sound interval of the high level of alarm shown in FIG. 53B, and, when WL is "2", the switches SW10, SW20 are respectively set at the low level and high level in order to drive the buzzer with the sound interval of the low level of alarm shown in FIG. 53A. If the discrimination of the step S41 turns out negative, a step S33 resets the W-flag, and a step S45 shifts the switch SW10 to the high level state thereby deactivating the buzzer. Thereafter a step S43 or S45 sets the switch SW20 to the low level state, and the sequence proceeds to a step S5 in FIG. 54.

The step S5 discriminates, from the operation signal, whether the shutter releasing operation has been conducted, and, if not, the sequence returns to the step S2, but, if conducted, the sequence proceeds to a step S6 for memorizing the shutter speed information TV and the diaphragm aperture information AV in a memory. Then a step S7 sets the level of alarm in the register WL.

Figure 56:
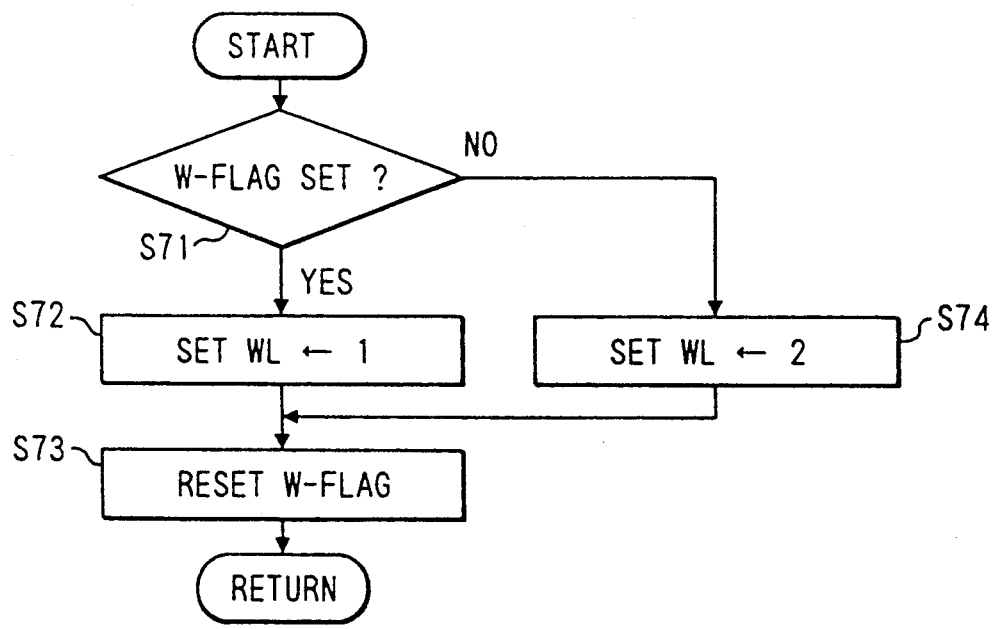

FIG. 56 shows the details of said step S7.

A step S71 discriminates whether the W-flag has been set, and, if set, a step S72 sets "1" in the register WL, but, if not, a step S74 sets "2" in said register WL. Then a step S73 resets the W-flag and the sequence returns to a step S8 in FIG. 54.

The step S8 executes a sequence routine for the exposure operation and the ensuing processes such as film winding, and then the sequence returns to the step S2.

The above-explained sequence provides alarms in the following manner.

Since the register WL is set at "2" at the start of power supply, the alarm buzzer 119 sounds with a cycle time of low alarm level shown in FIG. 53A if the shutter speed at the first phototaking operation is slower than 1/60 seconds. If the phototaking operation is conducted disregarding the alarm sound, the step S72 in FIG. 56 sets "1", indicating the high alarm level, in the register WL. Consequently, if the shutter speed at the next phototaking operation is again slower than 1/60 seconds, the alarm buzzer sounds with a cycle time of high alarm level shown in FIG. 53B. If the shutter speed is changed to a speed faster than 1/60 seconds at the next phototaking operation, the step S44 shown in FIG. 55 resets the W-flag, and, in response to the succeeding shutter releasing operation, the step S73 in FIG. 56 sets "2", indicating the low alarm level, in the register WL. Thus, if the shutter speed at the succeeding phototaking operation is slower than 1/60 seconds, there is given alarm of the low alarm level shown in FIG. 53A.

The buzzer activated in the step S43 shown in FIG. 55 is deactivated, after the phototaking operation, in the step S45.

Figure 57:
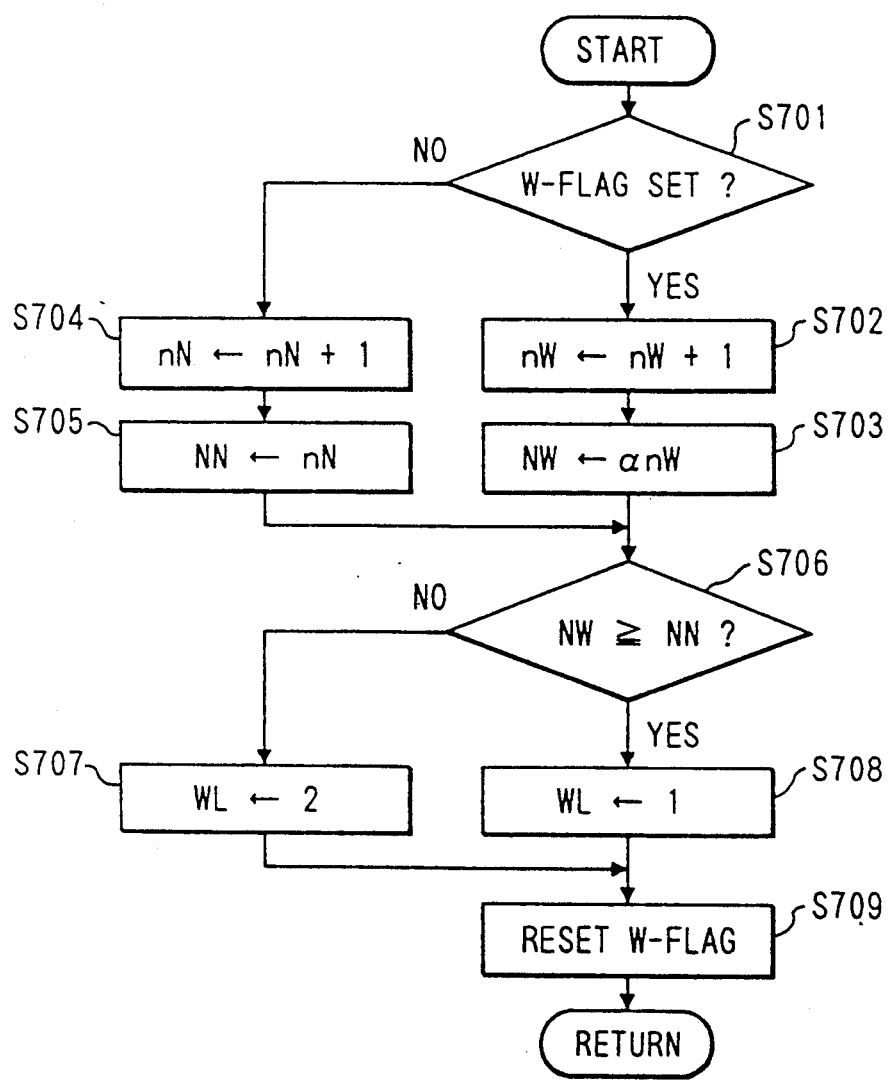
FIGS. 57 and 58 are flow charts of a variation of said embodiment.

FIG. 57 shows a variation of the sequence shown in FIG. 56.

A step S701 discriminates whether the W-flag has been set, and, if set, a step S702 adds "1" to the count nW. Then a step S703 multiplies the new count nW by a coefficient α and stores the result. On the other hand, if the W-flag is not set, a step S704 adds "1" to the count nN and a step S705 stores the new count nN as NN. Then a step S706 discriminates whether NW is at least equal to NN, and, if not, a step S707 sets "2" in the register WL, but, if affirmative, a step S708 sets "1" in the register WL. Then the step S709 resets the W-flag, and the sequence returns to the step S8 in FIG. 54.

In the present variation, there are counted the number of phototaking operations conducted disregarding the alarm and the number of phototaking operations conducted without alarm, and, if the former is larger, the step S708 sets "1" in the register WL indicating the level of alarm. Thus, if the shutter speed at the next phototaking operation becomes slower than 1/60 seconds, the buzzer sounds with a shorter cycle time indicating the high level of alarm. On the other hand, if the number of phototaking operations conducted without alarm is larger than that conducted disregarding the alarm, the step S707 sets "2" in the register WL, whereby, if the shutter speed becomes slower than 1/60 seconds at the next phototaking operation, there is given alarm with a longer cycle time.

In the following there will be explained another variation of the sequence shown in FIG. 56. The shutter speeds are classified, as shown in Tab. 2, into three categories H, M and L, then the number of phototaking operations is counted for each speed, and the alarm sound is varied in three levels based on the frequency of uses of each shutter speed. In this case the drive circuit is constructed in such a manner that one of the values 1–3 is set in the register WL indicating the level of alarm, and that the alarm buzzer sounds in one of three cycle times. The range H indicates the shutter speeds without the fear of camera shaking, the range M indicates the shutter speeds at which the camera shaking may occur but can be prevented by the attention of the operator, and the range L indicates the shutter speeds at which the camera shaking cannot be prevented without considerable care.

TABLE 2

| Shutter speed TV | |
| --- | --- |
| H | −1/125 |
| M | 1/60–1/8 |
| L | 1/4– |

Figure 58:
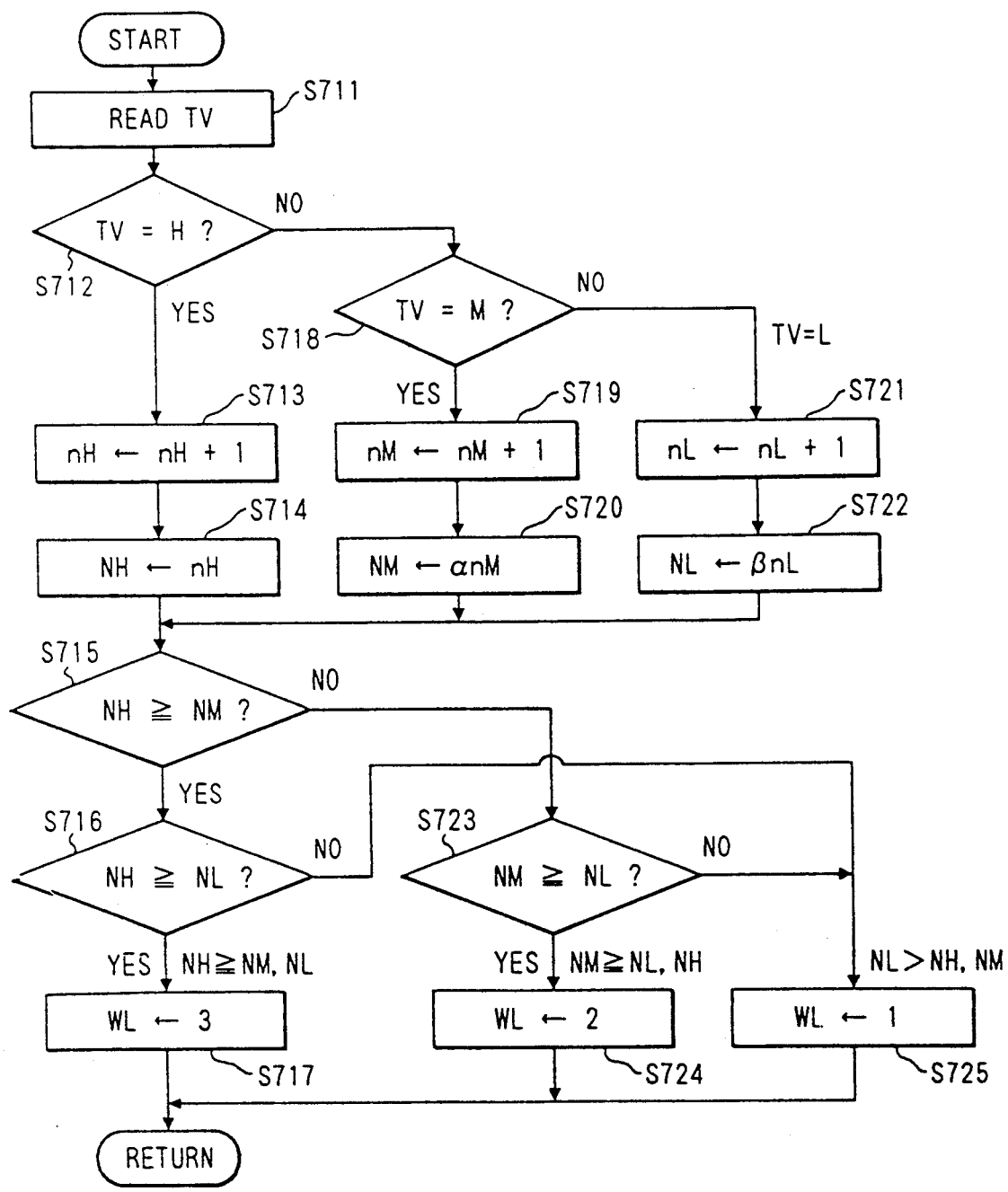

FIG. 58 shows a flow chart, corresponding to that shown in FIG. 56, for switching of the alarm control signal in the present variation.

At first a step S711 reads the shutter speed information TV, and a step S712 discriminates whether said information TV is equal to a predetermined reference value H. If equal, a step S713 adds "1" to the count nH, and a step S714 stores the new count nH as NH. On the other hand, if not, a step S718 discriminates whether the shutter speed information TV is equal to a reference value M (<H). If equal, a step S719 adds "1" to the count nM, and a step S720 multiplies the new count nM by a coefficient α and stores the result as NM.

If the discrimination of the step S718 turns out negative, a step S721 adds "1" to the count nL, and a step S722 multiplies the new count nL by a coefficient α and stores the result as NL. Then a step S715 discriminates whether NH is at least equal to NM, and, if affirmative, a step S716 discriminates whether NH is at least equal to NL. If affirmative, a step S717 sets "3" in the register WL. If the discrimination of the step S715 turns out negative, a step S723 discriminates whether NM is at least equal to NL, and, if affirmative, sets "2" in the register WL, but, if negative, a step S725 sets "1" in the register WL. On the other hand, if the discrimination of the step S716 turns out negative, the sequence also proceeds to the step S725 for setting "1" in the register WL.

In the present embodiment, "3" is set in the register WL when the number of phototaking operations with shutter speeds equal to or faster than 1/125 seconds is largest. Thus, when a shutter speed slower than 1/60 seconds is selected, the alarm buzzer gives alarm sound of lowest alarm level. If the number of phototaking operations with shutter speeds in the range from 1/60 to ¼ seconds is largest, "2" is set in the register WL whereby the alarm buzzer is activated with sound of medium alarm level. Also if the number of phototaking operations with shutter speeds equal to or slower than ¼ seconds becomes largest, "1" is set in the register WL whereby the alarm buzzer is activated with sound of highest alarm level.

In the foregoing description, the level of alarm is changed by varying the sounding cycle time of the buzzer, but it is also possible to vary the intensity of the sound, or to vary the frequency of the buzzer tone. It is also possible to vary the level of alarm by combination of buzzer sound and light. It is furthermore possible to give the alarm by light only, and, in such case, the level of alarm may be varied in various forms as in the case of sound alarm.

In the foregoing description, the alarm is given only on the shutter speed, but there may also be given alarm on other photographing conditions.

We claim:

1. A mode setting device for a camera, comprising:
   a first actuation member to be actuated, prior to a phototaking operation, for rendering the camera capable of phototaking operation;
   a second actuation member to be actuated for selecting one of plural modes;
   means for setting a predetermined initial mode in response to the actuation of said first actuation member, and varying the mode in succession in response to the subsequent actuations of said second actuation member;
   means for counting the number of uses of each mode; and
   initial mode determining means for selecting a mode of largest number of uses based on the result of counting by said counting means and setting said mode as the above-mentioned initial mode.

2. A mode setting device for a camera, comprising:
   an actuation member to be actuated for selecting one of plural modes;
   means for varying the mode in succession in response to each actuation of said mode selecting actuation member;
   means for counting the number of uses of each mode;
   means for selecting a mode of largest number of uses, based on the result of counting by said counting means;
   means for discriminating whether the mode set by said setting means is said mode of largest number of uses; and
   means for generating an alarm in case the mode set by said setting means is identified not to be said mode of largest number of uses.

3. A focal length control device for a camera, comprising:
   a first actuation member to be actuated prior to a phototaking operation, for rendering the camera capable of phototaking operation;
   a second actuation member to be actuated for varying the focal length of a phototaking lens;
   means for driving said phototaking lens to a predetermined initial focal length in response to the actuation of said first actuation member, and for driving said phototaking lens, in response to the actuation of said second actuation member while the camera is in a state capable of phototaking operation, to a focal length corresponding to the actuation of said second actuation member;
   detection means for detecting the focal length or the focal length range of said phototaking lens;
   counting means for counting the number of settings of said phototaking lens at each focal length or in each focal length range, based on the result of detection by said detection means; and
   selection means for selecting a focal length or a focal length range of the largest number of settings of the phototaking lens, based on the result of counting by said counting means, and setting said selected focal length or a focal length in said selected focal length range as said initial focal length.

4. A constant magnification phototaking device for a camera, comprising:
   an actuation member to be actuated for selecting the photographing magnification in a constant magnification phototaking operation;
   magnification setting means for selecting a predetermined initial photographing magnification from plural magnifications in response to an instruction for constant magnification phototaking, and varying said photographing magnification in succession in response to each subsequent actuation of said magnification selecting actuation member;
   means for detecting the object distance concerning the distance to the object;
   means for setting image angle information for photographing said object with said set photographing magnification, based on said detected object distance;
   means for counting the number of uses of each photographing magnification; and
   means for selecting a photographing magnification of the largest number of uses as said initial photographing magnification, based on the result of counting by said counting means.

5. A device according to claim 4, further comprising position detecting means for detecting whether the camera is in a horizontal position or in a vertical position, wherein said magnification setting means is adapted to set a magnification for the horizontal camera position for said photographing magnification in case the camera is in said horizontal position, or to set a magnification for the vertical camera position for said photographing magnification in case the camera is in said vertical position, based on the result of detection by said position detecting means.

6. A constant magnification photographing device for a camera, comprising:
   means for detecting the object distance concerning to the distance to the object;
   means for setting image angle information for photographing the object with a predetermined photographing magnification, based on said detected object distance;
   means for correcting said photographing magnification by modifying said set image angle information, in response to the actuation of an actuation member; and
   means for cumulatively storing the number of uses of information on the used photographing magnification and/or of said photographing magnification, and determining said predetermined photographing magnification based on the result of said storage.

7. A self-timer phototaking control device for a camera, comprising:
   an actuation to be actuated for selecting one of plural self-timer modes;
   means for setting a predetermined initial self-timer mode in response to a self-timer instruction and varying the self-timer mode in succession in response to each subsequent actuation of said actuation member;
   phototaking means for effecting a self-timer phototaking operation in said set self-timer mode;
   means for counting the number of uses of each self-timer mode; and
   means for selecting a self-timer mode of the largest number of uses as said predetermined initial self-timer mode, based on the result of counting by said counting means.

8. A camera capable of automatically setting an exposure correction value, comprising:
   means for correcting the exposure value in response to a correction instructing signal;
   means for storing exposure correction values in relation to kinds of films;
   means for identifying the kind of loaded film;
   means for reading the exposure correction value corresponding to the loaded film from said storage means based on the result of identification by said identifying means, and sensing a correction instructing signal corresponding to that exposure correction value to said exposure value correcting means, said storage means being adapted to store also the number of uses of each of said exposure correction values; and
   detection means for detecting an exposure correction value of the largest number of uses for the identified kind of film, and
   wherein said correction value setting means is adapted to a correction instructing signal corresponding to the exposure correction value of said largest number of uses detected by said detection means.

9. An alarm device for a camera, comprising:
   means for releasing sensitivity information of the loaded film;
   means for determining a frequently used film sensitivity based on the output of said sensitivity information releasing means and setting said sensitivity as a standard sensitivity;
   means for discriminating, when a film is loaded in a state said standard sensitivity is set, whether the sensitivity of said loaded film coincides with said standard sensitivity; and
   means for generating an alarm in case said discriminating means identifies that both sensitivities are not mutually equal.

10. A camera with interchangeable lens, comprising:
    first detection means for detecting information relating to the photographing distance;
    memory means for storing the distance information detected by said first detection means;
    second detection means for detecting the presence or absence of interchange of said lens; and
    lens drive means for regulating, when a lens interchange is detected by said second detection means, the focus state of the lens after said interchange according to the distance information stored in said memory means in such a manner as to obtain the photographing distance prior to said lens interchange.

11. An alarm device for a camera, comprising:
    means for discriminating whether the photographing condition is a condition requiring an alarm;
    alarm means for giving an alarm to the photographer based on the result of said discrimination, with plural levels of alarm;
    means for detecting that a phototaking operation has been conducted disregarding the alarm; and
    means for controlling said alarm means for varying the next alarm to a higher level of alarm, in case said detection has been made for a predetermined number of times.

12. An alarm device for a camera, comprising:
    means for discriminating whether the photographing condition is a condition requiring an alarm;
    alarm means for giving an alarm to the photographer based on the result of said discrimination, with plural levels of alarm selectively;
    first counting means for counting the number of phototaking operations disregarding the alarm;
    second counting means for counting the number of phototaking operations without alarm; and
    means for controlling said alarm means to give a higher level of alarm when a comparison of results of counting by said first and second counting means indicates that the number of phototaking operations conducted disregarding the alarm is larger than the number of phototaking operations conducted without alarm, and to give a lower level of alarm when the comparison indicates otherwise.

13. A camera provided with a plurality of photographing conditions, comprising:
    generating means for generating a photographing preparation signal prior to a photographing operation;
    an actuation member to be actuated for varying said plurality of photographing conditions;
    adjusting means for adjusting said camera to a predetermined initial photographing condition in response to said photographing preparation signal, and for adjusting said camera, in response to the actuation of said actuation member, to the photographing condition corresponding to the actuation of said actuation member;

photographing condition detecting means for detecting the photographing condition;

counting means for counting the number of settings of the camera at each photographing condition on the basis of detection by said detecting means; and selecting means for selecting the photographing condition of the largest number of settings of the camera on the basis of the result of counting by said counting means, and setting said selected photographing condition as a new initial photographing condition.

14. A camera according to claim 13, wherein a focus length of a phototaking lens is changeable, and wherein said adjusting means adjusts the focal length of the phototaking lens in response to said photographing preparation signal and the actuation of said actuation member.

15. A camera according to claim 13, wherein a phototaking lens is detachable from a body of the camera, wherein said generating means detects that the phototaking lens is attached to the camera body and thereafter generates said photographing preparation signal, and wherein said adjusting means adjusts a photographing distance of the phototaking lens in response to said photographing preparation signal and said actuation member.

16. A camera according to claim 13, which further comprises memory means for fixedly storing said predetermined initial photographing condition and changing means for reading said predetermined initial photographing condition from said memory means and for substituting said new initial photographing condition for said predetermined initial photographing condition.

17. A camera according to claim 13, which further comprises alarming means for detecting that the photographing condition adjusted by said adjusting means is different from said new initial photographing condition and thereafter alarming.

18. A camera provided with a plurality of photographing conditions, comprising:

an actuation member to be actuated for varying said plurality of photographing conditions;

adjusting means responsive to the actuation of said actuation member for adjusting the camera to the photographing condition corresponding to the actuation of said actuation member;

photographing condition detecting means for detecting the photographing condition;

counting means for counting the number of settings of the camera at each photographing condition on the basis of detection by said detecting means; and selecting means for selecting the photographing condition of the largest number of settings of the camera on the basis of the result of counting by said counting means, and setting said selected photographing condition as an initial photographing condition.

19. A camera according to claim 18, which further comprises memory means for storing the plurality photographing conditions therein and reading means for firstly reading the initial photographing condition in response to the actuation of said actuation member.

20. A camera according to claim 18, wherein a focus length and photographing distance of a phototaking lens are changeable, and wherein said adjusting means adjusts the photographing magnification of the phototaking lens in response to said actuation member.

21. A camera according to claim 18, wherein a focus length of a phototaking lens is changeable, and wherein said adjusting means adjusts the focus length of the phototaking lens in response to said actuation member.

22. A camera according to claim 18, wherein said adjusting means adjusts a photographing distance of a phototaking lens in response to said actuation member.

23. A camera comprising:

memory means for storing a plurality of photographing conditions therein;

correcting means for correcting a predetermined one of the plurality of photographing conditions;

counting means for counting the number of photographing operations corresponding to at least one not corrected photographing condition and the corrected predetermined photographing condition; and updating means for updating the predetermined one condition stored in said memory means on the basis of the result of the counting by said counting means.

24. A camera according to claim 23, wherein the plurality of photographing conditions correspond to a plurality of photographing magnifications of the phototaking lens.

25. A camera provided with a plurality of photographing conditions, comprising:

attachment detecting means for detecting that a phototaking lens is attached to a camera body and thereafter generating a photographing preparation signal;

an actuation member to be actuated for varying said plurality of photographing conditions;

adjusting means for adjusting said camera to a predetermined initial photographing condition in response to said photographing preparation signal, and for adjusting said camera, in response to the actuation of said actuation member, to the photographing condition corresponding to the actuation of said actuation member;

photographing condition detecting means for detecting the photographing condition;

counting means for counting the number of settings of the camera at each photographing condition on the basis of detection by said detecting means; and selecting means for selecting the photographing condition of the largest number of settings of the camera on the basis of the result of counting by said counting means, and setting said selected photographing condition as a new initial photographing condition.

26. A camera according to claim 25, which further comprises memory means for fixedly storing said predetermined initial photographing condition and changing means for reading said predetermined initial photographing condition from said memory means and substituting said new initial photographing condition for said predetermined initial photographing condition.

27. A camera according to claim 25, which further comprises alarming means for detecting that the photographing condition adjusted by said adjusting means is different from said new initial photographing condition and thereafter alarming.

* * * * *